United States Patent
Yamamoto et al.

(10) Patent No.: US 6,823,662 B1
(45) Date of Patent: Nov. 30, 2004

(54) EXHAUST GAS PURIFYING SYSTEM

(75) Inventors: Shinji Yamamoto, Kanagawa (JP); Hiroyuki Kanesaka, Chiba (JP); Hitoshi Onodera, Kanagawa (JP); Yasunari Hanaki, Kanagawa (JP); Katsuo Suga, Yokohama (JP); Hiroshi Morita, Yokohama (JP); Yoshiaki Hiramoto, Kanagawa (JP); Hiroaki Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/692,470

(22) Filed: Oct. 20, 2000

(30) Foreign Application Priority Data

| | | |
|---|---|---|
| Oct. 21, 1999 | (JP) | 11-300265 |
| Dec. 7, 1999 | (JP) | 11-347290 |
| Dec. 15, 1999 | (JP) | 11-356436 |
| Sep. 29, 2000 | (JP) | 2000-298832 |

(51) Int. Cl.$^7$ .............................................. F01N 3/00
(52) U.S. Cl. .......................... 60/286; 60/274; 60/276; 60/295; 60/301; 123/3
(58) Field of Search .................... 60/274, 295, 303, 60/275, 285, 286, 299, 301; 276/275, 285, 286, 299, 301; 429/17, 20; 502/241, 328; 123/1 A, 3, DIG. 12

(56) References Cited

U.S. PATENT DOCUMENTS

| | | | | |
|---|---|---|---|---|
| 3,908,365 A | * | 9/1975 | Schweibold et al. | 60/274 |
| 3,986,350 A | * | 10/1976 | Schmidt | 60/301 |
| 4,149,998 A | * | 4/1979 | Tauster et al. | 502/328 |
| 4,318,369 A | | 3/1982 | Cronyn | |
| 5,124,303 A | * | 6/1992 | Kobayashi et al. | 502/241 |
| 5,259,189 A | | 11/1993 | Baier et al. | |

(List continued on next page.)

FOREIGN PATENT DOCUMENTS

| | | |
|---|---|---|
| EP | 0537968 | 4/1993 |
| EP | 0 852 966 A1 | 7/1998 |
| JP | 04284847 | 10/1992 |

(List continued on next page.)

OTHER PUBLICATIONS

Toyoda, Kenji et al., *Science and Technology in Catalysis 1998, "The Quantitative Analysis of Multi–reactions on SCR Process"*, 1 page, (1998).

(List continued on next page.)

*Primary Examiner*—Tu M. Nguyen
(74) *Attorney, Agent, or Firm*—Foley & Lardner LLP

(57) ABSTRACT

An exhaust gas purifying system for an automotive internal combustion engine includes a NOx treating catalyst for reducing NOx disposed in an exhaust gas passageway of a combustion device, to reduce NOx in presence of reducing components in exhaust gas. Additionally, a hydrogen enriching device is disposed upstream of said NOx treating catalyst with respect to flow of exhaust gas from the combustion device and arranged to increase a ratio of hydrogen to total reducing components in at least one of combustion gas and exhaust gas so as to meet relations represented by following formulae (1) and (2), when reduction of NOx is carried out by the NOx treating catalyst:

$$[H2/TR]d > [H2/TR]u \qquad (1)$$

$$[H2/TR]d \geq 0.3 \qquad (2)$$

where $[H2/TR]u$ is a ratio between a concentration $[H2]u$ of hydrogen and a concentration $[TR]u$ of total reducing components in at least one of exhaust gas in the exhaust gas passageway upstream of the hydrogen enriching device and combustion gas in a state before undergoing the hydrogen ratio increasing by said hydrogen enriching means; and $[H2/TR]d$ is a ratio between a concentration $[H2]d$ of hydrogen and a concentration $[TR]d$ of total reducing components in exhaust gas in the exhaust gas passageway upstream of the NOx treating catalyst and downstream of the hydrogen enriching device.

24 Claims, 23 Drawing Sheets

U.S. PATENT DOCUMENTS

| | | | |
|---|---|---|---|
| 5,272,871 A | * 12/1993 | Oshima et al. | 60/286 |
| 5,297,515 A | * 3/1994 | Gale et al. | 123/3 |
| 5,412,946 A | * 5/1995 | Oshima et al. | 60/286 |
| 5,473,887 A | 12/1995 | Takeshima et al. | |
| 5,498,487 A | * 3/1996 | Ruka et al. | 429/20 |
| 5,543,124 A | 8/1996 | Yokota et al. | |
| 5,599,758 A | 2/1997 | Guth et al. | |
| 5,867,982 A | * 2/1999 | Tengblad et al. | 60/274 |
| 5,953,908 A | 9/1999 | Appleby | |
| 6,047,544 A | * 4/2000 | Yamamoto et al. | 60/286 |
| 6,122,909 A | * 9/2000 | Murphy et al. | 60/286 |
| 6,151,547 A | * 11/2000 | Kumar et al. | 60/274 |
| 6,165,633 A | * 12/2000 | Negishi | 429/17 |
| 6,173,571 B1 | * 1/2001 | Kaneko et al. | 60/286 |
| 6,176,078 B1 | * 1/2001 | Balko et al. | 60/286 |
| 6,187,709 B1 | * 2/2001 | McCabe | 60/299 |
| 6,244,044 B1 | * 6/2001 | Bartley | 60/285 |
| 6,651,424 B1 | * 11/2003 | Twigg | 60/286 |

FOREIGN PATENT DOCUMENTS

| | | | |
|---|---|---|---|
| JP | 05106430 | 4/1993 | |
| JP | 05272328 | 10/1993 | |
| JP | 05277373 | 10/1993 | |
| JP | 11501378 | 10/1995 | |
| JP | 2600492 | 1/1997 | |
| JP | 09141098 | 6/1997 | |
| JP | 2002-117593 | 4/2000 | |
| JP | 2001-179100 | 7/2001 | |
| WO | WO 00/53903 | * 9/2000 | |

OTHER PUBLICATIONS

Ogura, Masaru et al., *Third Tokyo Conference on Advanced Catalytic Science and Technology*, "Selective Catalytic Reduction of Nitric Oxide with Methane on Pd/Co/H–ZSM–5 Catalysts", pp. 49, (1998).

"New Automotive Gasoline Engine", Sankaido, p. 103, (6 sheets), (1994).

"Catalyst Lectureship: Industrial Catalyst Reaction II, Kodansha", pp. 193 and 194, (7 sheets), (1985).

Shin'ichi Matsumoto et al., *National Symposium Nano–Control of Environmental Catalysts and Related Materials (6th Iketani Conference)*, "Nox storage catalyst (*NSR catalyst*) for automotive lean burn engines", pp. 74 and 75, (Tokyo 1996).

* cited by examiner

EXHAUST GAS PURIFYING SYSTEM

BACKGROUND OF THE INVENTION

This invention relates to improvements in an exhaust gas purifying system for purifying exhaust gas or burnt gas discharged from a combustion device such as an internal combustion engine, a burner, a furnace or the like, and particularly to the improvements in the exhaust gas purifying system using a catalyst for reducing nitrogen oxides (NOx) in exhaust gas discharged during a lean-burn operation in which an air-fuel mixture leaner than a stoichiometric level is supplied to the combustion device, under effective use of hydrogen.

It is well known that a three-way catalyst was used to oxidize carbon monoxide (CO) and hydrocarbons (HC) and to reduce nitrogen oxides (NOx) contained in exhaust gas discharged from an internal combustion engine of an automotive vehicle or the like. The three-way catalyst can effectively function in a stoichiometric atmosphere (exhaust gas having a stoichiometric air-fuel ratio). However, such three-way catalyst cannot function to reduce nitrogen oxides in a lean atmosphere (exhaust gas having a leaner air-fuel ratio than the stoichiometric level). In this regard, a technique for reducing nitrogen oxides in the lean atmosphere has been proposed in Japanese Patent No. 2600492 in which a NOx trap agent can trap NOx in the lean atmosphere and can release NOx by enriching air-fuel ratio of exhaust gas flowing to the NOx trap agent so as to reduce the released NOx.

SUMMARY OF THE INVENTION

However, in such techniques using the three-way catalyst or disclosed in Japanese Patent No. 2600492, it is required to periodically or intermittently supply HC and CO as a reducing agent (reducing component or gas) to promote reduction reaction of NOx. In this connection, HC and CO which has not been consumed in the NOx reduction reaction is required to be oxidized. This will be accomplished by a measure of oxidizing HC and CO by making oxidation reaction simultaneously on the NOx treating catalyst, or another measure of oxidizing excessive HC and CO in a three-way catalyst or the like disposed downstream of the NOx treating catalyst.

However, such a NOx treating catalyst or a three-way catalyst disposed downstream of the NOx treating catalyst considerably far from the engine, and therefore the temperature of exhaust gas flown to the three-way catalyst is unavoidably lowered, thereby making it impossible to exhibit a sufficient oxidizing performance for HC and CO. Particularly immediately after engine starting, sufficient oxidation of HC and CO is difficult to be made.

Additionally, when HC and CO components in exhaust gas is increased to lower oxygen concentration in exhaust gas and to reduce NOx as discussed above, it is impossible to make a vehicle running under the lean-burn operation, thereby exhibiting an insufficient fuel economy improvement effect.

It is, therefore, an object of the present invention is to provide an improved exhaust gas purifying system which can effectively overcome drawbacks encountered in conventional techniques for reducing NOx in exhaust gas.

Another object of the present invention is to provide an improved exhaust gas purifying system which can effectively remove NOx, HC and CO from exhaust gas while obtaining a high fuel economy improvement effect.

A further object of the present invention is to provide an improved exhaust gas purifying system for an internal combustion engine, which can remove NOx in exhaust gas at a high efficiency throughout a time immediately after engine starting and a time of making steady state engine operation and effectively remove HC and CO particularly during a low temperature engine operation immediately after engine starting, while obtaining a high fuel economy improvement effect upon making a lean-burn operation of the engine.

An aspect of the present invention resides in an exhaust gas purifying system comprising a NOx treating catalyst for reducing NOx disposed in an exhaust gas passageway of a combustion device, to reduce NOx in presence of reducing components in exhaust gas. Additionally, a hydrogen enriching device is disposed upstream of the NOx treating catalyst with respect to flow of exhaust gas from the combustion device and arranged to increase a ratio of hydrogen to total reducing components in at least one of combustion gas and exhaust gas so as to meet relations represented by following formulae (1) and (2), when reduction of NOx is carried out by the NOx treating catalyst:

$$[H2/TR]d > [H2/TR]u \qquad (1)$$

$$[H2/TR]d \geq 0.3 \qquad (2)$$

where $[H2/TR]u$ is a ratio between a concentration $[H2]u$ of hydrogen and a concentration $[TR]u$ of total reducing components in at least one of exhaust gas in the exhaust gas passageway upstream of the hydrogen enriching device and combustion gas in a state before undergoing the hydrogen ratio increasing by the hydrogen enriching means; and $[H2/TR]d$ is a ratio between a concentration $[H2]d$ of hydrogen and a concentration $[TR]d$ of total reducing components in exhaust gas in the exhaust gas passageway upstream of the NOx treating catalyst and downstream of the hydrogen enriching device.

Another aspect of the present invention resides in an exhaust gas purifying system of a multiple step control type in combination with an internal combustion engine having an exhaust gas passageway. The engine includes a combustion system having a combustion control device for controlling at least one selected from the group consisting of operating parameters of the engine and combinations of the operating parameters, the operating parameters including fuel injection timing, spark timing, opening and closing timings of intake and exhaust valves of the engine. The exhaust gas purifying system includes a NOx treating catalyst for reducing NOx disposed in the exhaust gas passageway to reduce NOx in presence of reducing components in exhaust gas. A hydrogen enriching device is disposed upstream of the NOx treating catalyst with respect to flow of exhaust gas and includes at least one selected from the group consisting of a hydrogen producing catalyst containing at least one noble metal, a CO and HC selective oxidation catalyst containing zirconium oxide, a catalyst containing solid acidic zirconium oxide, and a device for supplying hydrogen-contained gas produced by using hydrocarbon fuel and air, from outside of the exhaust passageway. The hydrogen-contained gas supplying device includes at least one of a first hydrogen-contained gas supplying device having a hydrogen-contained gas producing catalyst for promoting reaction for producing hydrogen-contained gas from the hydrocarbon fuel, and a device for supplying the hydrocarbon fuel and air to the catalyst, and a second hydrogen-contained gas supplying device for producing hydrogen-contained gas by using hydrocarbon fuel and exhaust gas under heat. The hydrogen enriching device is arranged to increase a ratio of hydrogen to total reducing components in at least one of combustion gas and exhaust gas so as to relations represented by the following formulae (1) and (2), when reduction of NOx is carried out by the NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of the hydrogen enriching device and combustion gas in a state before undergoing the hydrogen ratio increasing by the hydrogen enriching means; and [H2/TR]d is a ratio between a concentration [H2]d of hydrogen and a concentration [TR]d of total reducing components in exhaust gas in the exhaust gas passageway upstream of the NOx treating catalyst and downstream of the hydrogen enriching device.

A third aspect of the present invention resides in a method of purifying exhaust gas from a combustion device provided with an exhaust gas purifying system including a NOx treating disposed in an exhaust gas passageway of the combustion device, the NOx treating catalyst reducing NOx in presence of reducing components in exhaust gas. The method comprises increasing a ratio of hydrogen to total reducing components in at least one of combustion gas and exhaust gas to be supplied to the NOx treating catalyst so as to meet relations represented by the following formulae (1) and (2), when reduction of NOx is carried out by the NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of the hydrogen enriching device and combustion gas in a state before undergoing the hydrogen ratio increasing; and [H2/TR]d is a ratio between a concentration [H2]d of hydrogen and a concentration [TR]d of total reducing components in exhaust gas in the exhaust gas passageway upstream of the NOx treating catalyst and in a state after undergoing the hydrogen ratio increasing.

BRIEF DESCRIPTION OF THE DRAWINGS

In the drawings, like reference numerals designate like parts and elements throughout all figures.

DETAILED DESCRIPTION OF THE INVENTION

Figure 1:
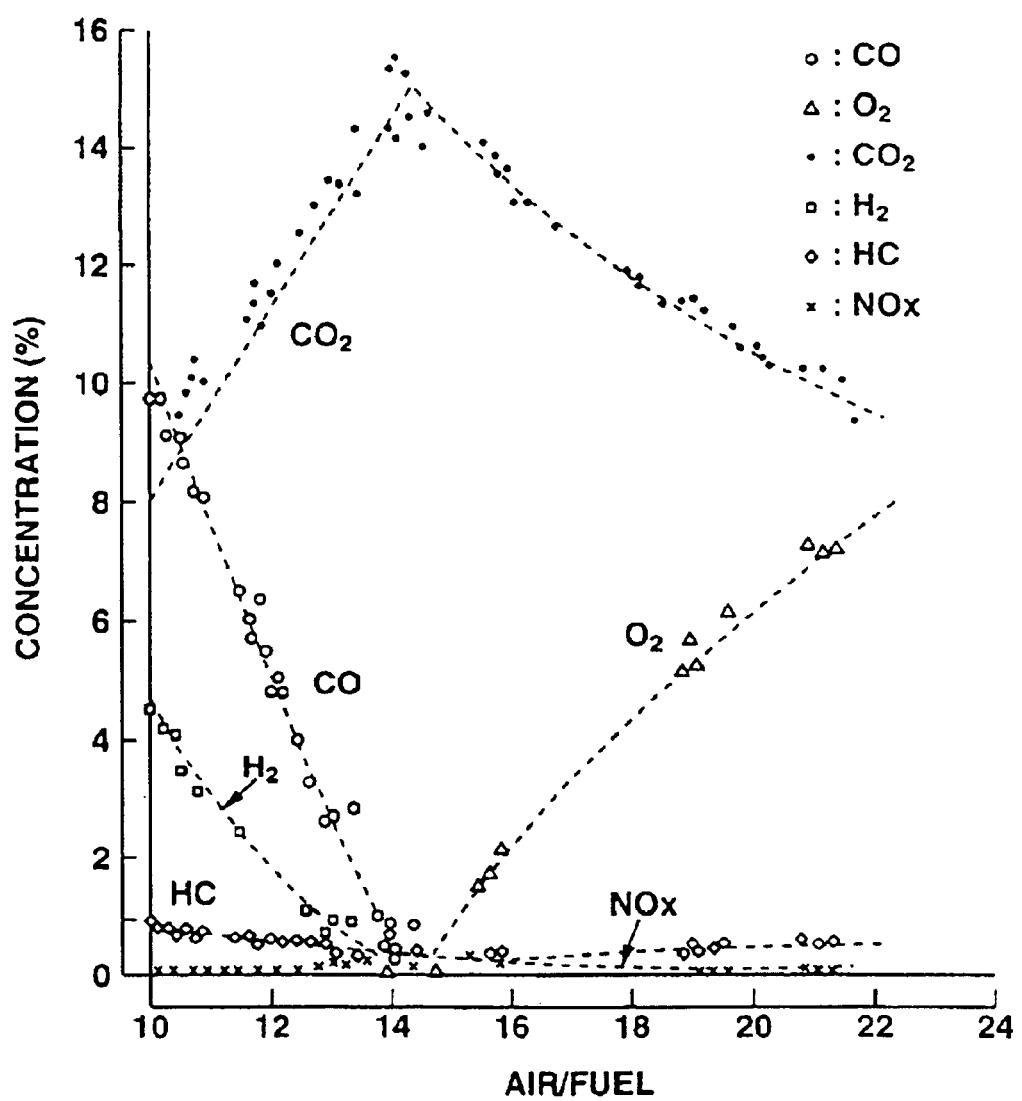
FIG. 1 is a graph showing the fact that composition of exhaust gas changes depending upon air-fuel ratio of air-fuel mixture to be supplied to an internal combustion engine.

According to the present invention, an exhaust gas purifying system comprises a NOx treating catalyst for reducing NOx disposed in an exhaust gas passageway of a combustion device, to reduce NOx in presence of reducing components in exhaust gas. Additionally, a hydrogen enriching device is disposed upstream of the NOx treating catalyst with respect to flow of exhaust gas from the combustion device and arranged to increase a ratio of hydrogen to total reducing components in at least one of combustion gas and exhaust gas so as to meet relations represented by the following formulae (1) and (2), when reduction of NOx is carried out by the NOx treating catalyst:

$$[H2/TR]d > [H2/TR]u \quad (1)$$

$$[H2/TR]d \geq 0.3 \quad (2)$$

where $[H2/TR]u$ is a ratio between a concentration $[H2]u$ of hydrogen and a concentration $[TR]u$ of total reducing components in at least one of exhaust gas in the exhaust gas passageway upstream of the hydrogen enriching device and combustion gas in a state before undergoing the hydrogen ratio increasing by the hydrogen enriching means; and $[H2/TR]d$ is a ratio between a concentration $[H2]d$ of hydrogen and a concentration $[TR]d$ of total reducing components in exhaust gas in the exhaust gas passageway upstream of the NOx treating catalyst and downstream of the hydrogen enriching device. The concentration is represented by, for example, "ppm (parts per million)" or "percent by volume".

As discussed above, according to the exhaust gas purifying system of the present invention, the particular hydrogen enriching device (means) is disposed in the exhaust gas passageway upstream of the NOx treating catalyst so as to increase the rate of hydrogen in the exhaust gas. The exhaust gas having a particular composition enriched with hydrogen is supplied to the NOx treating catalyst, thereby effectively reducing NOx in exhaust gas. The combustion device is an internal combustion engine of an automotive vehicle, or may be burner, furnace or the like.

Here, the hydrogen enriching means (devices) includes all means or devices for increasing the rate (ratio) of hydrogen in exhaust gas in combustion gas and/or exhaust gas. The combustion gas is a gas within a combustion chamber or engine cylinder of the engine. The hydrogen enriching means includes the following means or devices:

(a) Means or device for producing hydrogen in combustion gas and/or exhaust gas;

(b) Means or device for decreasing the reducing components other than hydrogen in combustion gas and/or exhaust gas;

(c) Means or device for suppressing consumption of hydrogen in combustion gas and/or exhaust gas; and (d) Means or device for introducing hydrogen in combustion gas and/or exhaust gas.

The means (a), (b) and (c) is disposed in a passageway of combustion gas or exhaust gas and called an "inner system". In contrast, the means (d) is disposed outside the passageway and called an "outer system". In the exhaust gas purifying system of the present invention, the above-mentioned hydrogen enriching means (a), (b), (c) and (d) is used singly or in combination.

The above hydrogen producing means (a) is arranged to produce hydrogen in combustion gas and/or exhaust gas so as to increase an amount of hydrogen in the gas thereby positively increasing the concentration of hydrogen in the gas. The above reducing components decreasing means (b) is arranged to selectively decreasing the reducing components such as HC and CO in combustion gas and/or exhaust gas (i.e., preferentially decreasing the reducing components as compared with hydrogen) so as to increase the rate of hydrogen in the gas thereby positively increasing the hydrogen concentration in the gas. The above hydrogen consumption suppressing means (c) lowers a consumption rate of hydrogen in combustion gas and/or exhaust gas relative to that of other reducing components than hydrogen so as to increase the rate of hydrogen in the gas thereby positively increasing the hydrogen concentration in the gas. The above hydrogen introducing means (d) is arranged to supply hydrogen or gas containing hydrogen into combustion gas in the engine and/or exhaust gas in the exhaust gas passageway from the outside of the engine or the passageway so as to increase the rate of hydrogen in the gas thereby positively increasing the concentration of hydrogen in the gas.

The above-mentioned hydrogen enriching means (a), (b), (c) and (d) will be exemplified. Examples of the hydrogen generating means (a) are a hydrogen producing catalyst containing noble metals such as rhodium, for producing hydrogen (referred to as catalyst system), and combustion control means (referred to as combustion system) for controlling combustion in the combustion chamber, i.e., controlling fuel injection timing of a fuel injector valve, spark timing of a spark plug, and the like. Example of the reducing component decreasing means (b) is a CO and HC selective oxidation catalyst (referred to as catalyst system) for selectively oxidizing CO and HC. Example of the hydrogen consumption suppressing means (c) is a hydrogen consumption suppressing catalyst (referred to as catalyst system) containing solid acidic oxide. Examples of the hydrogen introducing means (d) are a hydrogen-contained gas supply system or device arranged to generate a gas containing hydrogen by using hydrocarbon fuel and air under the action of catalyst, and a bomb containing hydrogen (outer system).

While these hydrogen enriching means may be used freely in combination, it is sufficient that one of these hydrogen enriching means is used. An example of suitable combination of these hydrogen enriching means is the combination of the combustion control means (referred to as combustion system), the hydrogen producing catalyst, the HC and CO selective oxidation catalyst, and the catalyst containing solid acidic oxide (catalyst system), and the combination of the catalyst system and the hydrogen-contained gas supply device (outer system). Additionally, the hydrogen producing catalyst serving as the hydrogen enriching means of the catalyst system, the CO and HC selective oxidation catalyst and the catalyst containing solid acidic oxide are often used in combination in practical use. In place of use of these catalysts in combination, a catalyst having functions of two or three of these catalysts may be used. In the specification, the hydrogen producing catalyst, the CO and HC selective oxidation catalyst and/or the catalyst containing solid acidic oxide (serving as the hydrogen enriching means of the catalyst system) may be referred to as a "hydrogen enriching catalyst".

As discussed above, according to the exhaust gas purifying system of the present invention, when the NOx treating catalyst makes NOx reduction, the hydrogen enriching means carries out hydrogen enriching in such a manner that the hydrogen concentration [H2] and the total reducing components concentration [TR] in combustion gas and/or exhaust gas meet the relations represented by the following formulae (1) and (2), when reduction of NOx is carried out by the NOx treating catalyst:

$$[H2/TR]d > [H2/TR]u \quad (1)$$

$$[H2/TR]d \geq 0.3 \quad (2)$$

where [H2/TR]u is the ratio between a concentration [H2]u of hydrogen and the concentration [TR]u of total reducing components in exhaust gas in the exhaust gas passageway upstream of the hydrogen enriching device and/or in combustion gas in a state before undergoing the hydrogen ratio increasing by the hydrogen enriching means; and [H2/TR]d is the ratio between a concentration [H2]d of hydrogen and the concentration [TR]d of total reducing components in exhaust gas in the exhaust gas passageway upstream of the NOx treating catalyst and downstream of the hydrogen enriching device. By virtue of such hydrogen enriching, hydrogen is used effectively and intentionally as the reducing component, thereby effectively reducing NOx. The above-discussed hydrogen enriching means or device may be always operated or worked during operation of the engine. However, it is preferable from the view point of raising NOx reduction efficiency, that operation of the hydrogen enriching means is carried out in synchronism with NOx reduction of the NOx treating catalyst.

Next, discussion will be made on the effective or intentional use of hydrogen gas as the principle feature of the present invention.

First, it is known that exhaust gas from the engine contains HC, CO and $H_2$ as the main reducing components. In the technique disclosed in Japanese Patent No. 2600492, the NOx trap agent can trap NOx in a lean engine operating region and can release NOx in a rich engine operating region or by enriching air-fuel ratio of exhaust gas flowing to the NOx trap agent so as to reduce the released NOx. In this technique, mainly HC serves as the reducing component. In the lean engine operating region, the engine is supplied with an air-fuel mixture having an air-fuel ratio leaner (in fuel) than stoichiometric level thereby producing a lean exhaust gas atmosphere. In the rich engine operating region, the engine is supplied with an air-fuel mixture having an air-fuel ratio richer (in fuel) than the stoichiometric level thereby producing a rich exhaust gas atmosphere. The rich engine operating region may includes a stoichiometric engine operating range in which the engine is supplied with an air-fuel mixture having a generally stoichiometric air-fuel ratio.

Additionally, in a conventional technique using a NOx selective reduction catalyst for selectively reducing NOx, mainly HC is used as the reducing components. The NOx selective reduction catalyst is disclosed in "Science and Technology in Catalysis 1998, Page 363, Kodansha", and "TOCAT3 (1998), Page 49, Third Tokyo Conference on Advanced Catalytic Science and Technology 1998, Program and Abstracts".

However, these days, it has been eagerly desired to further reduce noxious exhaust gas components discharged from the internal combustion engine from the viewpoint of atmospheric environmental protection. In view of this, improvements in the internal combustion engine itself and in exhaust gas purification catalyst have been advanced including proposal of the above technique disclosed in Japanese Patent No. 2600492. However, in this conventional technique, the reducing components such as HC and CO are sharply decreased, and therefore no reducing component for accomplishing reduction of NOx exists in exhaust gas so as not to carry out sufficient NOx reduction. Consequently, in such a conventional technique, exhaust gas keeping therein HC and CO to some extent is required to be flown into a NOx treating catalyst; however, only a part of the remaining HC and CO is consumed by NOx reduction reaction the NOx treating catalyst. As a result, the other parts of the remaining HC and CO may remain unreacted, thereby making it impossible to accomplish exhaust gas purification at a further high level.

In contrast, in the exhaust gas purifying system of the present invention, mainly $H_2$ (hydrogen) is used as the reducing component in place of HC and CO which have been conventionally used as the reducing components, in which the hydrogen enriching means or device is operated to control hydrogen in such a manner as to meet the relationships represented by the following formulae (1) and (2) when reduction of NOx is carried out by the NOx treating catalyst:

$$[H2/TR]d > [H2/TR]u \quad (1)$$

$$[H2/TR]d \geq 0.3 \quad (2)$$

where [H2/TR]u is the ratio between a concentration [H2]u of hydrogen and the concentration [TR]u of total reducing components in exhaust gas in the exhaust gas passageway upstream of the hydrogen enriching device and/or in combustion gas in a state before undergoing the hydrogen ratio increasing by the hydrogen enriching means; and [H2/TR]d is the ratio between a concentration [H2]d of hydrogen and the concentration [TR]d of total reducing components in exhaust gas in the exhaust gas passageway upstream of the NOx treating catalyst and downstream of the hydrogen enriching device. Exhaust gas prepared as a result of operation of the hydrogen enriching means or device is supplied as an inlet gas to the NOx treating catalyst during NOx reduction through the exhaust gas passageway to the NOx treating catalyst, thereby obtaining a high NOx reduction efficiency. The "inlet gas" means exhaust gas located immediately upstream of the NOx treating catalyst and to be introduced into the NOx treating catalyst.

In this connection, as discussed after, exhaust gas discharged from an internal combustion engine or an exhaust gas purifying catalyst usually contains $H_2$ at a rate of [H2/TR]d<0.3, so that the rate is too small to use $H_2$ as reducing component. However, according to the present invention, this rate is enlarged so as to effectively use $H_2$ as the reducing component. Here, it is sufficient that a gas composition represented by Eq. (2) meets the relationship [H2/TR]d≧0.3; however, it is preferable that the gas composition meets the relationship [H2/TR]d≧0.5.

In the exhaust gas purifying system of the present invention, in addition to accomplishing the control for the formulae (1) and (2), it is preferable to accomplish such a control as to increase a ratio of hydrogen to carbon monoxide in the total reducing components in exhaust gas so as to meet the following relation represented by a formula [H2/CO]d>1, when reduction of NOx is carried out by the NOx treating catalyst. In the formula [H2/CO]d>1, [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of the hydrogen enriching device. This reduces influence of other reducing components (particularly CO) for impeding reaction between $H_2$ and NOx, thereby remarkably enhancing reactivity between $H_2$ having a high reducing action and NOx thus further improving NOx reduction efficiency.

It is to be noted that under the control realizing the gas composition represented by the formulae. (1) and (2), almost whole HC and CO can be oxidized in the exhaust gas passageway upstream of the NOx treating catalyst. As a result, according to the exhaust gas purifying system of the present invention, even if oxidation of HC and CO is not carried out in the NOx treating catalyst, a sufficiently high oxidation performance for HC and CO can be realized in the whole exhaust gas purifying system.

Next, discussion will be made in detail on the specificity of the composition of the reducing components flowing into the NOx treating catalyst, employed in the present invention, with reference to the above-mentioned formulae (1) and (2).

In general, the main components of exhaust gas discharged from an internal combustion engine are carbon dioxide ($CO_2$), carbon nonoxide (CO), water ($H_2O$), oxygen ($O_2$), hydrogen ($H_2$), hydrocarbons (HC), nitrogen oxides (NOx) and nitrogen ($N_2$). Particularly in case that a gasoline-fueled engine is used as an internal combustion engine, the weight rates or concentrations of emission gas components in exhaust gas around the stoichiometric engine operating range in which the engine is supplied with the air-fuel mixture having about stoichiometric air-fuel ratio are as follows: $CO_2$:about 12%, CO:0.3–1.0%, $H_2O$:about 13%, $O_2$:0.2–0.5%, $H_2$:0.1–0.3%, HC:0.03–0.08%, NOx:0.05–0.15%, and $N_2$:balance, as described in "Catalyst Lectureship: Industrial Catalyst Reaction II, Kodansha, page 193. Additionally, it has been known that the concentrations of the emission gas components are different depending on air-fuel ratios as shown in FIG. 1, which is disclosed in "New Automotive Gasoline Engine, Sankaido, page 103.

As will be understood from the above conventional descriptions, in general, the rate of $H_2$ contained in exhaust gas discharged from an internal combustion engine relative to whole reducing components (TR) including HC, CO and the like is [H2/TR]d≧0.3. It will be apparent from the above that the gas composition having the relationship of [H2/TR] d>0.3 realized by the hydrogen enriching means or device is specific or unique, in which particularly the hydrogen enriching means includes combustion control means or device for controlling fuel injection amount (amount of fuel injected from a fuel injector), fuel injection timing (timing at which fuel is injected from the fuel injector), spark timing (timing at which a spark plug generates spark), opening and/or closing timings of intake and/or exhaust valves.

In case that exhaust gas has about stoichiometric air-fuel ratio, the reducing components (HC, CO, $H_2$) and the oxidizing components ($O_2$, NOx) are generally balanced with each other, and therefore HC, CO and NOx are simultaneously reacted to accomplish oxidation and reduction by using a three-way catalyst, as described in "Catalyst Lectureship: Industrial Catalyst Reaction II, Kodansha, pages 193 and 194". However, by using such a conventional three-way catalyst, $H_2$ reacts with NOx to be consumed at the similar rate to that of other reducing components (HC, CO). Accordingly, [H2/TR] at a position downstream of the three-way catalyst unavoidably takes the generally same gas composition as that at a position upstream of the three-way catalyst, and therefore the gas composition having the relationships represented by the formulae (1) and (2) cannot be realized even if such a usual or conventional three-way catalyst is disposed upstream of the NOx treating catalyst.

In case that a usual or conventional oxidizing catalyst prepared by carrying noble metal components such as Pt, Pd, Pt—Pd on an oxide having a high specific surface area oxide (such as alumina) is disposed upstream of the NOx treating catalyst, only oxidation reaction preferentially proceeds so that $H_2$ decreases at the similar rate to that of other reducing components (HC, CO). As a result, [H2/TR] at the downstream position relative to the oxidizing catalyst becomes the same as that at the upstream position relative to the oxidizing catalyst, thereby making it impossible to realize the gas composition employed in the present invention. It will be apparent from this fact, that the gas composition having the relationship represented by the formulae (1) and (2) are specific or unique.

The fact that such a specific gas composition cannot be realized expresses that no control is accomplished for $H_2$ in an objective gas, and therefore NOx reduction reaction cannot be selectively promoted by using $H_2$ in the NOx treating catalyst as being intended by the present invention.

Subsequently, the hydrogen enriching means or device will be discussed in detail.

As discussed above, the examples of the hydrogen enriching means or device will be again listed. The examples of the hydrogen producing means (a) are the combustion control means (combustion system) and the hydrogen producing catalyst (catalyst system). The example of the reducing component (other than hydrogen) decreasing means (b) is the CO and HC selective oxidation catalyst (catalyst system). The example of the hydrogen consumption suppressing means (c) is the catalyst containing solid acidic oxide (catalyst system). The examples of the hydrogen introducing means (d) are the hydrogen-contained gas supply device and the bomb containing hydrogen (outer system).

Here, the example of the combustion control means are means for controlling the fuel injection amount, the fuel injection timing, the spark timing, and the opening and/or closing timings of the intake and/or exhaust valves, and means for controlling any combination of the above-listed amount and timings. The combustion control means includes means for mainly making partial oxidation of HC and denaturation of CO (reaction between CO and water) in combustion gas and/or exhaust gas.

It is sufficient that the examples of the hydrogen producing catalyst are catalysts which function to produce hydrogen from HC and CO in combustion gas and/or exhaust gas, and therefore include catalysts containing noble metals such as Pt, Pd and/or Rh, and catalysts containing any combination of these noble metals. In case that only one noble metal is used in each of the catalysts, it is most preferable that each of the catalysts contains Rh.

The example of the reducing component (other than hydrogen) decreasing means (b) is the CO and HC selective oxidation catalyst (catalyst system) which selectively oxidizes CO and HC thereby producing $H_2$ and therefore contains zirconium oxide. The zirconium oxide contains alkaline earth metal and preferably has a composition represented by the following general formula (3):

$$[X]aZrbOc \qquad (3)$$

where X is an alkaline earth metal selected from the group consisting of magnesium, calcium, strontium and barium; a and b are ratios of atoms of elements; and c is a number of oxygen atoms required for satisfying valences of X and Zr, in which a is within a range of from 0.01 to 0.5, b is within a range of from 0.5 to 0.99, and a+b=1.0.

If a is smaller than 0.01 in the formula (3), reforming effect of the added elements (alkaline earth metals) to zirconium oxide cannot be sufficiently obtained. If a exceeds 0.5, catalytic action may deteriorate at high temperatures thereby lowering catalytic activity. If a+b exceeds 1.0, structural stability of zirconium oxide may lower, which is not desirable.

The CO and HC selective oxidation catalyst formed of zirconium oxide may be used together with the hydrogen producing catalyst, preferably Rh. This maintains electron condition of Rh suitable so that $H_2$ can be effectively produced thereby further promoting hydrogen enriching. In this case, it is preferable that Rh is used in an amount ranging from 0.01 to 10 g per one liter of a carrier (monolithic carrier). If the amount is less than 0.01 g per one liter of the carrier, effect of increasing the rate of $H_2$ components by Rh cannot be sufficiently obtained. If the amount exceeds 10 g per one liter of the carrier, the increasing effect of $H_2$ component rate is saturated. Additionally, in such a case that the CO and HC selective oxidation catalyst formed of zirconium oxide may be used together with the hydrogen producing catalyst such as Rh, if a+b exceeds 1.0 in the zirconium oxide represented by the formula (3), the added alkaline earth metal is deposited at the surface of the catalyst, which may lower the catalytic activity of rhodium.

Such a CO and HC selective oxidation catalyst (catalyst system) which selectively oxidizes CO and HC to produce $H_2$ may contain Pd and cerium oxide to form a composition including the zirconium oxide represented by the formula (3), Ph, Pd and cerium oxide, thereby selectively oxidizing unburned HC and CO and increasing the rate of $H_2$ component. In this case, it is preferable that 20 to 80% by weight of palladium of total amount of palladium in the catalyst is carried on this cerium oxide. If the amount of palladium carried on the cerium oxide is less than 20% by weight, the increasing effect of $H_2$ component is insufficient. If the amount of palladium carried on the cerium oxide exceeds 80% by weight, dispersibility of Pd is degraded thereby lowering catalytic activity of the catalyst. Additionally, the amount of palladium used in the catalyst is within a range of from 0.01 to 50 g per one liter of the carrier (monolithic carrier). If the amount of palladium is less than 0.01 g per one liter of the carrier, the improvement effect of selectively oxidizing unburned HC and CO and increasing the rate of $H_2$ component cannot be sufficiently obtained. If the amount of palladium exceeds 50 g per one liter of the carrier, the same improvement effect is saturated.

Next, an example of the catalyst containing solid acidic oxide (or hydrogen consumption suppressing catalyst for selectively oxidizing HC and CO) is a catalyst containing solid acidic zirconium oxide which contains at least one element selected from the group consisting of titanium, aluminum tungsten, molybdenum and zinc and preferably represented by the following general formula (4):

$$[Y]_d Zr_e O_f \quad (4)$$

where Y is at least one element selected from the group consisting of titanium, aluminum, tungsten, molybdenum and zinc; d and e are ratios of atoms of elements; and f is a number of oxygen atoms required for satisfying valences of Y and Zr, in which d is within a range of from 0.01 to 0.5, e is within a range of from 0.5 to 0.99, and d+e=1.0.

If d is less than 0.01 in the above formula (4), reforming effect of the added elements such as titanium cannot be sufficiently obtained. In contrast, if d exceeds 0.5, catalytic action may deteriorate at high temperatures thereby lowering catalytic activity. If a+b exceeds 1.0, structural stability of zirconium oxide may lower.

Additionally, this hydrogen consumption suppressing catalyst may be used together with the hydrogen producing catalyst, particularly Pt. This can effectively provide $H_2$ in the gas whose $H_2$ component rate has been increased, to the NOx treating catalyst. In this case, in order to effectively suppress consumption of $H_2$, it is preferable that Pt is carried on the zirconium oxide represented by the formula (4), in which Pt is carried preferably in an amount ranging from 10 to 30% by weight of total amount of Pt in the catalyst. If the amount of Pt is less than 10% by weight, consumption suppressing effect to produced $H_2$ cannot be sufficiently obtained. On the contrary, if the amount of Pt exceeds 30% by weight, the same consumption suppressing effect is saturated. Further, it is preferable that the amount of Pt used in the catalyst is within a range of from 0.01 to 25 g per one liter of the carrier (monolithic carrier). If the amount of Pt is less than 0.01 per one liter of the carrier, the improvement effect of selectively oxidizing and removing HC and CO and increasing the rate of $H_2$ component cannot be sufficiently obtained. On the contrary, if the amount of Pt exceeds 25 g per one liter of the carrier, the same improvement effect is saturated.

Furthermore, in such a case that the hydrogen consumption suppressing catalyst formed of zirconium oxide may be used together with the hydrogen producing catalyst such as Rh, if a+b exceeds 1.0 in the zirconium oxide represented by the formula (4), the added element such as titanium is deposited at the surface of the catalyst, which may lower the catalytic activity of Pt and is not desirable.

Here, catalytic structure of the catalyst in which the hydrogen producing catalyst or the like is used together with the CO and HC selective oxidation catalyst or the like will be discussed in detail. In case of using the hydrogen producing catalyst as an example of the hydrogen enriching means in combination of other catalyst components in the exhaust gas purifying system of the present invention, a monolithic carrier of one-piece structure or the like is preferably used to form a monolithic catalyst, in which the carrier is formed with a plurality of exhaust gas passages extending from an upstream-side end to a downstream-side end with respect to flow of exhaust gas from the engine. It is preferable that a catalyst component for oxidizing HC and CO and decreasing oxygen is disposed in the exhaust gas passages at an upstream section including the upstream-side end, whereas a catalyst component for producing hydrogen is disposed in the exhaust gas passages at a downstream section including the downstream-side end, so that the amount of oxygen which will be brought into contact with the hydrogen producing catalyst component can be decreased. In such a monolithic catalyst, in order to smoothly cope with change in space velocity, temperature and the like, it is preferable that the catalyst component for oxidizing HC and CO and decreasing oxygen at the upstream section is Pd and/or Pt, and alumina (as carrier) if necessary. In this case, it is preferable that the catalyst contains Pd and/or Pt in an amount ranging from 0.1 to 50 g per one liter of the monolithic carrier. If the content of Pd and/or Pt is less than 0.1 g per one liter of the carrier, a sufficient catalytic activity cannot be obtained. On the contrary, if the content of Pd and/or Pt exceeds 50 g per one liter of the carrier, catalytic activity of the catalyst is saturated.

Additionally, it is preferable that the catalyst component for producing hydrogen at the downstream section includes Rh and zirconium oxide (including those represented by the formulae (3) and (4)). In order to smoothly cope with change in space velocity, temperature and the like, the catalyst preferably contains Rh in an amount ranging from 0.1 to 50 g per one liter of the monolithic carrier, and zirconium oxide in an amount ranging from 10 to 300 g per one liter of the monolithic carrier. If the content of Rh is less than 0.1 g per one liter of the carrier, a sufficient catalytic activity cannot be obtained. On the contrary, if the content of Rh exceeds 50 g per one liter of the carrier, catalytic activity of the catalyst is saturated. Additionally, if the content of zirconium oxide is less than 5 g per one liter of the carrier, improvement effect of the catalytic performance of rhodium cannot be sufficiently obtained. On the contrary, if the content of zirconium oxide exceeds 100 g per one liter of the carrier, the catalytic activity of the catalyst is saturated.

As such zirconium oxide, the zirconium oxide containing alkaline earth metal as represented by the formula (3) may be used so as to maintain the electronic condition of Rh suitable thereby effectively producing $H_2$. Furthermore, the catalyst component for producing hydrogen at the downstream section may includes Pd and cerium oxide (as carrier) so as to maintain the electronic condition of Pd suitable thereby further effectively promoting production of $H_2$. In this case, it is preferable that the catalyst contains Pd in an amount ranging from 0.01 to 50 g per one liter of the monolithic carrier, and cerium oxide in an amount ranging from 10 to 300 g per one liter of the monolithic carrier. If the content of Pd is less than 0.01 g per one liter of the carrier, a sufficient catalytic activity cannot be obtained. On the contrary, if the content of Pd exceeds 50 g per one liter of the carrier, the catalytic activity of the catalyst is satisfied. Additionally, if the content of cerium oxide is less than 10 g per one liter of the carrier, improvement effect of the catalytic performance cannot be sufficiently obtained. On the contrary, if the content of cerium oxide exceeds 300 g per one liter of the carrier, the catalytic activity is saturated.

Figure 15A:
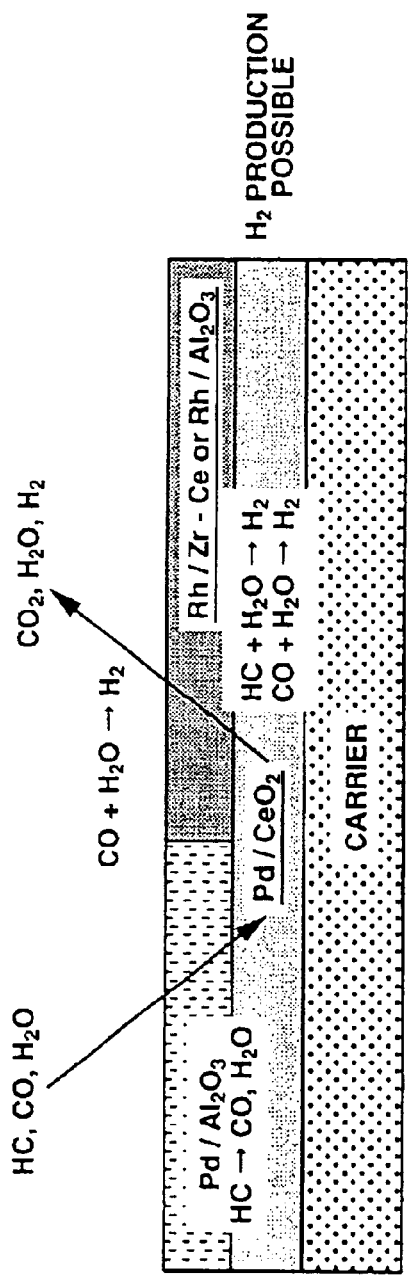
FIG. 15A is a schematic sectional view of an example of a washcoat layer structure of a catalyst, which is suitable for production of hydrogen.
Figure 15B:
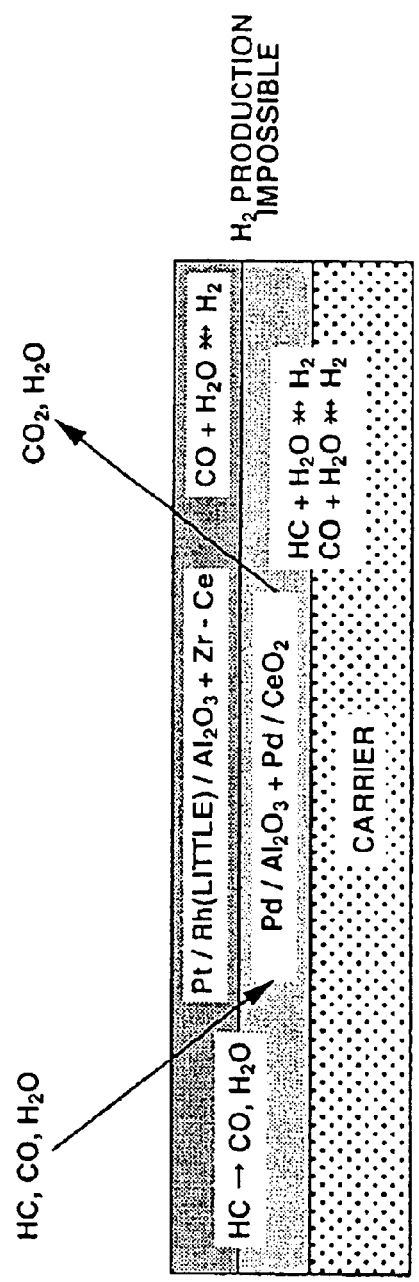
FIG. 15B is a schematic sectional view of another example of a washcoat layer structure of a catalyst, which is not suitable for production of hydrogen.

A concrete example of the hydrogen consumption suppressing catalyst is schematically and fragmentarily illustrated in FIG. 15A, in which three-way catalysts are used in combination and disposed in such a manner as to make it possible to promote production of hydrogen and to effectively suppress consumption of hydrogen. In contrast, in case where Pt, Pd, Rh and the like which have been conventionally used as catalytic components of three-way catalysts, and alumina, cerium oxide and zirconium oxide are disposed as usual as shown in FIG. 15B; however, consumption of hydrogen simultaneously proceeds. As a result, the hydrogen use intended by the present invention cannot be realized. In FIG. 15B, a symbol z,1 in reaction formula indicates that the reaction is difficult to be occurred, production of hydrogen occurs in reaction process.

It will be understood that a variety of the above hydrogen enriching means or devices can be used in combination as discussed above in the exhaust gas purifying system of the present invention. In this regard, the combination of the above combustion control means (device) and the hydrogen enriching means (device) of the catalyst system (for example, the hydrogen producing catalyst, the HC and CO selective oxidation catalyst and/or the hydrogen consumption suppressing catalyst) are effective to accomplish hydrogen use intended by the present invention. More specifically, the fuel injection amount, the fuel injection timing, the spark timing and/or the opening and/or closing timings of the intake and/or exhaust valves of the objective internal combustion engine are controlled by the above-discussed combustion control means or device in such a manner that combustion gas and/or exhaust gas flown into the hydrogen enriching means of the catalyst system is regulated into a rich (in reducing components) condition so as (corresponding to the rich engine operating region) so as to intermittently take a so-called Z value not higher than 1.0. As a result, the efficiency of production of $H_2$ can be further improved, thereby making it possible to easily realize the gas composition of combustion gas and/or exhaust gas represented by the formulae of $[H2/TR]d>[H2/TR]u$, $[H2/TR]d \geq 0.3$ and $[H2/CO]d>1$. The Z value is a ratio between oxidizing agent and reducing agent and represented by $[O2] \times 2 + [NO]/[H2] \times 2 + [CO] + [HC] \times \alpha$ where [O2], [NO], [H2], [CO] and [HC] indicate respectively concentrations of $O_2$, NO, $H_2$, CO and HC; and $\alpha$ indicates an coefficient determined depending upon kinds of HC.

Next, an example of the hydrogen-contained gas supply device as the hydrogen introducing means (d) is a device for supplying hydrogen-contained gas produced by using hydrocarbon fuel and air (or oxygen), into the exhaust gas passageway from the outside of the exhaust gas passageway. This hydrogen-contained gas supply device includes a catalyst (hydrogen-contained gas producing catalyst) which promotes reaction for producing hydrogen-contained gas from hydrocarbon fuel such as gasoline or light oil (diesel fuel), means or device for supplying the hydrocarbon fuel and means or device for supplying air. Examples of the hydrogen-contained gas producing catalyst are Rh, Ru, Cu—Ni double oxide, Pd-carried ZrO and the like. The device for supplying the hydrocarbon fuel and air is provided independently or may be provided serving also as another device. Examples of such a supplying device are a feed pump or a suction pump.

Additionally, since exhaust gas discharged from the internal combustion engine contains air (oxygen), it is possible to produce hydrogen-contained gas from hydrocarbon fuel in presence of the hydrogen-contained gas producing catalyst, using exhaust gas. By this technique, fuel and exhaust gas in the internal combustion engine are used, and therefore a special device is unnecessary to be provided. Further, exhaust gas and heat of exhaust gas can be effectively used, thereby realizing a low production cost and a high energy efficiency.

Further, in this hydrogen-contained gas producing device, it is preferable that an oxygen (concentration) sensor is disposed upstream of the hydrogen-contained gas producing catalyst, while a temperature sensor for detecting a temperature of the hydrogen-contained gas producing catalyst is disposed downstream of the hydrogen-contained gas producing catalyst, in which an amount of the hydrocarbon fuel and the air to be supplied is controlled in accordance with a temperature of the catalyst. In this case, when the catalyst temperature is lower than a predetermined level, a control is made such that the amount of the fuel to be supplied from the fuel supplying device is decreased while increasing the amount of air to be supplied from the air supplying device so as to increase the concentration of oxygen in exhaust gas. Such a control can facilitate the control of reaction temperature on the catalyst. The predetermined level of the catalyst temperature is determined in accordance with kind of the catalyst and the like, and typically within a range of from 260 to 380° C.

Furthermore, the hydrogen-contained gas supply device is provided with means for temporarily trapping the produced hydrogen-contained gas. This can facilitate supply of hydrogen-contained gas at a certain timing, for example, at a timing concurrent with NOx reduction made on the NOx treating catalyst disposed downstream of the hydrogen-contained gas supply device or system. Examples of the hydrogen-contained gas temporarily trapping means are a variety of bombs (containers), a hydrogen storage alloy, a carbon nanotube. The hydrogen storage alloy and the carbon nano-tube can trap and release hydrogen-contained gas by controlling temperature and pressure.

Next, the NOx treating catalyst will be discussed in detail.

It is sufficient that the NOx treating catalyst is disposed downstream of a variety of the hydrogen enriching means as discussed above so as to function to reduce NOx in the presence of the reducing components such as hydrogen, and therefore is not limited to particular ones. The NOx treating catalyst includes a NOx trap catalyst and a NOx selective reduction catalyst. The NOx trap catalyst contains a mixture of a first component selected from the group consisting of alumina (as carrier), alkali metal and alkaline earth metal and a second component (noble metal) selected from the group consisting of Pt, Pd and Rh. The NOx trap catalyst is disclosed in Japanese Patent No. 2600492, and in "International Symposium on Surface Nano-control of Environmental Catalysts and Related Materials ($6^{th}$ Iketani Conference), Tokyo, 1996, Page 74". The NOx selective reduction catalyst contains a mixture of a first component selected from the group consisting of copper (Cu), cobalt (Co), Nickel (Ni), iron (Fe), gallium (Ga), lanthanum (La), cerium (Ce), zinc (Zn), titanium (Ti), calcium (Ca), barium (Ba) and silver (Ag), and a second component selected from the group consisting of platinum (Pt), iridium (Ir) and rhodium (Rh). The NOx selective reduction catalyst is disclosed in "Science and Technology in Catalysis 1998, Page 363, Kodansha", and "TOCAT3 (1998), Page 49, Third Tokyo Conference on Advanced Catalytic Science and Technology 1998, Program and Abstracts".

The former NOx trap catalyst is preferable as a catalyst which can very effectively use $H_2$ as the reducing component. Accordingly, the NOx trap catalyst is preferably used in the exhaust gas purifying system of the present invention. In this case, it is preferable that cesium (Cs) is used as the alkali metal; and magnesium (Mg), calcium (Ca), strontium (Sr) and/or barium (Ba) are used as alkaline earth metal. It is preferable that the NOx trap catalyst contains alkaline and/or alkaline earth metal in an amount ranging from 10 to 70 g per one liter of the carrier (monolithic carrier). If the amount is less than 10 g per one liter of the carrier, a sufficient NOx reduction performance cannot be obtained. On the contrary, if the amount exceeds 70 g per one liter of the carrier, the NOx reduction performance may be lowered.

It is also preferable that the NOx trap catalyst contains noble metals such as Pt, Pd and/or Rh in an amount ranging from 0.01 to 25 g per one liter of the carrier. If the amount is less than 0.01 g per one liter of the carrier, a sufficient NOx reduction performance cannot be obtained. On the contrary, if the amount exceeds 25 g per one liter of the carrier, a catalytic activity is saturated.

In preparing the NOx trap catalyst, alkali metal and/or alkaline earth metal can be carried on the carrier (monolithic carrier) by a variety of methods such as an impregnation process in which the metal(s) are impregnated by using solution of water-soluble salt(s) such as acetate of the metal(s), or a blending process in which slightly soluble or insoluble salts such as carbonate or sulfate of the metal(s) are blended into a water-soluble slurry so as to be mixed in a catalytic coat or washcoat layer formed on the carrier.

In the exhaust gas purifying system of the present invention, it is preferable that a variety of the above-mentioned catalyst components or metals are carried on the monolithic carrier which is formed of ceramic such as cordierite, or formed of metal such as ferrite stainless steel.

The catalytic coat layer is formed on the monolithic carrier and includes porous substrate material (carrier) on which the catalytic component(s) or metal(s) are supported. The porous substrate material is preferably alumina, silica-alumina and/or zeolite. Additionally, it is more preferable that the porous substrate material is activated alumina having a specific surface area ranging from 50 to 300 $m^2/g$. Furthermore, it is preferable to add rare earth element(s), zirconium and/or the like to the porous substrate material for the purpose of improving heat resistance of the porous substrate material so as to suppress lowering in specific surface area of the porous substrate material. The amount of the porous substrate material used in the catalyst is within a range of from 50 to 300 g per one liter of the carrier (such as the monolithic carrier).

EXAMPLES

The present invention will be more readily understood with reference to the following Examples in comparison with Comparative Examples; however, these Examples are intended to illustrate the invention and are not to be construed to limit the scope of the invention.

Example 1-1

[Preparation of Upstream-Side Catalyst (Hydrogen Enriching Means of Catalyst System)]

Activated alumina powder was impregnated with an aqueous solution of palladium nitrate containing a certain amount of palladium, and then dried at 150° C. for 12 hours. Thereafter, the thus impregnated activated alumina powder was fired 400° C. for 1 hour thereby to form Pd-carried alumina powder (Powder A) whose concentration of Pd carried was 15.0% by weight.

Then, a porcelain ball mill was charged with 800 parts by weight of Powder A, 1000 parts (20% by weight as calculated as solid content) by weight of alumina sol, and 500 parts by weight of pure water, followed by mixing and pulverizing, thereby obtaining a slurry. The slurry was coated on an upstream-side section of a cordierite ceramic honeycomb-type monolithic carrier having a volume of 1.3 liters and 900 cells per square inch and having a thickness of walls (defining each cell) of 2 mil so that walls of cells were coated with the slurry. The upstream-side section had a length of ⅓ of total length of the carrier and had an inlet end through which exhaust gas would be flown in. Thereafter, the coated monolithic carrier was blown with air stream to remove excessive slurry in the cells, and then dried and fired at 500° C. for 1 hour.

Powder of zirconium oxide containing calcium ($Ca_{0.2}Zr_{0.8}O_2$) was impregnated with an aqueous solution of rhodium nitrate containing a certain amount of rhodium, and then dried at 150° C. for 12 hours and fired at 400° C. for 1 hour thereby forming Rh-carried zirconia powder (Powder B) whose concentration of Rh carried is 5.0% by weight.

A porcelain ball mill was charged with 800 parts by weight of Powder B, 1000 parts (20% by weight as calculated as solid content) by weight of alumina sol and 500 parts by weight of pure water, followed by mixing and pulverizing the content of the ball mill, thereby obtaining a slurry. The slurry was coated on a downstream-side section of the cordierite ceramic honeycomb-type monolithic carrier so that the walls of the cells were coated with the slurry. The downstream-side section had a length of ⅔ of total length of the carrier and included an outlet end through which exhaust gas would be discharged. Thereafter, the coated monolithic carrier was blown with air stream to remove excessive slurry in the cells, and then dried and fired at 500° C. for 1 hour.

Figure 9:
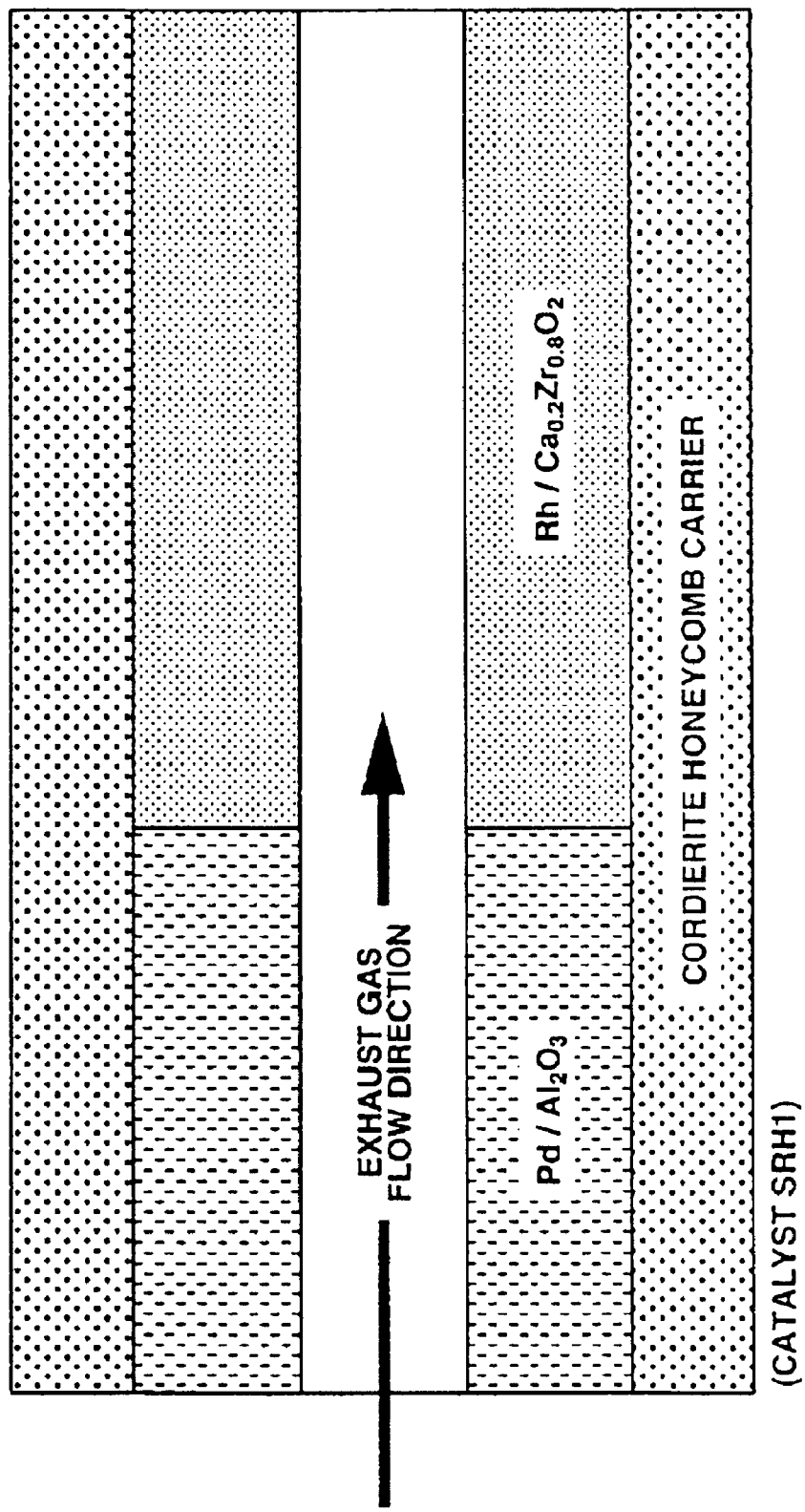
FIG. 9 is a schematic sectional view of a washcoat layer structure of a catalyst serving as a hydrogen enriching device of the exhaust gas purifying system according to the present invention.

Thus, a catalyst SRH1 was prepared in which a catalytic coat layer was formed on the wall of the cells of the monolithic carrier. The weight of the catalytic coat layer was 272 g per one liter of the monolithic carrier. The catalytic coat layer included a former stage containing Pd and formed on the upstream-side section of the monolithic carrier, and a latter stage containing Rh and formed on the downstream-side section of the monolithic carrier. The prepared catalyst contained 18.6 g of noble metals carried per one liter of the monolithic carrier, in which the contents of Pd and Rh were 11.5 g and 7.1 g, respectively, per one liter of the monolithic carrier. Composition (carried amount "g/l." of noble metals) and structure of the prepared catalyst are shown in Tables 1A–1B in which "First layer", "Second layer", "Third layer" and "Fourth layer" respectively indicate layers of washcoats formed on the monolithic carrier, as seen from FIGS. 10 and 13. The washcoat (catalytic coat) layer structure of the catalyst SRH1 is shown in FIG. 9.

[Preparation of NOx Treating Catalyst]

Activated alumina powder was impregnated with an aqueous soulution of palladium (Pd) nitrate. The impregnated activated alumina was dried and then fired in air at 400° C. for 1 hour thereby to form Pd-carried activated alumina powder (Powder C). This powder had a Pd concentration of 5.0% by weight.

Further, activated alumina powder was impregnated with an aqueous solution of rhodium (Rh) nitrate. The impregnated activated alumina was dried and then fired in air at 400° C. for 1 hour thereby to form Rh-carried activated alumina powder (Powder D). This powder had a Rh concentration of 3.0% by weight.

A porcelain ball mill was charged with 347 g of the Powder C, 58 g of the Powder D, 496 g of alumina powder, and 900 g of water. The content of the ball mill was mixed and pulverized for 1 hour thereby to form a slurry. This slurry was coated on a cordierite ceramic honeycomb-type monolithic carrier having a volume of 1.3 liters and 400 cells per square inch and having a thickness of walls (defining each cell) of 6 mil, in which walls of the cells were coated with the slurry. Then, the coated monolithic carrier was blown with air to remove excessive slurry in the cells under the action of air stream. Thereafter, the coated monolithic carrier was dried at 130° C. and then fired at 400° C. for 1 hour thereby to form a catalyst (NR0) provided with a catalytic coat layer having a weight of 200 g per one liter of the monolithic carrier.

Figure 14:
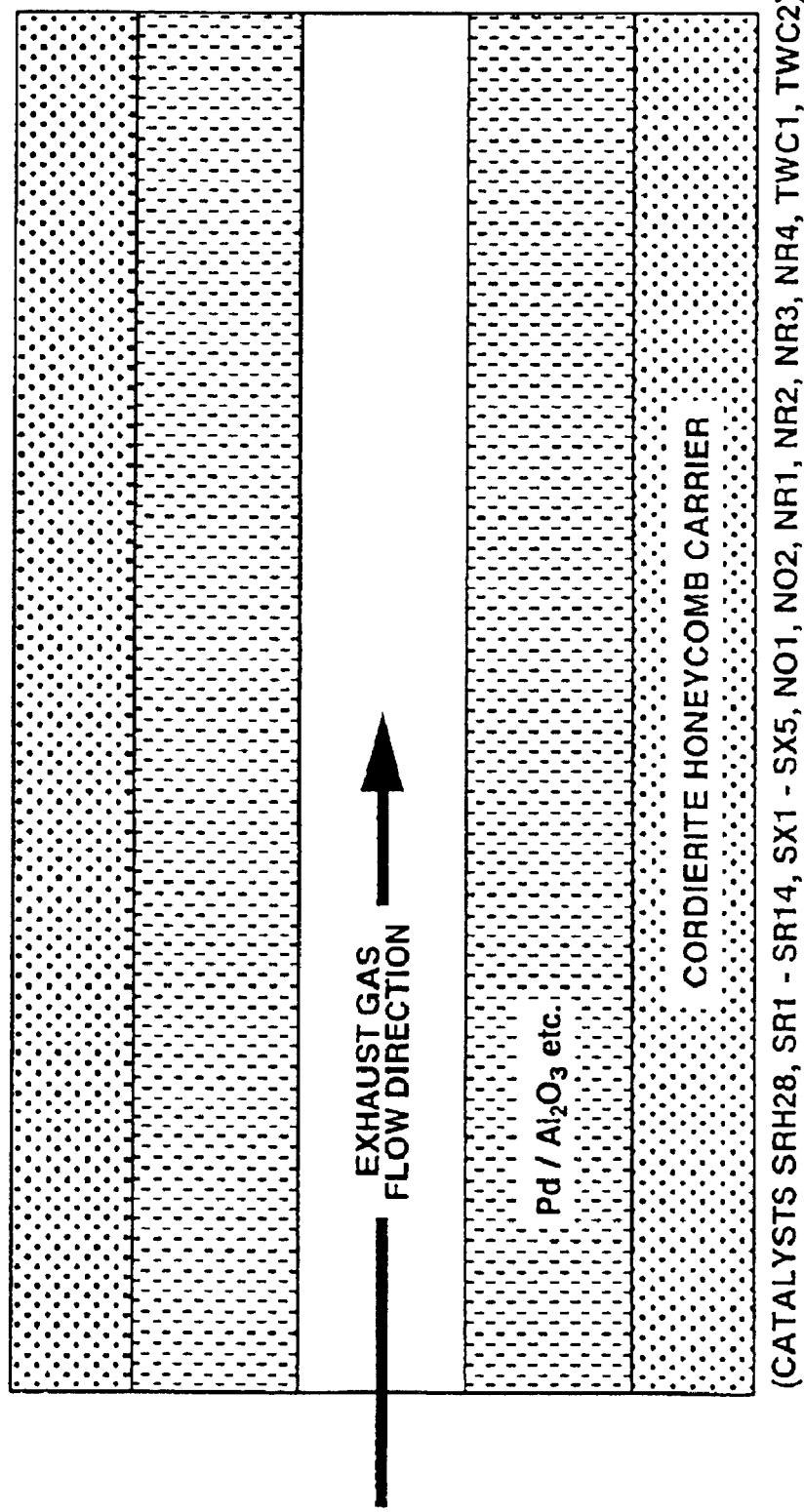
FIG. 14 is a schematic sectional view of a further washcoat layer structure of a catalyst serving as a hydrogen enriching device of the exhaust gas purifying system according to the present invention.

Thereafter, the catalyst NR0 was impregnated with an aqueous solution of barium acetate thereby to form a catalyst NR1 which contained 35 g of BaO per one liter of the monolithic carrier. The washcoat (catalytic coat) layer structure of the catalyst NR1 is shown in FIG. 14. Composition (carried amount "g/l." of noble metals) and structure of the prepared catalyst are shown in Tables 1A–1B

[Construction of Exhaust Gas Purifying System]

Example 7-1

Figure 2:
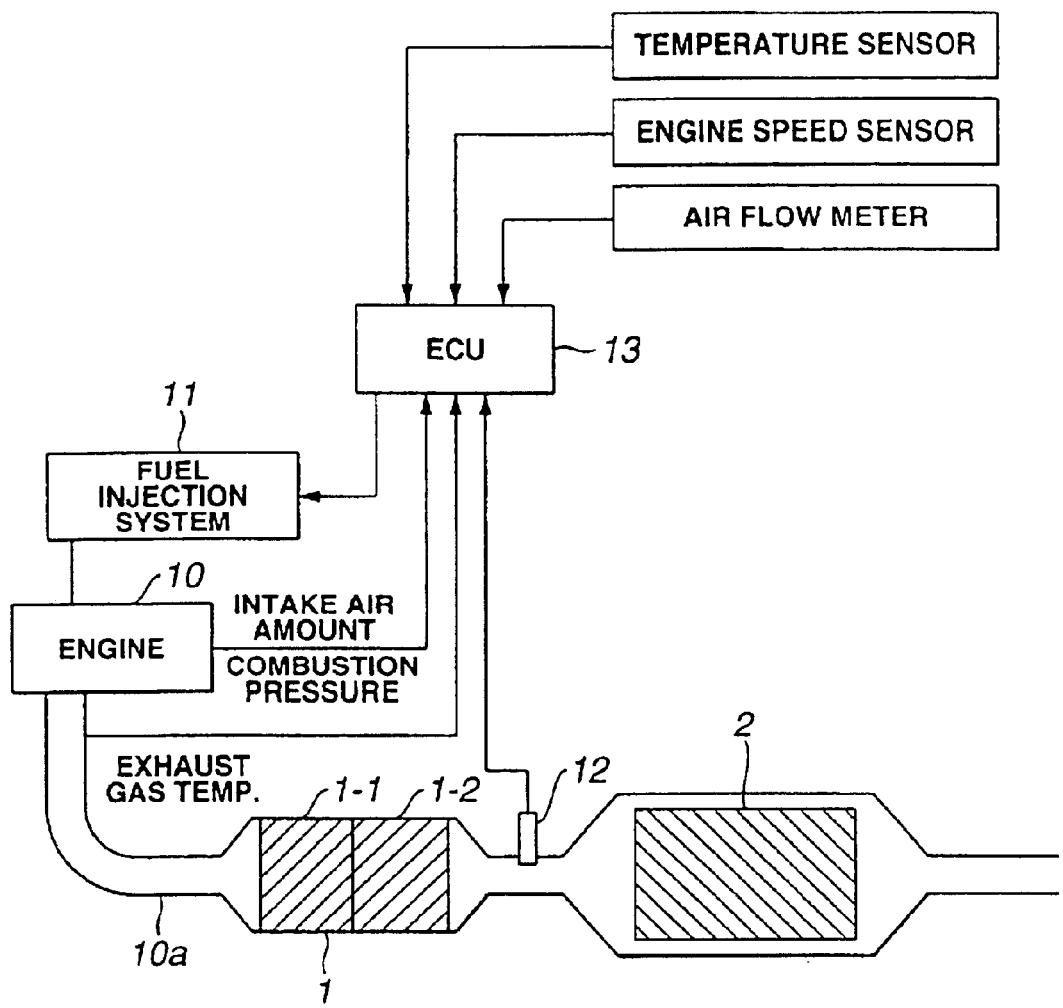
FIG. 2 is a schematic illustration of an embodiment of an exhaust gas purifying system according to the present invention.

As shown in FIG. 2, an embodiment of the exhaust gas purifying system was constructed by providing a hydrogen enriching catalyst 1 (catalyst SRH1) disposed in an exhaust gas passageway 10a of an internal combustion engine 10 of an automotive vehicle. The hydrogen enriching catalyst 1 was arranged to selectively oxidize and remove unburned HC and CO in exhaust gas discharged from the engine 10 thereby increasing the rate (ratio) of $H_2$ component in exhaust gas. Additionally, a NOx treating catalyst 2 (catalyst NR1) was disposed in the exhaust gas passageway 10a downstream of the hydrogen enriching catalyst 1. Thus, the exhaust gas purifying system of Example 1-1 was constructed.

Additionally, in the exhaust gas purifying system of Example 1-1, hydrogen enriching means (hydrogen supply means) of the combustion system was also used in addition to the hydrogen enriching means 1 of the catalyst system. The hydrogen enriching means of the combustion system included a fuel injection system 11 for injecting fuel into the engine 10, an oxygen ($O_2$) sensor 12 for detecting concentration of $O_2$ in exhaust gas, and an ECU (electronically control unit) 13 for controlling combustion condition of the engine in accordance with a variety of engine operating parameters. The exhaust gas purifying system further included an exhaust gas temperature sensor (not shown) for detecting a temperature of exhaust gas, an intake air amount sensor (not shown) for detecting an amount of intake air to be sucked into the engine, and gas concentration sensors (not shown) for detecting concentration of gas components in combustion gas and/or exhaust gas.

The outline of the exhaust gas purifying system of Example 1-1 is shown in Tables 2A–2D.

[Hydrogen Enriching Means of Combustion system]

As shown in FIG. 2, the electronic control unit (ECU) 13 was arranged to control combustion condition of the engine 10 through the fuel injection system 11 in accordance with data signals fed from the oxygen sensor 12 and other sensors, in such a manner that the composition (the rate of $H_2$:[H2/TR]d) of an inlet gas (or gas to be introduced into the NOx treating catalyst 2) of the NOx treating catalyst 2 is controlled at a desired value. In such a control for the inlet gas composition, the fuel injection system 11, the oxygen sensor 12 and other sensors function as the hydrogen supply means as discussed below.

Figure 3:
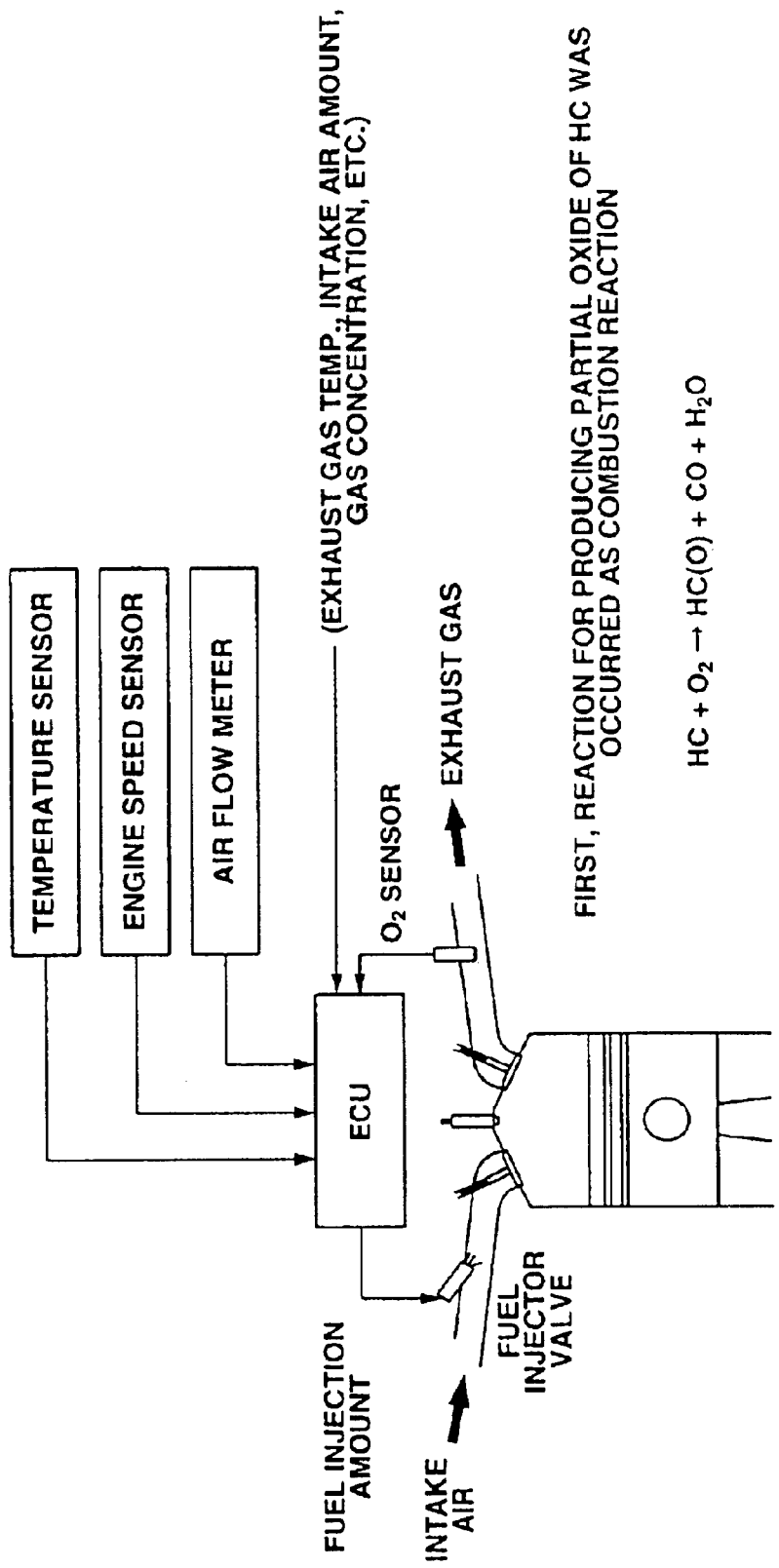
FIG. 3 is a schematic illustration showing a part of an idea of control of gas composition, in connection with the exhaust gas purifying system of FIG. 2.
Figure 4:
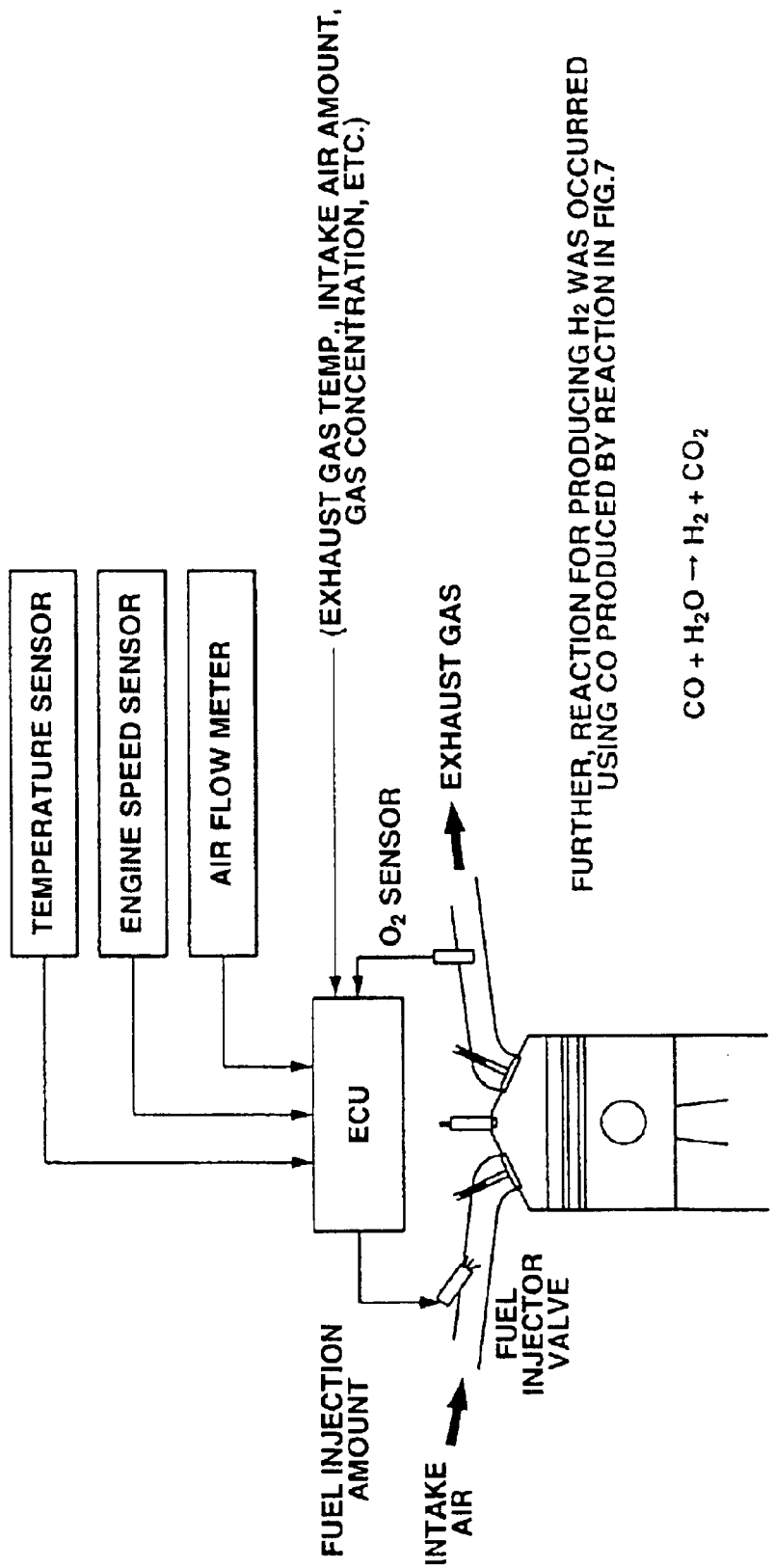
FIG. 4 is a schematic illustration showing another part of the idea of control of a gas composition, in connection with the exhaust gas purifying system of FIG. 2.

As illustrated in FIG. 3, first, HC and $O_2$ in combustion gas (within each combustion chamber of the engine) are reacted to form partially oxidized compounds. Then, as illustrated in FIG. 4, CO and $H_2O$ in combustion gas are reacted to form $H_2$. Such control of gas composition of combustion gas due to denaturation of HC and CO are accomplished by controlling concentration of gas components in combustion gas and/or exhaust gas, and by controlling temperature and pressure of combustion gas. More specifically, the control of the composition (gas composition) of combustion gas and/or exhaust gas is carried out by controlling the fuel injection amount, the fuel injection timing, the spark timing, and the opening and closing timings of the intake and exhaust valves respectively at suitable values.

[Control of Gas Composition]

Figure 5:
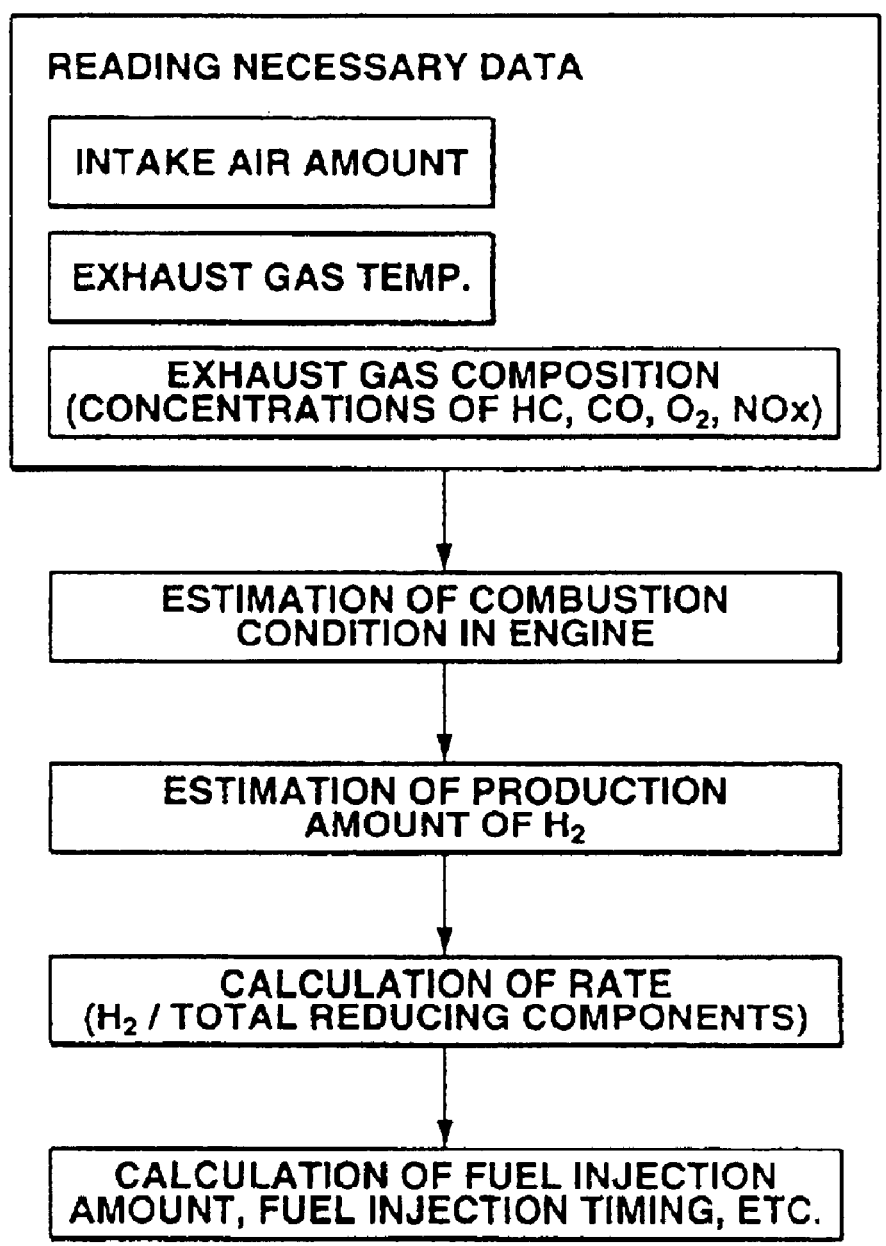
FIG. 5 is a rough flowchart showing the control of the gas composition in connection with the exhaust gas purifying system of FIG. 2.
Figure 6:
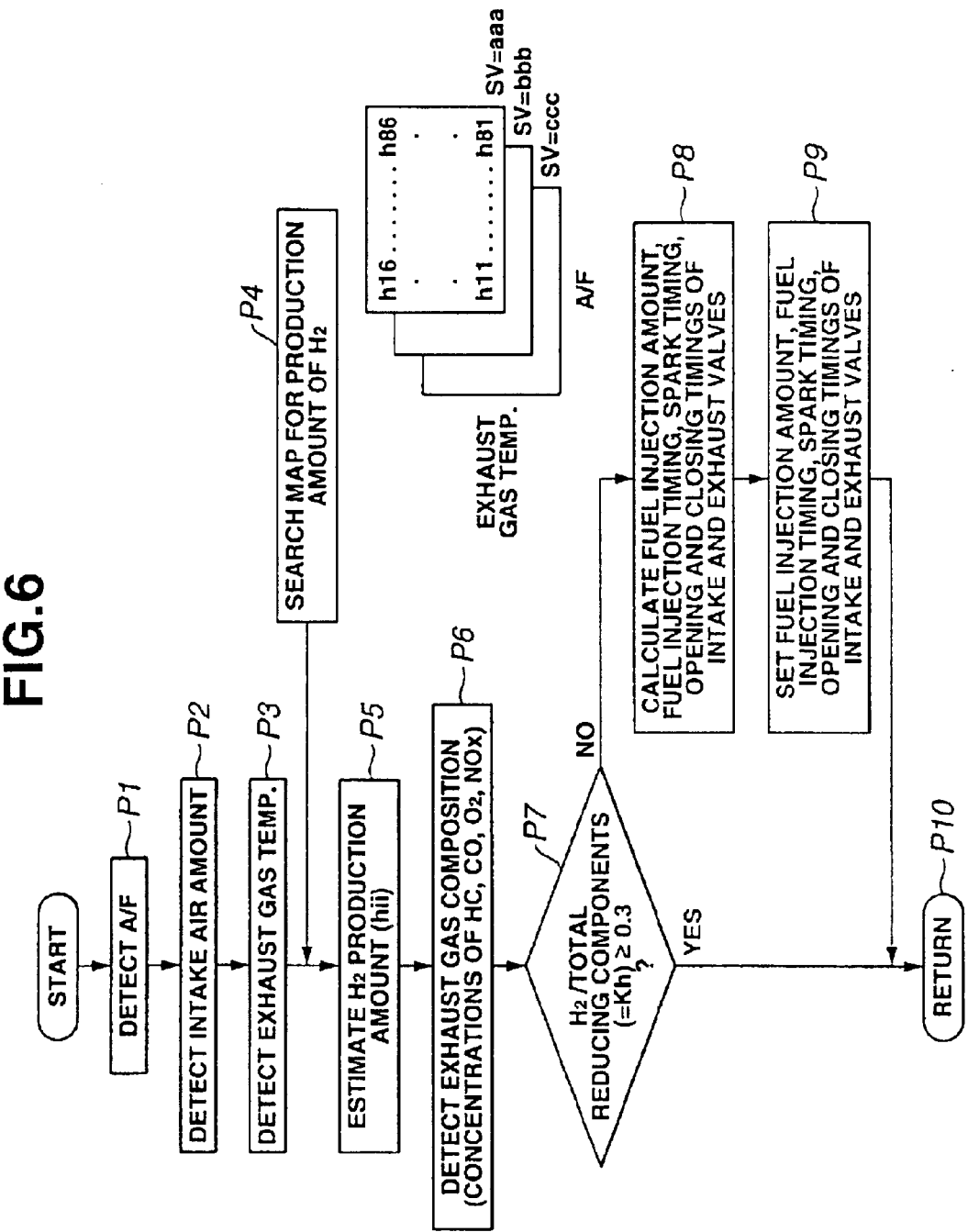
FIG. 6 is a flowchart of an example of the control of the gas composition in connection with the exhaust gas purifying system of FIG. 2.

A manner of control of the gas composition (the rate of $H_2$) in the exhaust gas purifying system of Example 1-1 is roughly shown in a flowchart of FIG. 5. Such control of the gas composition is shown in detail in a flowchart of FIG. 6. Hereinafter, the control of the gas composition in Example 1-1 is discussed with reference to the flowchart of FIG. 6.

First, air/fuel ratio (A/F) is detected at a step P1. An amount of intake air to be sucked into an internal combustion engine is detected at a step P2. A temperature of exhaust gas discharged from the engine is detected at a step P3. Then, an amount (hii) of $H_2$ to be produced in the engine is searched from a map of relationship between data (A/F, the intake air amount and the exhaust gas temperature) memorized in the ECU and the $H_2$ production amount (hii) to be discharged from the engine, at a step P4. In the map, the intake air amount is represented as space velocity (SV) of intake air. Then, the $H_2$ production amount (hii) is estimated from the result of the above map searching, at a step P5.

Subsequently, the composition of exhaust gas (HC concentration, CO concentration, $O_2$ concentration, and NOx concentration) are detected, at a step P6. From the $H_2$ production amount (hii) estimated at the step P5, a rate or ratio (Kh) of the $H_2$ amount or concentration)/TR amount (an amount of total reducing components) or concentration is calculated, and judgment is made as to whether the rate (Kh) is not lower than a predetermined value (0.3), at a step P7. When the rate (Kh) is lower than the predetermined value, calculation of the fuel injection amount, the fuel injection timing, the spark timing, and the opening and closing timings of the intake and exhaust valves is made at a step P8 in order to make the rate (Kh) not lower than the predetermined value. From a result of this calculation, necessary values of the fuel injection amount, the fuel injection timing, the spark timing, and the opening and closing timings of the intake and exhaust valves are set so as to make corresponding controls, at a step P9.

Figure 7:
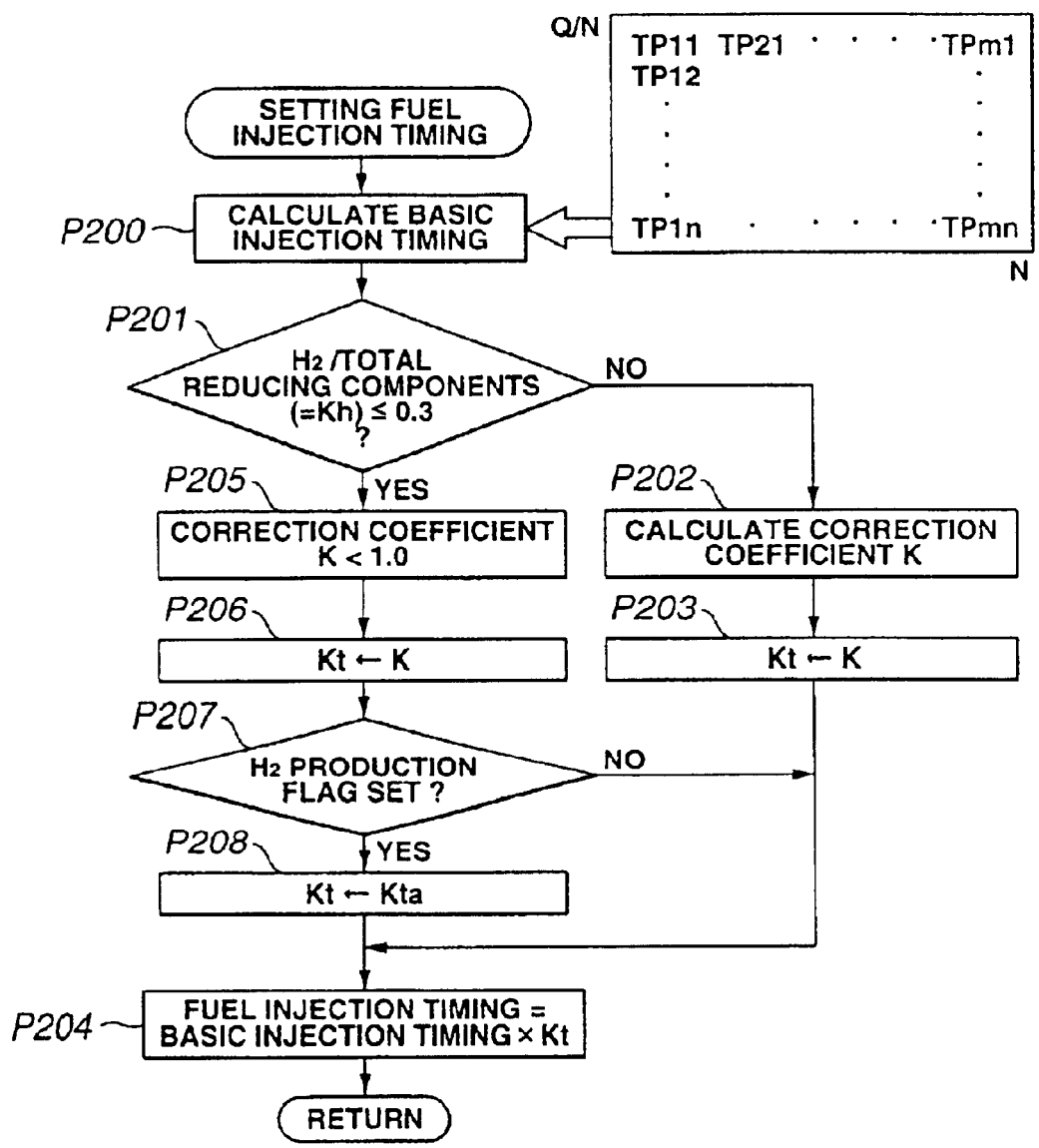
FIG. 7 is a flowchart of a routine of setting a fuel injection timing required to obtain a ratio (Kh=$H_2$ amount/TR amount) not less than a predetermined level.

FIG. 7 is a flowchart of a routine for setting the fuel injection timing at a value at which the rate (Kh) of [the $H_2$ amount (concentration [H2]d)/the TR amount (concentration [TR]d)] becomes not lower than the predetermined value. In FIG. 7, at a step P200, a basic fuel injection timing is calculated from a map shown at a right-side and upper part.

At a step P201, judgment is made as to whether the current Kh is not higher than the predetermined value or not. When the current Kh is higher than the predetermined value, i.e., the $H_2$ rate is high in the exhaust gas composition, a flow goes to a step P202.

At the step P202, a correction coefficient K is calculated. The correction coefficient becomes a function of temperature of engine coolant of the engine during warming-up operation of the engine. Accordingly, When the engine coolant temperature rose within a range of $K \geq 1.0$, K becomes small. During acceleration operation of the engine, the correction coefficient becomes $K \geq 1.0$. During full load operation of the engine, the correction coefficient becomes $K > 1.0$.

At a step P203, the correction coefficient is set at Kt.

At a step P204, the fuel injection timing=the basic injection timing×Kt is calculated. By this, a ratio of $H_2$ to the exhaust gas composition is not less than 0.3.

If the judgment result is made such that the current Kh is not higher than the predetermined value, the flow goes to a step P205.

At the step P205, the correction coefficient is set at K<1.0. At a step P206, the correction coefficient K is set at Kt, upon which the flow goes to a step P207.

At the step P207, judgment is made as to whether a hydrogen supply flag is set or not. When the hydrogen supply flag is not set, the flow goes to the step P204. Consequently, the rate of $H_2$ in the exhaust gas composition is maintained not higher than 0.3.

At a step P207, when the hydrogen supply flag is set, the flow goes to a step P208 at which the fuel injection timing Kt is set at a previously set value Kta so that the rate of hydrogen in the exhaust gas composition is enlarged.

Figure 8:
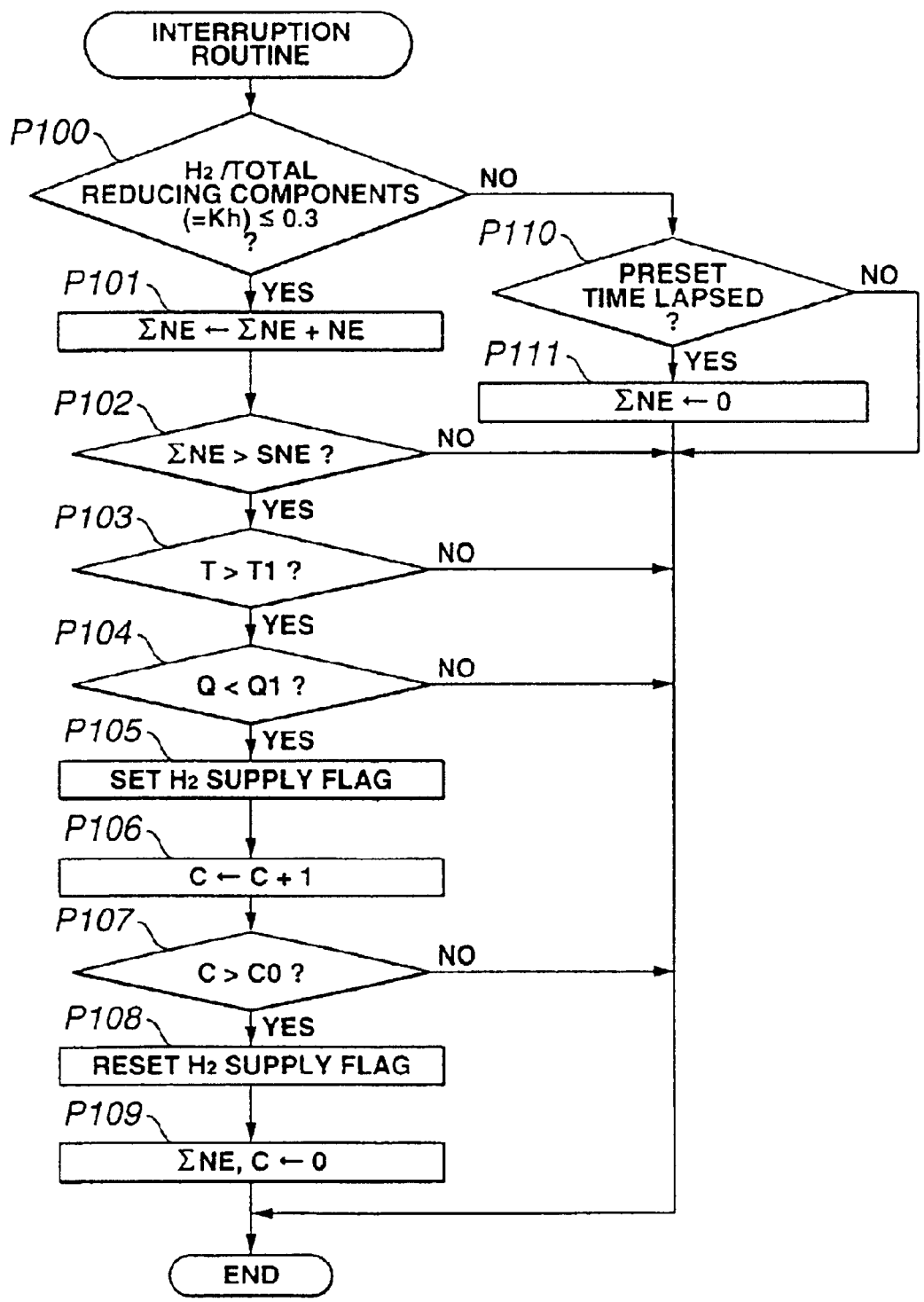
FIG. 8 is a flowchart of an interruption routine made every a certain time in order to judge initiation and termination of $H_2$ supply when NOx reduction is made.

FIG. 8 shows an interruption routine for judging initiation and termination of supply of $H_2$ in the course of NOx reduction, executed every a certain time.

In a flowchart of FIG. 8, first at a step P100, judgment is made as to whether the rate or ratio (Kh) of [the $H_2$ amount (concentration [H2]d)/the total reducing components amount (concentration [TR]d)] is lower that the predetermined value (0.3) or not, i.e., reduction of NOx by $H_2$ is made or not. When Kh is not larger than the predetermined value, i.e., the $H_2$ is at such a rate that reduction of NOx by $H_2$ is difficult to be made, the flow goes to a step P101, the current engine speed NE is added to an accumulated value $\Sigma NE$ of engine speed thereby obtaining a new engine speed accumulated value $\Sigma NE$.

Then, the flow goes to a step P102 at which judgment is made as to whether the accumulated value $\Sigma NE$ is larger than a preset value SNE or not. The preset value SNE has been previously experimentally obtained and represents an engine speed accumulated value at which reduction of NOx by $H_2$ is not made. When $\Sigma NE \leq SNE$, the cycle of this interruption routine is terminated. When $\Sigma NE > SNE$, i.e., it is assumed that reduction of NOx by $H_2$ is not made so that NOx is released into atmospheric air, the flow goes to a step P103.

At the step P103, judgment is made as to whether a temperature T of inside of the catalyst is lower than a preset temperature T1 or not. When $T \leq T1$, the cycle of the interruption routine is terminated. When T>T1, the flow goes to a step P104.

At the step P104, judgment is made as to whether an intake air amount Q of the internal combustion engine (i.e., an amount of intake air to be sucked into the engine) is more than a preset value Q1. When Q<Q1, the cycle of the interruption routine is terminated. When $Q \geq Q1$, the hydrogen supply flag is set at a step P105 at which hydrogen is supplied from the hydrogen ($H_2$) supply or enriching means so that NOx reduction is carried out using hydrogen as the reducing component, shown in FIGS. 3 and 4.

At a step P106, increment of only 1 is made on a count value C. At a step 107, judgment is made as to whether the count value C exceeds a preset value C0 or not. When $C \leq C0$, the cycle of the interruption routine is terminated. When C>C0, the flow goes to a step P108, the hydrogen supply flag is reset. When the hydrogen supply flag is reset, operation of the hydrogen supply means is terminated, so that the exhaust gas composition is restored to its state at a time before operation of the hydrogen supply means. Then, the flow goes to a step P109 at which the accumulated engine speed $\Sigma NE$ and the count value C are set at 0.

The count value C is for counting computer computation cycles or the number of this routine, thereby obtaining a time. In this regard, first the predetermined time or count value is set. When the predetermined time has been reached, hydrogen supply is terminated. This impedes hydrogen supply after the predetermined time unless other conditions. This control is added to prevent baneful influence from the viewpoint of drivability of the engine other than the viewpoint of exhaust gas purification. If the value C0 is set infinite, no restriction can be substantially made by this control.

When the judgment is made such that Kh is larger than the predetermined value, i.e., the exhaust gas composition is in a state where NOx reduction by $H_2$ is made, the flow goes to a step P110. At the step P110, judgment is made as to whether a condition where Kh is not smaller than the preset value continues for a preset time duration or not. When the condition does not continue for the preset time duration, the cycle of the interruption routine is terminated. When the condition continues for the preset time, the flow goes to a step P111 at which the accumulated engine speed $\Sigma NE$ is made 0.

As will be understood from the above, improved combustion in the engine was made as a result of the controls shown in FIGS. 3 to 8, so that the controls shown in FIGS. 3 to 8 are referred to as "Improved combustion in engine" as shown in the column of "Control manner of engine" in Tables 2A–2D.

Example 1-2

Activated alumina powder was impregnated with an aqueous solution of palladium nitrate containing a certain amount of palladium, and then dried at 150° C. for 12 hours. Thereafter, the thus impregnated activated alumina powder was fired at 400° C. for 1 hour thereby to form Pd-carried alumina powder (Powder R) whose concentration of Pd carried was 17.0% by weight.

Further, activated alumina powder containing cerium and zirconium was impregnated with an aqueous solution of rhodium nitrate containing a certain amount of rhodium, and then dried at 150° C. for 12 hours. Thereafter, the thus impregnated activated 201 alumina powder was fired at 400° C. for 1 hour thereby to form Rh-carried alumina powder (Powder O) whose concentration of Rh carried was 3.0% by weight.

Further, activated alumina powder was impregnated with an aqueous solution of platinum nitrate containing a certain amount of platinum, and then dried at 150° C. for 12 hours. Thereafter, the thus impregnated activated alumina powder was fired at 400° C. for 1 hour thereby to form Pt-carried alumina powder (Powder S) whose concentration of Pt carried was 1.0% by weight.

Then, a porcelain ball mill was charged with 377.6 g of Powder R, 107.6 g of Powder O, 64.9 of Powder S, 49 g of cerium oxide powder, 200.9 g of activated alumina powder and 1000 g of alumina sol, followed by mixing and pulverizing, thereby obtaining a slurry. The slurry was coated on an upstream-side section of a cordierite ceramic honeycomb-type monolithic carrier having a volume of 1.3 liters and 400 cells per square inch and having a thickness of walls (defining each cell) of 2 mil so that walls of cells were coated with the slurry. The upstream-side section included an inlet end through which exhaust gas would be flown in. Thereafter, the coated monolithic carrier was blown with air stream to remove excessive slurry in the cells and dried, and then fired at 400° C. for 1 hour. Thus, the coated monolithic carrier was provided with a catalytic coat layer formed on the wall of the cells of the monolithic carrier. The weight of the catalytic coat layer was 140 g per one liter of the monolithic carrier.

Further, the coated monolithic carrier was impregnated with an aqueous solution of barium acetate and dried at 120° C. Thereafter, the dried coated monolithic carrier was fired at 400° C. thereby to prepare an upstream-side catalyst SRH28 whose concentration of noble metals carried was 14 g per one liter of the monolithic carrier, in which a weight ratio (calculated as metal) of Pt/Pd/Rh was 1/10/5.

Example 7-2

The catalyst SRH28 had a composition (carried amount of noble metals) and a structure as shown in Tables 1A–1B. Additionally, a washcoat (catalytic coat) layer structure of the catalyst is shown in FIG. 14. The outline of the exhaust gas purifying system of Example 7-2 is shown in Tables 2A–2D. The exhaust gas purifying system of Example 1-2 was constructed same as that of Example 7-1 with the exception that the prepared catalyst SRH28 was used in place of the catalyst SRH1.

Example 8-1

As shown in FIG. 2, the hydrogen enriching catalyst 1 (catalyst SRH1) was disposed in the exhaust gas passageway 10a of the internal combustion engine. The hydrogen enriching catalyst 1 was arranged to selectively oxidize and remove unburned HC and CO in exhaust gas discharged from the engine 10 thereby increasing the rate (ratio) of $H_2$ component in exhaust gas. Additionally, the NOx treating catalyst 2 (catalyst NR1) was disposed in the exhaust gas passageway 10a downstream of the hydrogen enriching catalyst 1. Thus, the exhaust gas purifying system of Example 2-1 was constructed.

Additionally, the engine 10 provided with the exhaust gas purifying system of Example 2-1 was operated repeating an operational cycle which included a normal operation at a lean air-fuel ratio (A/F=20) for 30 seconds, and a rich operation (atmospheric change) at an air-fuel ratio (A/F=11) for 2 seconds. The normal operation produced an oxygen-excessive atmosphere or lean exhaust gas atmosphere which had an air-fuel ratio leaner (n fuel) than stoichiometric level. This engine operation manner was carried out in place of the engine controls shown in FIGS. 3 to 8 in Example 1-1. The catalyst SRH1 had a composition (carried amount of noble metals) and a structure as shown in Tables 1A–1B. Additionally, a washcoat (catalytic coat) layer structure of the catalyst is shown in FIG. 9. The outline of the exhaust gas purifying system of Example 2-1 is shown in Tables 2A–2D.

Examples 2-6 to 2-26

Catalysts SRH2 to SRH27 were prepared similarly to the catalyst SRH1 in Example 1-1.

Examples 8-2 to 8-27

Figure 11:
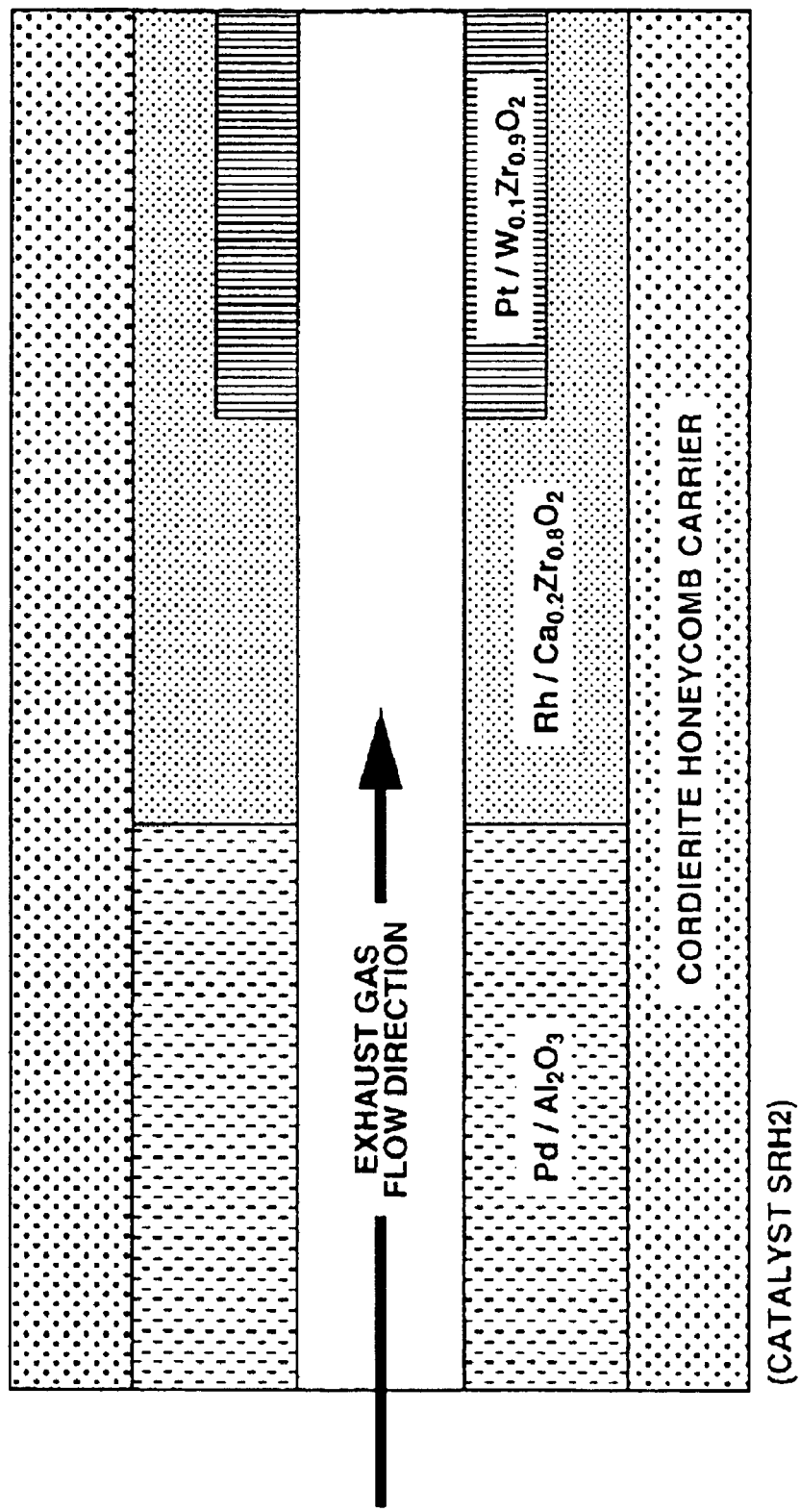
FIG. 11 is a schematic sectional view of a further washcoat layer structure of a catalyst serving as a hydrogen enriching device of the exhaust gas purifying system according to the present invention.
Figure 12:
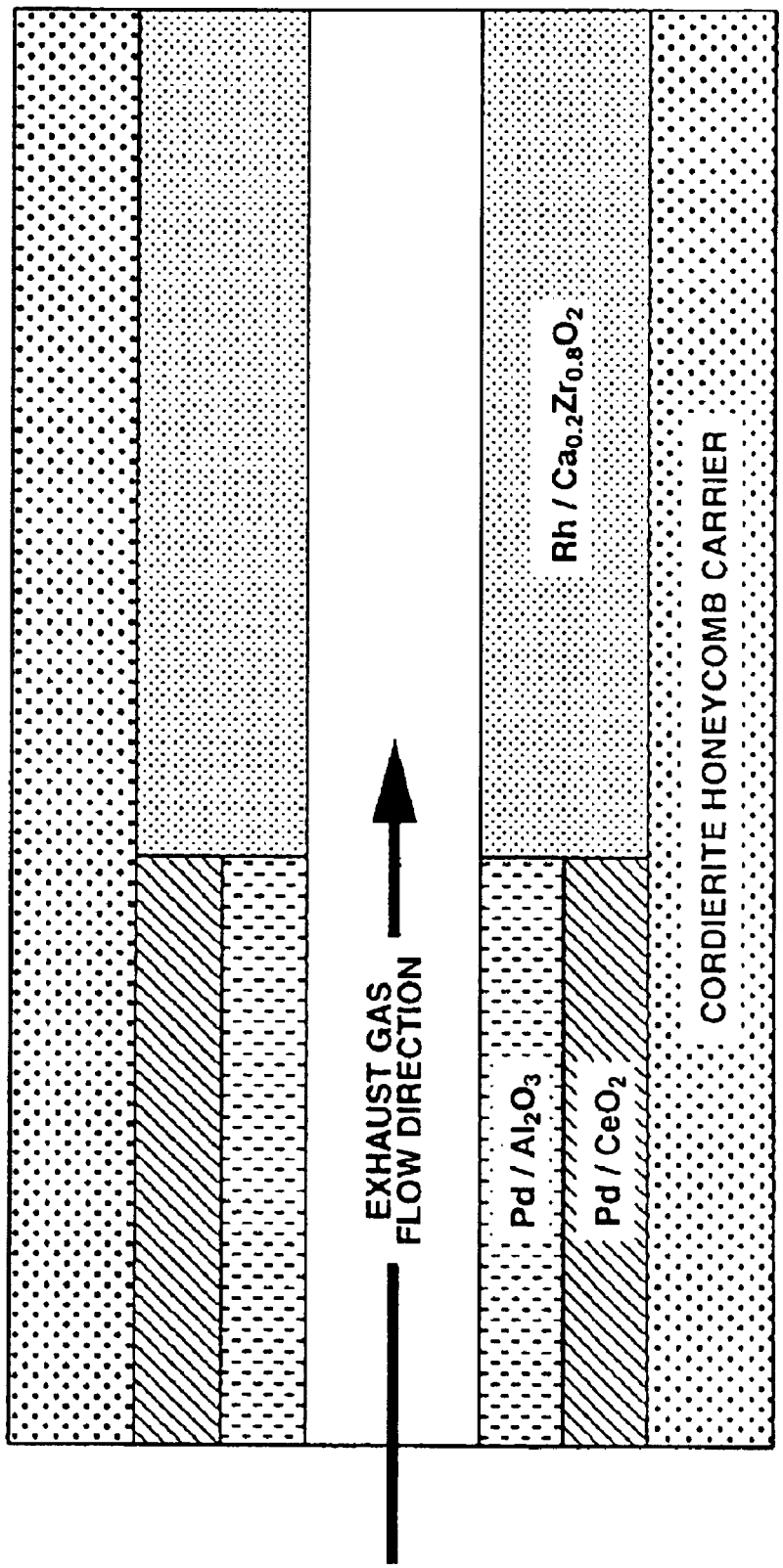
FIG. 12 is a schematic sectional view of a further washcoat layer structure of a catalyst serving as a hydrogen enriching device of the exhaust gas purifying system according to the present invention.
Figure 13:
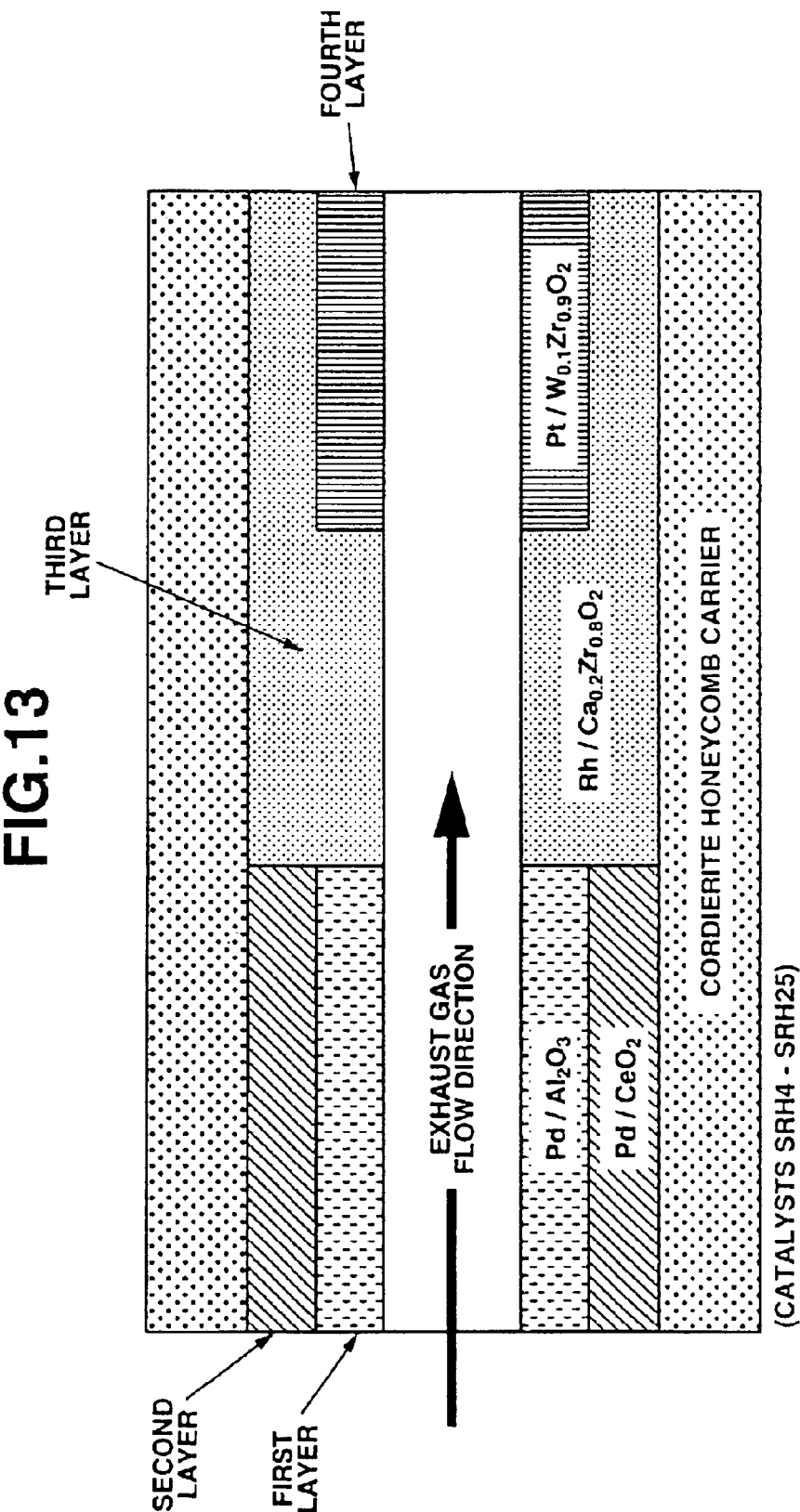
FIG. 13 is a schematic sectional view of a further washcoat layer structure of a catalyst serving as a hydrogen enriching device of the exhaust gas purifying system according to the present invention.

Then, exhaust gas purifying systems of Examples 2-2 to 2-27 were constructed similarly to Example 2-1 by using the obtained catalysts SRH2 to SRH27, respectively. Additionally, in this example, the engine 10 was operated similarly to Example 2-1 controlling air-fuel ratio of air-fuel mixture to be supplied to the engine as shown in Tables 2A–2D. The catalysts SRH2 to SRH27 have respectively compositions (carried amounts of noble metals) and structures as shown in Tables 1A–1B. Additionally, washcoat (catalytic coat) layer structures of the catalysts are shown in FIGS. 11 to 13. The outline of the exhaust gas purifying system of Example 2-1 is shown in Tables 2A–2D.

Example 3-1

Activated alumina powder was impregnated with an aqueous solution of palladium nitrate containing a certain amount of palladium and dried, and then fired 400° C. for 1 hour thereby to form Pd-carried alumina powder (Powder E) whose cocentration of Pd carried was 8.0% by weight.

Then, a porcelain ball mill was charged with 750 parts by weight of Powder E, 1250 parts by weight (20% as calculated as solid content) of nitric acid-acidic alumina sol, and 500 parts by weight of pure water, followed by mixing and pulverizing, in which pulverizing was made for 1 hour. A slurry was thus obtained and was coated on a cordierite ceramic honeycomb-type monolithic carrier having a volume of 0.8 liter and 900 cells per square inch and having a thickness of walls (defining each cell) of 2 mil so that walls of cells were coated with the slurry. Thereafter, the coated monolithic carrier was blown with air stream to remove excessive slurry in the cells and dried at 130° C., and then fired at 400° C. for 1 hour. As a result, a catalyst SX1 was prepared in which a catalytic coat layer was formed on the wall of the cells of the monolithic carrier. The weight of the catalytic coat layer was 100 g per one liter of the monolithic carrier. The washcoat (catalytic coat) layer structure of the catalyst is shown in FIG. 14.

Example 3-2

Zirconium oxide ($ZrO_2$) powder was impregnated with an aqueous solution of rhodium nitrate containing a certain amount of rhodium and dried, and then fired 400° C. for 1 hour in air thereby to form Rh-carried zirconium oxide powder (Powder F) whose cocentration of Rd carried was 6.0% by weight.

Then, a porcelain ball mill was charged with 1000 parts by weight of the Powder F, 1250 parts (20% as calculated as solid content) by weight of nitric acid-acidic alumina sol, and 500 parts by weight of pure water, followed by mixing and pulverizing, in which pulverizing was made for 1 hour. Thus, a slurry was obtained and was coated on a cordierite ceramic honeycomb-type monolithic carrier having a volume of 0.5 liter and 900 cells per square inch and having a thickness of walls (defining each cell) of 2 mil so that walls of cells were coated with the slurry. Thereafter, the coated monolithic carrier was blown with air stream to remove excessive slurry in the cells and dried 130° C., and then fired at 400° C. for 1 hour. As a result, a catalyst SR1 was prepared in which a catalytic coat layer was formed on the wall of the cells of the monolithic carrier. The weight of the catalytic coat layer was 125 g per one liter of the monolithic carrier. The washcoat (catalytic coat) layer structure of the catalyst is shown in FIG. 14.

Example 9-1

An exhaust gas purifying system of Example 3-2 was constructed similarly to that of Example 2-1 with the exception that the catalyst SX1 was used as an upstream catalyst 1-1 while the catalyst SR1 was used as a downstream catalyst 1-2. The upstream catalyst 1-1 was disposed upstream of the downstream catalyst 1-2 with respect to flow of exhaust gas, as illustrated in FIG. 2.

Further, in this example, the engine 10 was operated similarly to Example 2-1 controlling air-fuel ratio of air-fuel mixture to be supplied to the engine as shown in Tables 2A–2D.

The catalysts SX1 and SR1 have respectively compositions (carried amounts of noble metals) and structures as shown in Tables 1A–1B. The outline of the exhaust gas purifying system of Example 2-1 is shown in Tables 2A–2D.

Examples 3-3 to 3-6

Catalysts SX2 to SX5 were obtained similarly to the catalyst SX1 in Example 3-1. The washcoat (catalytic coat) layer structures of the catalysts are shown in FIG. 14.

Exmaples 9-13 to 9-16

An exhaust gas purifying system of Examples 9-13 to 9-3-2 were constructed similarly to that of Example 8-1 with the exception that the catalyst SX2 to SX5 was used as an upstream catalyst 1-1 while the catalyst SR6 was used as a downstream catalyst 1-2. The upstream catalyst 1-1 was disposed upstream of the downstream catalyst 1-2 with respect to flow of exhaust gas, as illustrated in FIG. 2.

Further, in this example, the engine 10 was operated similarly to Example 8-1 controlling air-fuel ratio of air-fuel mixture to be supplied to the engine as shown in Tables 2A–2D.

The catalysts SX2 to SX5 have respectively compositions (carried amounts of noble metals) and structures as shown in Tables 1A–1B. The outline of the exhaust gas purifying system of Examples are shown in Tables 2A–2D.

Example 3-18

Activated alumina powder was impregnated with an aqueous solution of palladium nitrate containing a certain amount of palladium, and then dried and fired at 400° C. for 1 hour thereby to form Pd-carried alumina powder (Powder G) whose concentration of Pd carried was 20.0% by weight.

Then, a porcelain ball mill was charged with 500 parts by weight of Powder G, 500 parts (20% by weight as calculated as solid content) by weight of nitric adic-acidic alumina sol, and 500 parts by weight of pure water, followed by mixing and pulverizing for 1 hour, thereby obtaining a slurry. The slurry was coated on an upstream-side section of a cordierite ceramic honeycomb-type monolithic carrier having a volume of 1.3 liters and 900 cells per square inch and having a thickness of walls (defining each cell) of 2 mil so that walls of cells were coated with the slurry. The upstream-side section had a length of ⅓ of total length of the carrier and had an inlet end through which exhaust gas would be flown in. Thereafter, the coated monolithic carrier was blown with air stream to remove excessive slurry in the cells, and then dried at 130° C. and fired at 400° C. for 1 hour. This upstream-side section was referred to as a catalytic layer 1a.

Powder of cerium oxide ($CeO_2$) was impregnated with an aqueous solution of palladium nitrate containing a certain amount of cerium, and then dried and fired in air at 400° C. for 1 hour thereby forming Pd-carried cerium oxide powder (Powder B) whose concentration of Pd carried is 20.0% by weight.

A porcelain ball mill was charged with 500 parts by weight of Powder H, 500 parts (20% by weight as calculated as solid content) by weight of nitric acid-acidic alumina sol and 500 parts by weight of pure water, followed by mixing and pulverizing (for 1 hour) the content of the ball mill, thereby obtaining a slurry. The slurry was coated on a downstream-side section of the cordierite ceramic honeycomb-type monolithic carrier so that the walls of the cells were coated with the slurry. The downstream-side section had a length of ⅔ of total length of the carrier and included an outlet end through which exhaust gas would be discharged. Thereafter, the coated monolithic carrier was blown with air stream to remove excessive slurry in the cells, and then dried at 130° C. and fired at 400° C. for 1 hour. The downstream-side section was referred to as a catalystic layer 1b.

Subsequently, powder of zirconium oxide ($ZrO_2$) was impregnated with an aqueous solution of rhodium nitrate containing a certain amount of rhodium, and then dried and fired in air at 400° C. for 1 hour thereby forming Rh-carried zirconium oxide powder (Powder I) whose concentration of Rh carried is 20.0% by weight.

A porcelain ball mill was charged with 500 parts by weight of Powder 1,500 parts (20% by weight as calculated as solid content) by weight of nitric acid-acidic alumina sol and 500 parts by weight of pure water, followed by mixing and pulverizing (for 1 hour) the content of the ball mill, thereby obtaining a slurry. The slurry was coated on the downstream-side section of the cordierite ceramic honeycomb-type monolithic carrier (or catalyst SR13) so that the walls of the cells were coated with the slurry. The downstream-side section had a length of ⅔ of total length of the carrier and included an outlet end through which exhaust gas would be discharged. Thereafter, the coated monolithic carrier was blown with air stream to remove excessive slurry in the cells, and then dried at 130° C. and fired at 400° C. for 1 hour. The downstream-side was referred to as a catalytic layer 1b'. As a result, a catalyst SXR1 was prepared and had a washcoat (catalytic coat) layer structure shown in FIG. 10.

Exmaples 3-19 to 3-22

Figure 10:
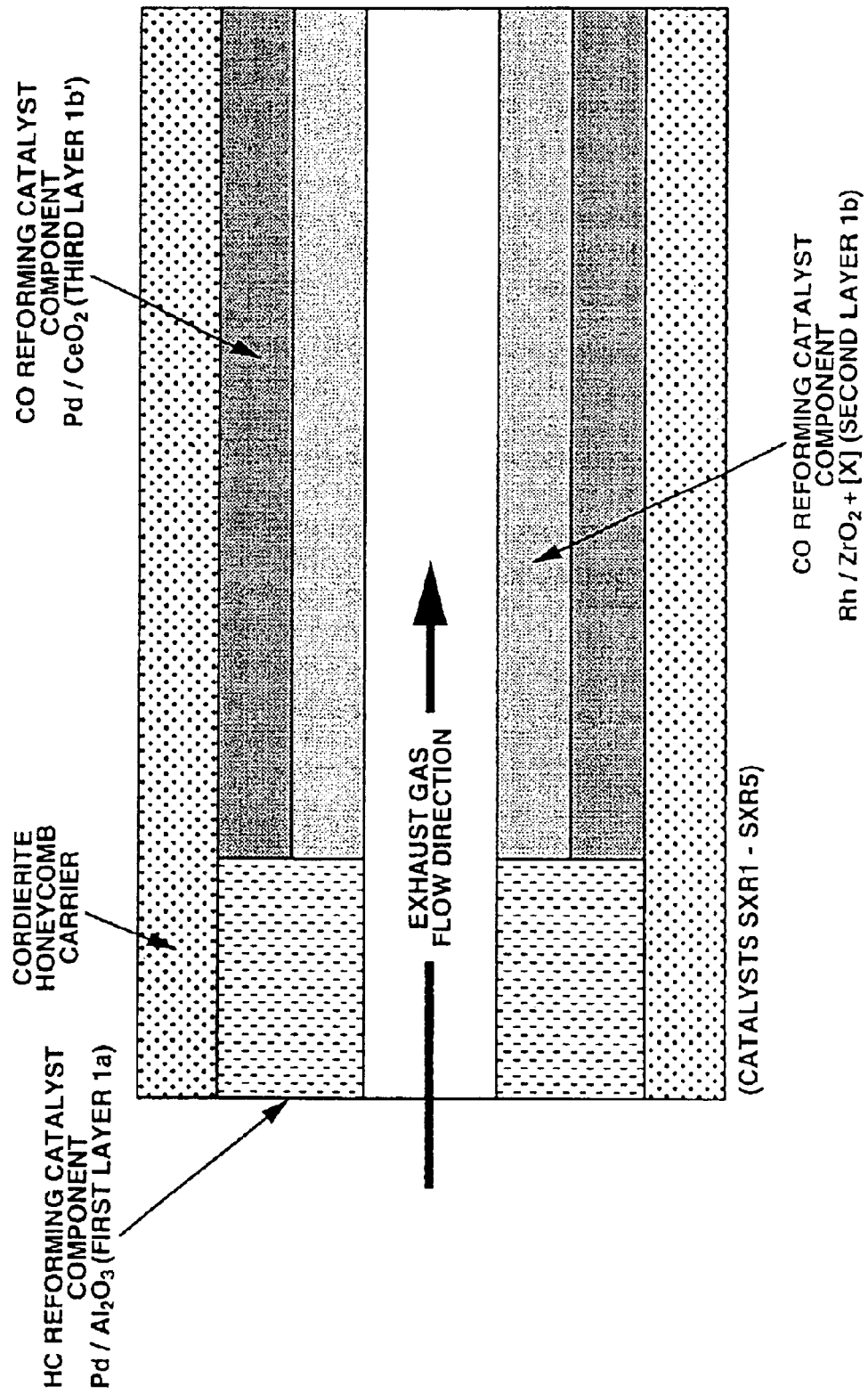
FIG. 10 is a schematic sectional view of another washcoat layer structure of a catalyst serving as a hydrogen enriching device of the exhaust gas purifying system according to the present invention.

Each of catalysts SXR2 to SXR5 was prepared similarly to the catalyst SXR1 of Example 3-18. A washcoat (catalytic coat) layer structure of the catalyst is shown in FIG. 10.

Exmaples 9-17 to 9-21

An exhaust gas purifying system of Examples 9-17 to 9-21 were constructed similarly to that of Example 8-1 with the exception that the catalyst SXR1 to SXR5 was used as an upstream catalyst 1-1. The upstream catalyst 1-1 was disposed upstream of the downstream catalyst 1-2 with respect to flow of exhaust gas, as illustrated in FIG. 2.

Further, in this example, the engine 10 was operated similarly to Example 8-1 controlling air-fuel ratio of air-fuel mixture to be supplied to the engine as shown in Tables 2A–2D.

The catalysts SX2 to SX5 have respectively compositions (carried amounts of noble metals) and structures as shown in Tables 1A–1B. The outline of the exhaust gas purifying system of Examples are shown in Tables 2A–2D.

Example 4-1

Activated alumina powder was impregnated with an aqueous solution of dinitrodiammine platinum containing a certain amount of platinum, and dried and then fired 400° C. for 1 hour thereby to form Pt-carried alumina powder (Powder J) whose cocentration of Pd carried was 5.0% by weight.

Then, a porcelain ball mill was charged with 1000 parts by weight of Powder F, 1250 parts by weight (20% as calculated as solid content) of nitric acid-acidic alumina sol, and 500 parts by weight of pure water, followed by mixing and pulverizing, in which pulverizing was made for 1 hour. This slurry was coated on a cordierite ceramic honeycomb-type monolithic carrier having a volume of 0.5 liter and 400 cells per square inch and having a thickness of walls (defining each cell) of 6 mil so that walls of cells were coated with the slurry. Thereafter, the coated monolithic carrier was blown with air stream to remove excessive slurry in the cells and dried at 130° C., and then fired at 400° C. for 1 hour. As a result, a catalyst J was prepared in which a catalytic coat layer was formed on the wall of the cells of the monolithic carrier. The weight of the catalytic coat layer was 125 g per one liter of the monolithic carrier. Further, the catalyst J was impregnated with an aqueous solution of barium acetate thereby obtaining a catalyst NO1 which contained 35 g of BaO per one liter of the monolithic carrier. The catalyst had a washcoat (catalytic coat) layer structure shown in FIG. 14.

Example 10-1

An exhaust gas purifying system of Example 10-1 was constructed similarly to that of Example 8-1 with the exception that the catalyst SXR3 was used as the upstream-side catalyst 1-1 while the catalyst NO1 was used as the downstream catalyst 1-2. The upstream catalyst 1-1 was disposed upstream of the downstream catalyst 1-2 with respect to flow of exhaust gas, as illustrated in FIG. 2. Further, in this example, the engine 10 was operated similarly to Example 8-1 controlling air-fuel ratio of air-fuel mixture to be supplied to the engine as shown in Tables 2A–2D. The catalysts SXR3 and NO1 have respectively compositions (carried amounts of noble metals) and structures as shown in Tables 1A–1B. The outline of the exhaust gas purifying system of Example 10-1 is shown in Tables 2A–2D.

Example 4-2

A catalyst NO2 was prepared similarly to the catalyst NO1 of Example 4-1. A washcoat (catalytic coat) layer structure of the catalyst NO2 are shown in FIG. 14.

Example 10-2

An exhaust gas purifying system of Example 10-2 was constructed similarly to that of Example 10-1 with the exception that the catalyst SXR4 was used as the upstream catalyst 1-1 while the catalyst NO2 was used as the downstream catalyst 1-2. The upstream catalyst 1-1 was disposed upstream of the downstream catalyst 1-2 with respect to flow of exhaust gas, as illustrated in FIG. 2. Further, in this example, the engine 10 was operated similarly to Example 10-1 controlling air-fuel ratio of air-fuel mixture to be supplied to the engine as shown in Tables 2A–2D. The catalysts SXR4 and NO2 have respectively compositions (carried amounts of noble metals) and structures as shown in Tables 1A–1B. The outline of the exhaust gas purifying system of Example 10-2 is shown in Tables 2A–2D.

Example 5-1

[Preparation of Other NOx Treating Catalyst]

Activated alumina powder was impregnated with an aqueous solution of platinum nitrate containing a certain amount of platinum, and dried and then fired 400° C. for 1 hour thereby to form Pt-carried alumina powder (Powder Q) whose cocentration of Pt carried was 5.0% by weight. Citric acid was added to a mixture of lanthanum carbonate, barium carbonate and cobalt carbonate. The mixture was dried and then fired at 700° C. thereby obtaining powder (Powder M) which had a weight ratio (in metallic state) of La/Ba/Co= 2/7/10.

Then, a porcelain ball mill was charged with 347 g of Powder Q, 58 g of Powder D, 360 g of Powder M, 136 g of alumina powder, and 900 g of water, followed by mixing and pulverizing, thereby obtaining a slurry, in which pulverizing was made for 1 hour. The slurry was coated on a cordierite ceramic honeycomb-type monolithic carrier having a volume of 1.3 liters and 400 cells per square inch and having a thickness of walls (defining each cell) of 6 mil so that walls of cells were coated with the slurry. Thereafter, the coated monolithic carrier was blown with air stream to remove excessive slurry in the cells and dried at 130° C., and then fired at 400° C. for 1 hour. As a result, a catalyst K was prepared in which a catalytic coat layer was formed on the wall of the cells of the monolithic carrier. The weight of the catalytic coat layer was 200 g per one liter of the monolithic carrier.

Further, the catalyst K was impregnated with an aqueous solution of barium acetate thereby obtaining a catalyst NR2 which contained 35 g of BaO per one liter of the monolithic carrier.

Example 9-22

An exhaust gas purifying system of Example 9-22 was constructed similarly to that of Example 8-1, in which the catalyst NR2 was used as the catalyst 2 while the catalyst SXR1 and SR1 were used respectively as the catalysts 1-1 and 1-2. Further, in this example, the engine 10 was operated similarly to Example 8-1 controlling air-fuel ratio of air-fuel mixture to be supplied to the engine as shown in Tables 2A–2D. The outline of the exhaust gas purifying system of Example 9-22 is shown in Tables 2A–2D. The catalyst NR2 has composition (carried amounts of noble metals) and structure as shown in Tables 1A to 1B. The washcoat (catalytic coat) layer structure of the catalyst NR2 is shown in FIG. 14.

Example 6-1

Zinc oxide powder was impregnated with an aqueous solution of palladium nitrate containing a certain amount of palladium and dried, and then fired 400° C. for 1 hour thereby to form Pd-carried zinc oxide powder (Powder P) whose cocentration of Pt carried was 5.0% by weight.

Then, a porcelain ball mill was charged with 800 g of Powder P, 1000 g of alumina sol, and 900 g of water, followed by mixing and pulverizing, thereby obtaining a slurry, in which pulverizing was made for 1 hour. The slurry was coated on a cordierite ceramic honeycomb-type monolithic carrier having a volume of 1.3 liters and 400 cells per square inch and having a thickness of walls (defining each cell) of 6 mil so that walls of cells were coated with the slurry. Thereafter, the coated monolithic carrier was blown with air stream to remove excessive slurry in the cells and dried at 130° C., and then fired at 400° C. for 1 hour. As a result, a catalyst SR13 was prepared in which a catalytic coat layer was formed on the wall of the cells of the monolithic carrier. The weight of the catalytic coat layer was 200 g per one liter of the monolithic carrier, in which the amount of Pd carried was 8 g per one liter of the monolithic carrier. The catalyst had a washcoat (catalytic coat) layer structure shown in FIG. 14.

Example 6-2

A catalyst SR14 was prepared similarly to that SR13 in Example 6-1 with the exception that the catalytic coat layer formed on the cordierite ceramic honeycomb-type monolithic carrier contained a Cu—Zn oxide ($Cu_{0.2}Zn_{0.8}O$) in an amount of 200 g per one liter of the monolithic carrier.

Exammple 9-23

An exhaust gas purifying system of Example 9-23 was constructed similarly to that of Example 9-22 with the exception that the catalysts SXR2 and SR6 were used respectively as the catalysts 1-1 and 1-2. Further, in this example, the engine 10 was operated similarly to Example 8-1 controlling air-fuel ratio of air-fuel mixture to be supplied to the engine as shown in Tables 2A–2D. The outline of the exhaust gas purifying system of Example 9-23 is shown in Tables 2A–2D.

EXAMPLES 11-1 and 11-2

An exhaust gas purifying system of Examples 11-1 and 11-2 was constructed similarly to that of Example 9-1 with the exception that the catalyst SR13 or SR14 was used in place of the catalyst SR1. Further, in this example, the engine 10 was operated similarly to Example 8-1 controlling air-fuel ratio of air-fuel mixture to be supplied to the engine as shown in Tables 2A–2D. The outline of the exhaust gas purifying system of Examples 11-1 and 11-2 are shown in Tables 2A–2D.

Comparative Example 3

An exhaust gas purifying system of Comparative Example 3 was constructed similarly to that of Example 7-1 with the exception that only the NOx treating catalyst NR1 as the catalyst 2 (in FIG. 2) was disposed in the exhaust gas passageway so that the catalyst 1 was not used.

In this comparative example, the engine 10 was operated similarly to Example 7-1 controlling air-fuel ratio of air-fuel mixture to be supplied to the engine as shown in Tables 2A–2D, in which control for $H_2$ supply by the hydrogen enriching means was not made. The outline of the exhaust gas purifying system of Comparative Example 3 is shown in Tables 2A–2D.

Comparative Example 4
[Preparation of Three-Way Catalyst]

Activated alumina powder containing cerium and zirconium was impregnated with an aqueous solution of palladium nitrate containing a certain amount of palladium, and dried at 150° C. for 12 hours and then fired 400° C. for 1 hour thereby to form Pd-carried alumina powder (Powder N) whose cocentration of Pt carried was 17.0% by weight. Additionally, activated alumina powder containing zirconium was impregnated with an aqueous solution of rhodium nitrate, and dried at 150° C. for 12 hours and then fired 400° C. for 1 hour thereby to form Rh-carried alumina powder (Powder O) whose cocentration of Rh carried was 3.0% by weight.

Subsequently, a porcelain ball mill was charged with 190.7 g of Powder N, 54.0 g of Powder O, 49 g of cerium oxide powder, 506.3 g of activated alumina powder and 1000 g of alumina sol, followed by mixing and pulverizing, thereby obtaining a slurry. The slurry was coated on an upstream-side section of a cordierite ceramic honeycomb-type monolithic carrier having a volume of 1.3 liter and 400 cells per square inch and having a thickness of walls (defining each cell) of 6 mil, so that walls of cells at the upstream-side section were coated with the slurry. Thereafter, the coated monolithic carrier was blown with air stream to remove excessive slurry in the cells, and dried and then fired at 500° C. for 1 hour. The fired coated monolithic carrier was then coated and impregnated with an aqueous solution of barium acetate and dried at 120° C. for 2 hours, followed by firing at 400° C. for 1 hour, thereby preparing a three-way catalyst TWC1. The catalyst TWC1 had a weight ratio (calculated as metal) of Pd/Rh was 20/1, and had a total amount of noble metals carried was 7 g per one liter of the monolithic catalyst.

An exhaust gas purifying system of Comparative Example 4 was constructed similarly to that of Example 7-1 with the no exception that the three-way catalyst TWC1 was used as the catalyst 1. Further, in this comparative example, the engine 10 was operated similarly to Example 1-1 controlling air-fuel ratio of air-fuel mixture to be supplied to the engine as shown in Tables 2A–2D, so that the control of $H_2$ supply by the hydrogen enriching means was accomplished. The outline of the exhaust gas purifying system of Comparative Example 4 is shown in Tables 2A–2D. The catalyst TWC1 has composition (carried amounts of noble metals) and structure as shown in Tables 1A to 1B. The washcoat (catalytic coat) layer structure of the catalyst TWC1 is shown in FIG. 14.

Comparative Example 5

Similarly to Comparative Example 4, each of platinum, palladium and rhodium was carried on activated alumina to form Pt-carried alumina powder, Pd-carried alumina powder and Rh-carried alumina powder. The three powders were mixed to form a slurry. The slurry was coated on a cordierite ceramic honeycomb-type monolithic carrier having a volume of 1.3 liter, thereby preparing a three-way catalyst TWC2. The catalyst TWC2 had a weight ratio (calculated as metal) of Pt/Pd/Rh was 6/11/1, and had a total amount of noble metals carried was 8.48 g per one liter of the monolithic carrier.

An exhaust gas purifying system of Comparative Example 5 was constructed similarly to that of Comparative Example 4 with the exception that the three-way catalyst TWC2 was used as the catalyst 1. Further, in this comparative example, the engine 10 was operated similarly to Example 8-1 controlling air-fuel ratio of air-fuel mixture to be supplied to the engine as shown in Tables 2A–2D. The outline of the exhaust gas purifying system of Comparative Example 5 is shown in Tables 2A–2D. The catalyst TWC2 has composition (carried amounts of noble metals) and structure as shown in Tables 1A–1B. The washcoat (catalytic coat) layer structure of the catalyst TWCC1 is shown in FIG. 14.

Evaluation of Performance of Exhaust Gas Purifying System

Evaluation test (for emission performance) was conducted on the exhaust gas purifying systems of Examples and Comparative Examples, using an evaluation engine system shown in FIG. 2. For the evaluation test, each exhaust gas purifying system was incorporated in the evaluation engine system including the engine 10 which was a cylinder direct injection internal combustion engine having a displacement of 1.8 liters and produced by Nissan Motor Co., Ltd.

Prior to the evaluation test, the catalysts (corresponding to the catalyst 1 in FIG. 2) of Examples and Comparative Examples underwent a durability test in which each catalyst was connected to an internal combustion engine produced by Nissan Motor Co., Ltd. In the durability test, the engine was operated under the following test conditions:

Displacement of the engine: 3,000 cc;
Fuel: "Nisseki Dasshu Gasoline" produced by Nippon Oil Co., Ltd. and having a Pb content of 0 mg/usg (US gallon) and a S content of not more than 30 ppm;
Temperature of gas to be supplied to catalyst: 650° C.; and
Time of operation of the engine: 50 hours.

Then, the catalyst 1 undergone the durability test was subjected to the emission performance evaluation test conducted under a test mode "LA-4CH" employed in the Unites States of America. In this test, the exhaust gas purifying system was incorporated in the evaluation engine system of FIG. 2, in the catalyst 1 was installed at its predetermined position shown in FIG. 2. The engine was arranged such that fuel was directly injected into each cylinder. In the emission performance evaluation test, the catalyst 1 (including the catalyst 1-1 and/or the catalyst 1-2) and the catalyst 2 had the following volumes:

Catalyst 1: 1.3 liters (catalyst 1-1)
 1.3 liters (catalyst 1-1)+1.3 liters (catalyst 1-2)
Catalyst 2: 1.3 liters In the emission performance evaluation test, the engine 10 was operated in a manner to make the controls of FIGS. 3 to 8 ("improved combustion in engine") or in a manner to repeat an operational cycle which includes a normal operation at a lean air-fuel ratio (A/F=20 to 30) for 30 to 60 seconds, and a rich operation (atmospheric change) at an air-fuel ratio (A/F=10 to 13) for 2 to 4 seconds. The normal operation produced an oxygen-excessive atmosphere or lean exhaust gas atmosphere which had an air-fuel ratio leaner (in fuel) than stoichiometric level. In the emission performance evaluation test, a concentration A of gas components (HC, CO and NOx) in exhaust gas from the engine in a state where no exhaust gas purifying system was provided was measured, and a concentration B in exhaust gas emitted from the catalyst 2 (NOx treating catalyst) in FIG. 2 was measured, thereby obtaining a "remaining rate (%)" of the gas components, shown in Tables 2A–2D. The remaining rate (%) was calculated by [(the concentration B of the gas component/the concentration A of the gas component)×100], in which the concentrations were measured as "ppm". Tables 2A–2D show also values of [H2/TR]u in exhaust gas (E. O. E.=engine out emission) which was emitted from the engine without being passed through the exhaust gas purifying system or in exhaust gas in the exhaust gas passageway upstream of the catalyst 1, and values of [H2/TR]d in exhaust gas in the exhaust gas passageway immediately upstream of the catalyst 2 (and downstream of the catalyst 1). In other words, the values of [H2/TR]u were the ratios in exhaust gas in a state before undergoing the hydrogen enriching by the hydrogen enriching means. Tables 2A–2D further show values of [H2/CO]d which is a ratio between a concentration of hydrogen [H2]d and a concentration of carbon monoxide (CO) [CO]d in exhaust gas in the exhaust gas passageway 10a immediately upstream of the catalyst 2. The above ratio [H2/TR]u, [H2/TR]d and [H2/CO]d shown in Tables 2A–2D is an average of actually measured and calculated values (ratios) in engine operating ranges in which air-fuel mixture supplied to the engine was controlled to have an air-fuel ratio (A/F) of 10 to 13.

As apparent from Tables 2A–2D, it has been confirmed that the catalysts of the exhaust gas purifying systems of Examples exhibit high catalytic activity as compared with those of the exhaust gas purifying systems of Comparative Examples, providing particular effects of the present invention. Of the exhaust gas purifying systems of Examples, Example 3-14 exhibits a particularly high effect of lowering noxious gas emission in exhaust gas discharged through a tail (exhaust) pipe of an automotive vehicle.

Figure 16:
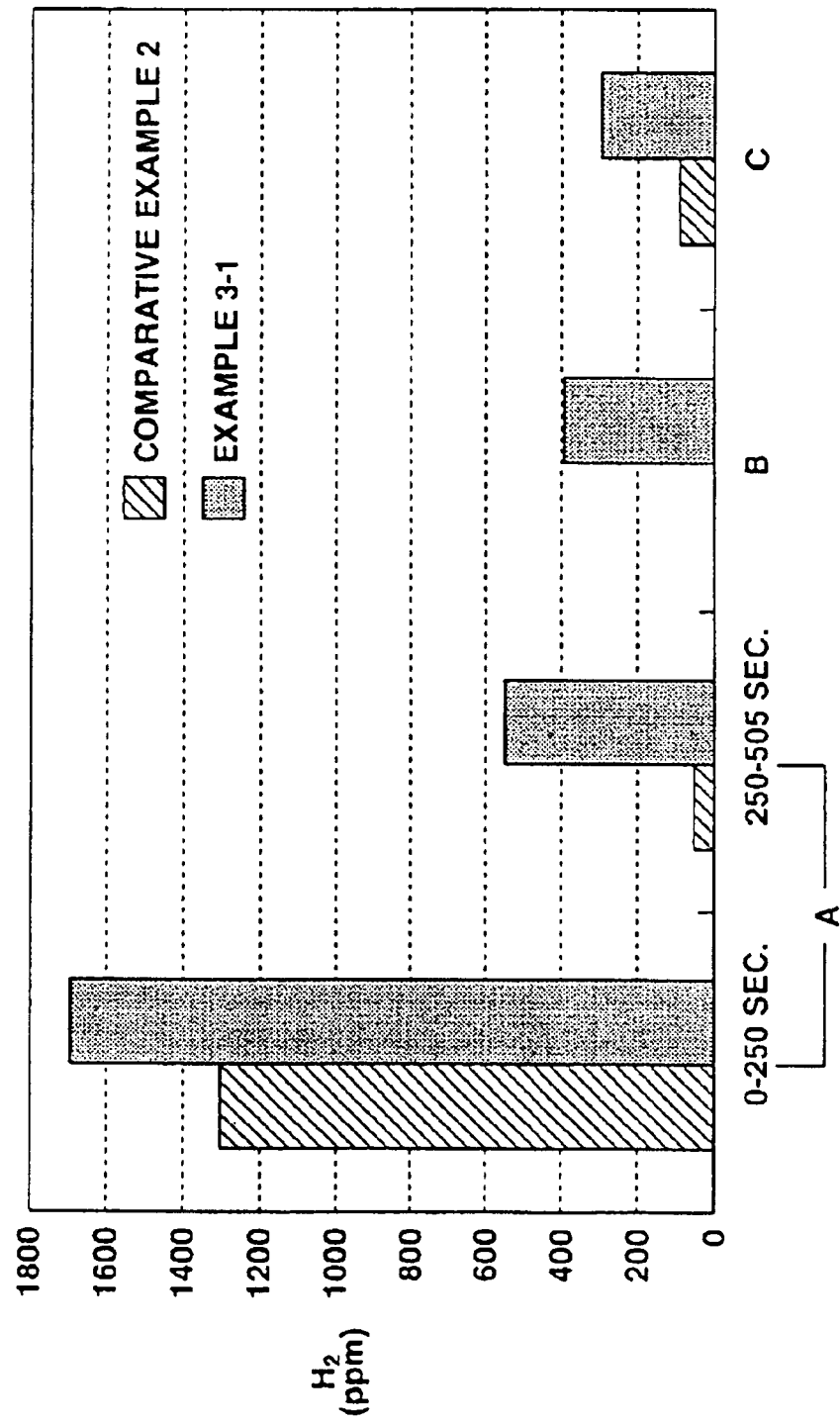
FIG. 16 is a graph of experimental data showing behavior of production of hydrogen by catalysts.

FIG. 16 depicts experimental data of hydrogen production behavior of the hydrogen producing means of the exhaust gas purifying system of Comparative Example 2 and that of Example 3-1 in an engine operation manner under the test mode "LA-4CH". The test mode included so-called "A bag" section, "B bag" section and "C bag" section. The experimental data in each of A to C bag sections were taken, in which the concentration of $H_2$ was measured in the exhaust gas passageway 10a between the catalyst 1 and the catalyst 2 in FIG. 2. The A bag section further included a first portion or time duration from engine starting to a time of 250 seconds lapsed, and a second portion or duration from the time of 250 seconds lapsed to a time of 505 seconds lapsed. It will be apparent that the hydrogen generating means of the exhaust gas purifying system of Example 3-1 is high in hydrogen generation effect as compared with that of the exhaust gas purifying system of Comparative Example 2.

Example 7

Figure 17:
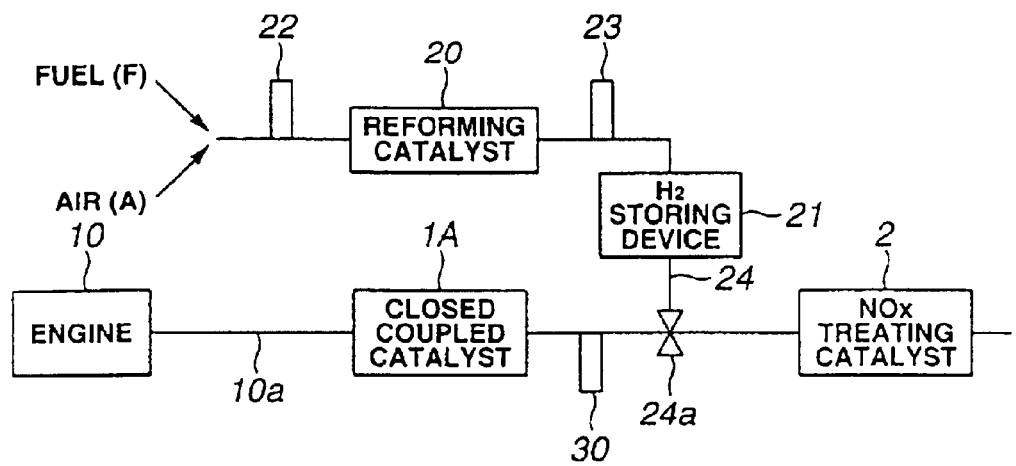
FIG. 17 is a schematic illustration of another embodiment of the exhaust gas purifying system according to the present invention.

FIG. 17 illustrates another embodiment of the exhaust gas purifying system according to the present invention. In this embodiment, a hydrogen-contained gas supply system is provided to supply hydrogen-contained gas to the exhaust gas passageway 10a and comprises a reforming catalyst 20 for producing hydrogen-contained gas from hydrocarbon fuel F and air A. The reforming catalyst 20 is fluidly connected to a hydrogen storing device 21 (such as hydrogen storage alloy) for temporarily storing hydrogen-contained gas which has been produced by the reforming catalyst 20 and is to be supplied through a gas supply device 24 including a flow amount control valve 24a into the exhaust gas passageway 10a upstream of the NOx treating catalyst 2. A so-called closed coupled catalyst 1A is disposed closed and coupled to an exhaust manifold of the engine and therefore located upstream of the catalyst 2. The valve 24a of the gas supply device 24 is disposed in the exhaust gas passageway 10a between the catalyst 1A and the catalyst 2, so that hydrogen-contained gas is introduced to the exhaust gas passageway 10a upstream of the catalyst 2. Accordingly, the composition (the rate of $H_2$:[H2/TR]d) of the inlet gas of the NOx treating catalyst 2 (or gas to be introduced into the NOx treating catalyst 2) is controlled at a desired value according to present invention.

Additionally, an oxygen sensor 22 is disposed upstream of the reforming catalyst 20. A temperature sensor 23 is disposed downstream of the reforming catalyst 20. Production of hydrogen-contained gas in the reforming catalyst 20 is carried out under reforming reactions such as steam reforming reaction, partial oxidation reaction and CO-water reaction. In this embodiment, the amount of air A to be supplied to the reforming catalyst 20 is appropriately controlled relative to the amount of fuel F to be supplied to the reforming catalyst 20, in accordance with an oxygen concentration detected by the oxygen sensor 22. Furthermore, the temperature of or relating to the reforming catalyst 20 can be detected by the temperature sensor 23. Accordingly, when the temperature of the reforming catalyst 20 is lower than a certain level at which the reforming catalyst 20 has not been activated, the amount of fuel F to be supplied is decreased while increasing the amount of air A thereby increasing the concentration of oxygen, thus accomplishing an appropriate atmospheric control suitable for production of hydrogen-contained gas.

Hydrogen-contained gas produced by the reforming catalyst 20 is fed through the hydrogen storing device 21 and supplied through the flow amount control valve 24a which is arranged to control the timing of introduction of hydrogen-contained gas into the exhaust gas passageway 10a. For example, in this embodiment, an air-fuel ratio (A/F) detecting device 30 is disposed in the exhaust gas passageway 10a downstream of the closed coupled catalyst 1A. Accordingly, introduction of hydrogen-contained gas through the valve 24a can be effectively carried out at appropriate timings for NOx reduction in the catalyst 2, for example, in accordance with monitored value of A/F of exhaust gas downstream of the catalyst 1A, amount of intake air to be supplied to the engine 10, value of A/F of exhaust gas in the exhaust manifold, and temperature of exhaust gas immediately upstream of the NOx treating catalyst 2.

It is sufficient that the closed coupled catalyst 1A is selected from usual catalysts for purifying exhaust gas, so that it is unnecessary that the closed coupled catalyst 1A is the hydrogen enriching device of the catalyst system according to the present invention (i.e., the hydrogen enriching catalyst such as the hydrogen producing catalyst, the CO and HC selective oxidation catalyst, and the hydrogen consumption suppressing catalyst, or combinations thereof. It is to be noted that using such a hydrogen enriching catalyst is used as the closed coupled catalyst 1A is very effective for controlling the inlet gas composition of the NOx treating catalyst 2.

Next, discussion will be made on supply control of hydrogen-contained gas, operation manner of the exhaust gas purifying system, and the like in this embodiment of FIG. 17.

An example of the hydrogen-contained gas supply control of this embodiment will be discussed with reference to a flowchart of FIG. 20 which is an interruption routine executed at certain timings in the exhaust gas purifying system of this embodiment. The interruption routine is executed by operation of an electronic control unit (like the ECU 13 in FIG. 2), in accordance with data from the temperature sensor, an engine speed sensor (not shown) and an air flow sensor (not shown).

Figure 20:
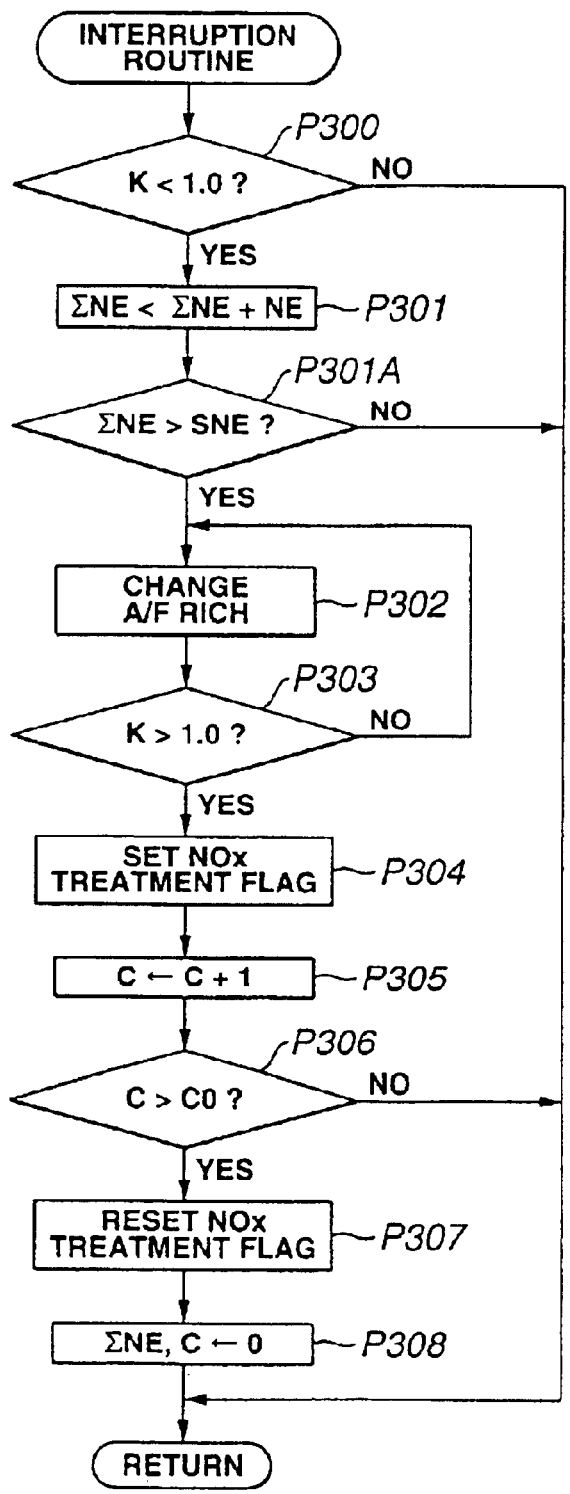
FIG. 20 is a flowchart of an example of hydrogen-contained gas supply control in connection with the exhaust gas purifying system of FIG. 17.

In a routine of the flowchart of FIG. 20, judgement is first made as to whether a correction coefficient K for a basic fuel injection timing TP is smaller than 1.0 or not, i.e., as to whether air-fuel ratio of air-fuel mixture becomes lean or not, at a step P300. When K<1.0 (i.e., lean air-fuel ratio), a flow goes to a step P301 at which the current engine speed NE is added to an accumulated value ΣNM of engine speed thereby presenting a new accumulated value ΣNM, at a step P301. The correction coefficient K corresponds to so-called equivalent ratio (=stoichiometric air-fuel ratio/actual air-fuel ratio). Then, the flow goes to a step P301A at which judgment is made as to whether ΣNM is larger than a value SNE which has been previously determined.

This value SNE has been determined by experiment and represents an accumulated value of engine speed corresponding to a special value (or a NOx semi-saturation trap amount) smaller than a NOx saturation trap amount of a NOx trap agent in the NOx treating catalyst 2. In this embodiment, the NOx trap catalyst is used as the catalyst 2. At the NOx saturation trap amount, the amount of NOx to be trapped in the NOx trap agent is saturated. The NOx saturation trap amount changes depending upon temperature, so that this value SNE is determined taking account of temperature conditions. It is sufficient that the above-mentioned NOx semi-saturation trap amount is smaller than the NOx saturation trap amount; however, the NOx semi-saturation trap amount is preferably set at a value of 50 to 80% by weight of the NOx saturation trap amount in order to securely prevent untreated NOx from being released to atmospheric air.

When ΣNM≦SNE (i.e., the current estimated NOx trap amount is smaller than the NOx semi-saturation amount) at the step P301, the flow of processing cycle is completed. When ΣNM>SNE (i.e., the current estimated NOx trap amount exceeds the NOx semi-saturation amount), the flow goes to a step P302.

At the step P302, an engine air-fuel ratio control flag is set. When this flag is set, the fuel injection amount is controlled in such a manner that the air-fuel ratio of air-fuel mixture to be supplied to the engine becomes rich, under a fuel injection control routine (not shown) executed by the electronic control unit (like that shown in FIG. 2). Accordingly, the air-fuel ratio of exhaust gas to be flown to the NOx trap agent in the catalyst 2 is changed to a rich side (richer than the stoichiometric value).

At a step P303, judgment is made as to whether the air-fuel ratio of exhaust gas upstream of the NOx trap agent is changed to the rich side or not. When the air-fuel ratio is chanted to the rich side, the flow goes to a step P304, a NOx treatment flag is set to accomplish supply of hydrogen-contained gas. Upon setting the NOx treatment flag, the control valve 24a is opened to supply hydrogen-contained gas to the exhaust gas passageway 10a upstream of the NOx treating catalyst 2. It will be understood that detection of the air-fuel ratio can be accomplished, for example, by an oxygen sensor which is arranged to output voltages (proportional to the air-fuel ratio) in a generally ON-OFF manner.

At a step P305, increment of 1 is made on a count value C for setting the NOx treatment flag. At a step P306, judgment is made as to whether the count value C becomes larger than a certain value CO. When C≦CO, the flow of the processing routine is completed. When C>CO, the flow goes to a step P307 at which the NOx treatment flag is reset. When the NOx treatment flag is reset, supply of hydrogen-contained gas is terminated, so that the air-fuel ratio of exhaust gas to be flown into the NOx treating catalyst 2 is restored to the state of being lean (which is the same as that before setting the NOx treatment flag), thus terminating this routine. At step P308, the count value C and the accumulated value of the engine speed ΣNE are set to zero.

Next, operating conditions of the engine provided with the exhaust gas purifying system of this embodiment will be discussed.

Figure 21:
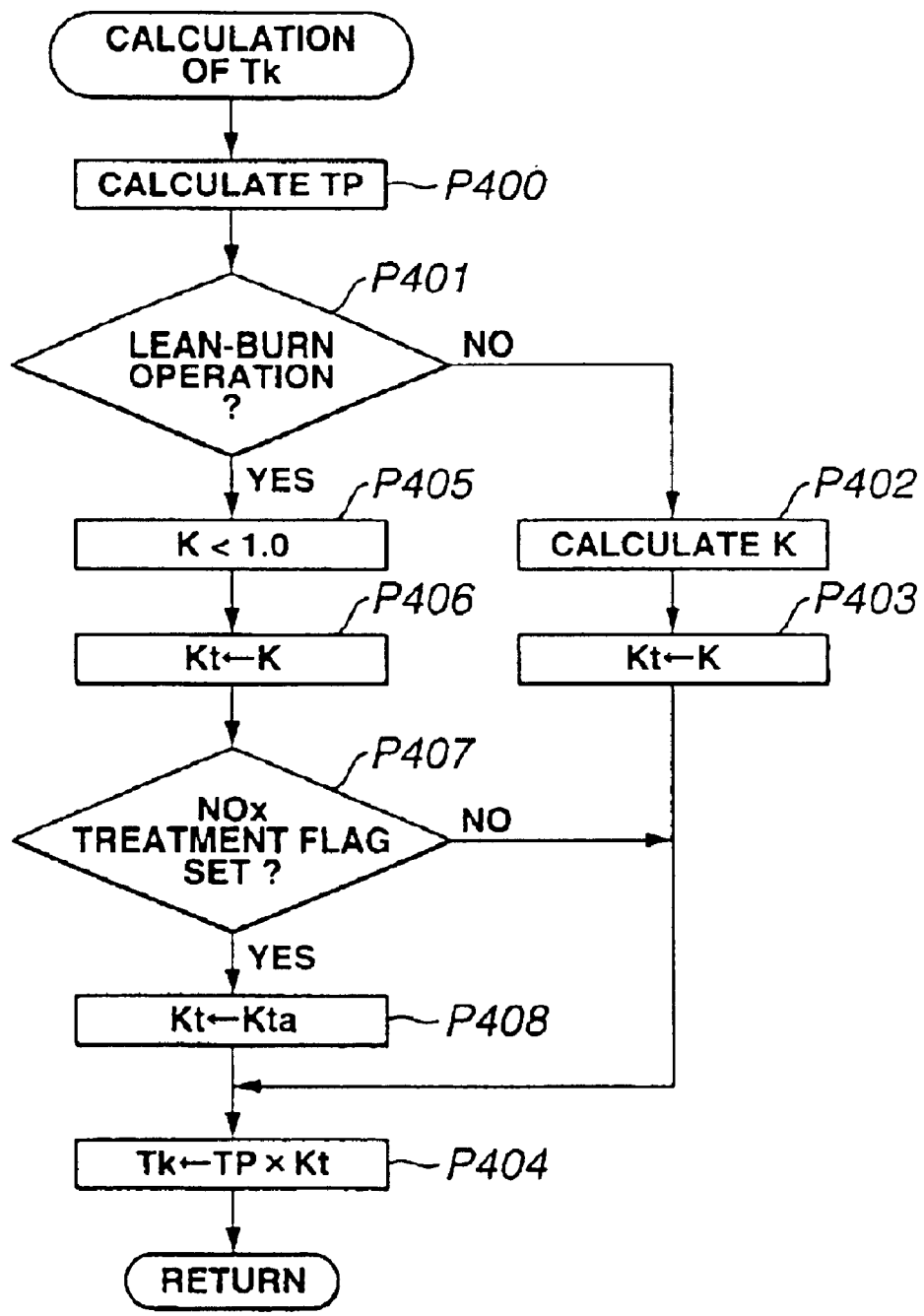
FIG. 21 is a flowchart of an example of operation control for a gasoline-fueled internal combustion engine provided with the exhaust gas purifying system of FIG. 17.

A routine of calculation of fuel injection timing Tk (at which fuel is injected from the fuel injector valve) with reference to a flowchart of FIG. 21 in case of the engine 10 is a gasoline-fueled engine.

First, the basic fuel injection timing TP is calculated at a step P400. Then, judgment is made as to whether the engine is to make a lean-burn operation (on air-fuel mixture having a lean air-fuel ratio) at a step P401. When judgment result is made such that the lean-burn operation is to be made, the correction coefficient K is set at K<1.0 at a step P405. Then, the correction coefficient is set at Kt at a step P406. Then, the flow goes to a step P407 at which judgment is made as to whether the NOx treatment flag has been set or not. When judgment result is made such that the flag has been set, the flow goes to a step P408 at which the fuel injection timing Kt is set at the previously set value Kta so that the lean-burn operation is shifted to a rich-burn operation (on air-fuel mixture having a rich air-fuel ratio) at a step P408. Then, at a step P404, the fuel injection timing Tk is calculated by multiplying TP by Kt.

At the step P401, when the judgment result is such that the engine is not to make the lean-burn operation, the flow goes to a step P402 at which the correction coefficient K is calculated. At a step P403, the correction coefficient K is set at Kt.

Figure 22:
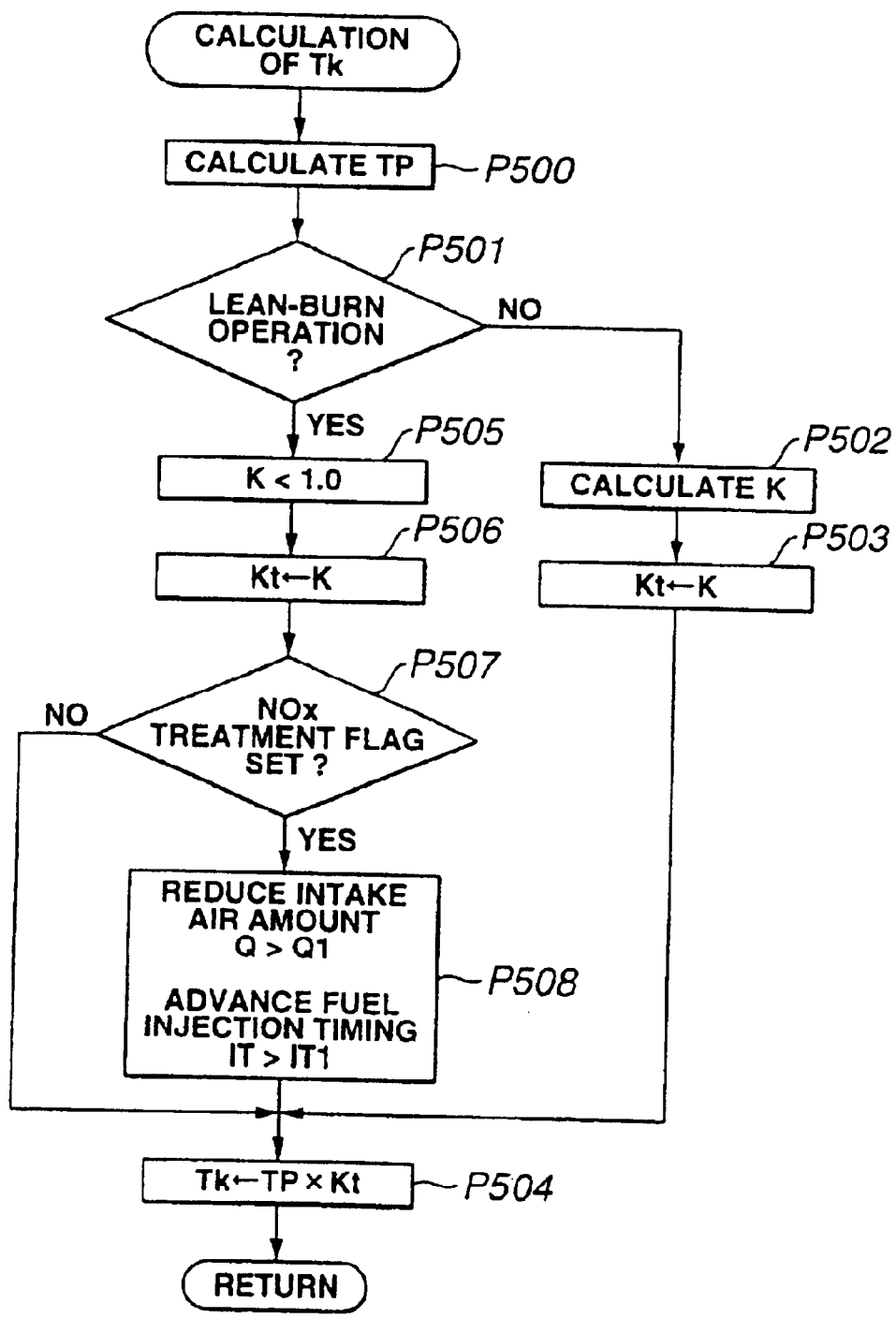
FIG. 22 is a flowchart similar to FIG. 21 but showing another example of operation control for a diesel engine.

FIG. 22 shows a routine of calculation of fuel injection timing Tk (at which fuel is injected from the fuel injector) with reference to a flowchart of FIG. 21 in case that the engine 10 is a diesel engine. In the flowchart, steps P500, P501, P502, P503, P504, P505, P506 and P507 respectively correspond to the steps P400, P401, P402, P403, P404, P405, P406 and P407 in FIG. 21.

In this routine, when the judgment result is made such that the NOx treatment flag has been set at the step P507, the amount of intake air to be supplied to the engine is reduced, and the fuel injection timing is advanced thereby changing the air-fuel ratio of exhaust gas into the rich side, at a step P508. It will be understood that operations at the other steps than the step P508 are similarly carried out to those in FIG. 21.

Figure 23:
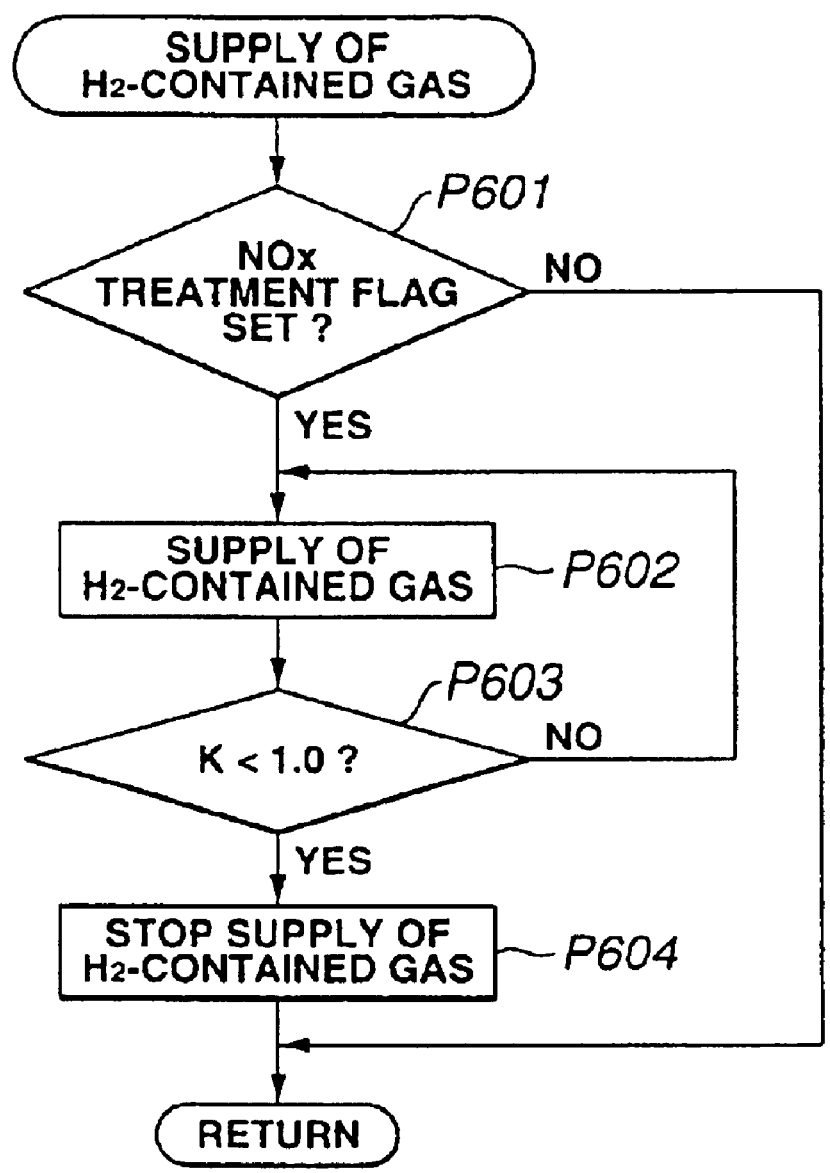
FIG. 23 is a flowchart of an example of hydrogen-contained gas supply control in connection with the exhaust gas purifying system of FIG. 17.

Subsequently, a manner of supply of hydrogen-contained gas will be discussed with a flowchart of FIG. 23.

At a step P601, judgment is made as to whether the NOx treatment flag is set or not. When the judgment result is such that the NOx treatment flag has been set, a flow goes to a step P602 at which the control valve 24a of the hydrogen-contained gas supply device 24 is opened to supply hydrogen-contained gas into the exhaust gas passageway 10a upstream of the NOx treatment catalyst 2.

At a step P603, judgment is made as to whether the air-fuel ratio of exhaust gas is rich or lean. When the judgement result is such that the air-fuel ratio is rich, supply of hydrogen-contained gas is continued. When the judgment result is such that the air-fuel ratio is lean, supply of hydrogen-contained gas is stopped at a step P604.

Figure 24:
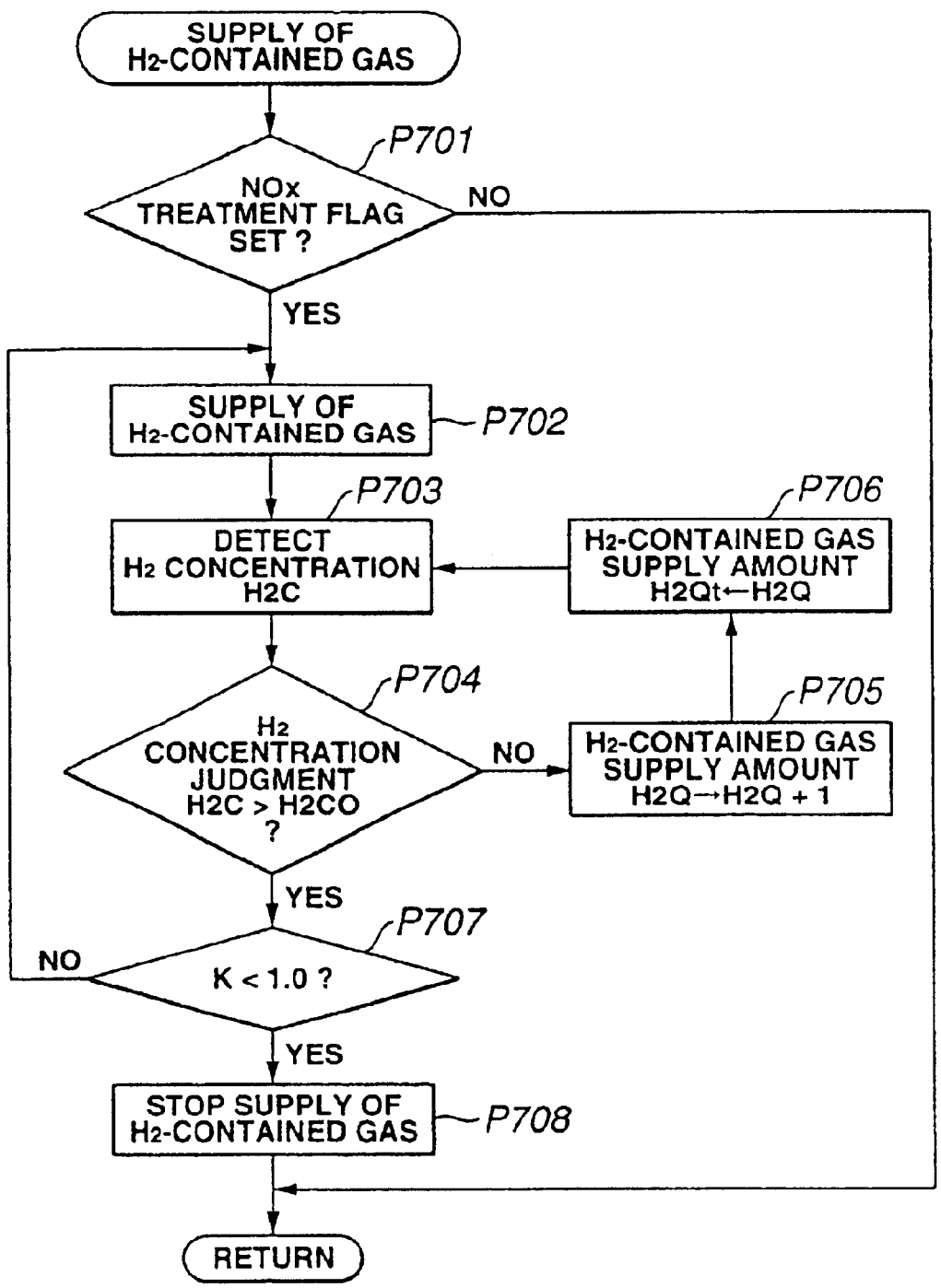
FIG. 24 is a flowchart of another example of hydrogen-contained gas supply control in connection with the exhaust gas purifying system of FIG. 17.

Another manner of supply of hydrogen-contained gas will be discussed with reference to a flowchart of FIG. 24.

At a step P701, judgment is made as to whether the NOx treatment flag is set or not. When the judgment result is such that the NOx treatment flag is set, the control valve 24a of the hydrogen-contained gas supply device 24 is opened thereby supplying hydrogen-contained gas, at a step P702.

Then, the concentration H2C of hydrogen in exhaust gas is detected at a step P703. Judgment is made as to whether the concentration H2C is higher than a certain value H2C0, at a step P704. When the concentration is not higher than H2C0, an amount H2Q of hydrogen-contained gas to be supplied from the hydrogen-contained gas supply device 24 is increased to a value H2Qt, at steps P705 and P706.

At a step P707, judgment is made as to whether the air-fuel ratio of exhaust gas is rich or lean. When the judgment result is such that the air-fuel ratio is rich, supply of hydrogen-contained gas is continued. When the judgment result is such that the air-fuel ratio is lean, supply of hydrogen-contained gas is stopped at a step P708.

Subsequently, a manner of operation control for a hydrocarbon fuel reforming device including the reforming catalyst 20 will be discussed with reference to a flowchart of FIG. 25. In this embodiment of FIG. 17, the exhaust gas purifying system is provided with a fuel supply device (not shown) for supplying fuel F to the reforming catalyst 20 and an air supply device (not shown) for supplying air A to the reforming catalyst 20. Additionally, the oxygen sensor 22 is provided in the exhaust gas passageway 10a upstream of the reforming catalyst 20 in order that the amount of air A to be supplied is controlled in accordance with an oxygen concentation detected by the oxygen sensor 22. The temperature sensor 23 is provided in the exhaust gas passageway downstream of the reforming catalyst 20 in order to detect an operational (temperature) condition of the reforming catalyst 20. The temperature sensor 23 may be provided to detect a temperature at a section of the reforming catalyst at which the temperature is generally the highest in the reforming catalyst.

Figure 25:
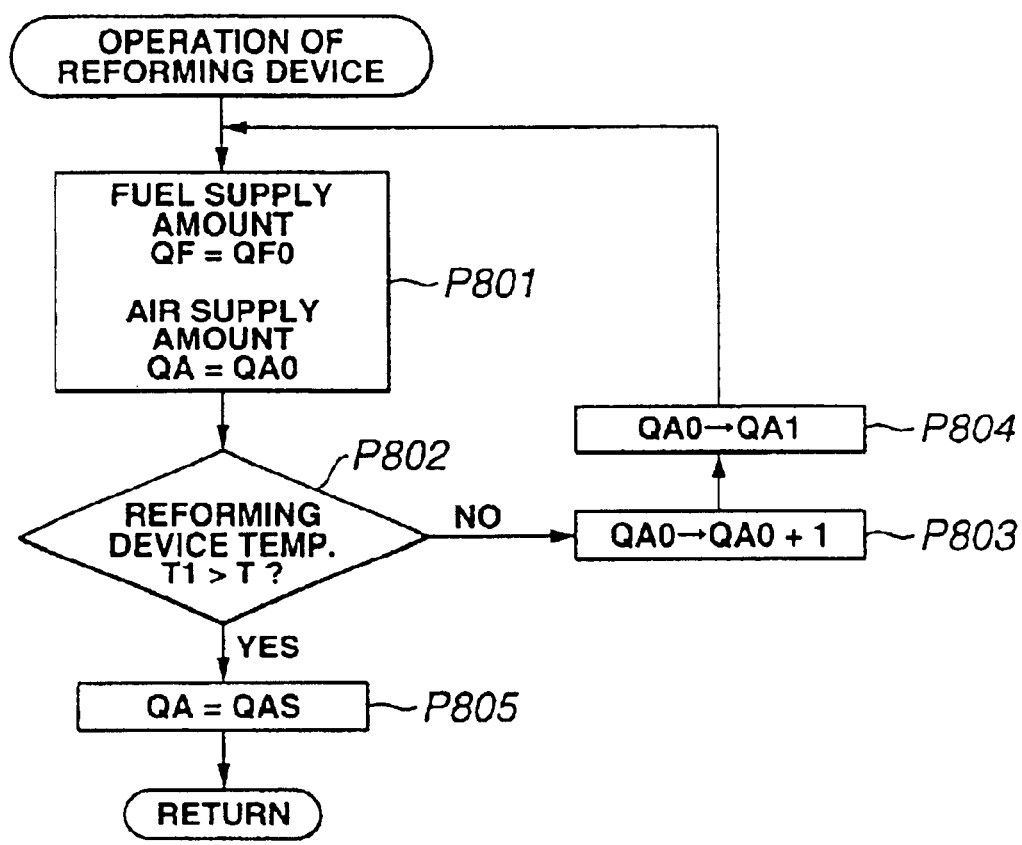
FIG. 25 is a flowchart of an example of operation control for a fuel reforming device in connection with the exhaust gas purifying system of FIG. 17.

In the flowchart of FIG. 25, first the amount QF of fuel F to be supplied is set at a value QF0, while the amount QA of air A to be supplied is set at a value QA0, at a step P801. Then, the temperature T1 of the reforming catalyst 20 is detected by the temperature sensor 23. Judgment is made as to whether the detected temperature T1 is higher than a certain temperature T, at a step P802. When the detected temperature T1 is not higher than T, the air supply amount QA is increased until T1>T is reached (QA0 becomes QA1) at steps P803 and P804. The air supply amount QA1 provides oxygen in an amount larger than that required to reform hydrocarbon fuel F under partial oxidation. By this, hydrocarbon fuel F is oxidized and burned thereby rapidly raising the temperature of the reforming catalyst 20, thus instantly putting the reforming catalyst 20 into a condition for accomplishing reforming operation.

At the step P802, when T1>T, the air supply amount QA is controlled to become a value QAS which provides oxygen in the amount required to reform hydrocarbon fuel F under partial oxidation, at a step P805.

Example 8

Figure 18:
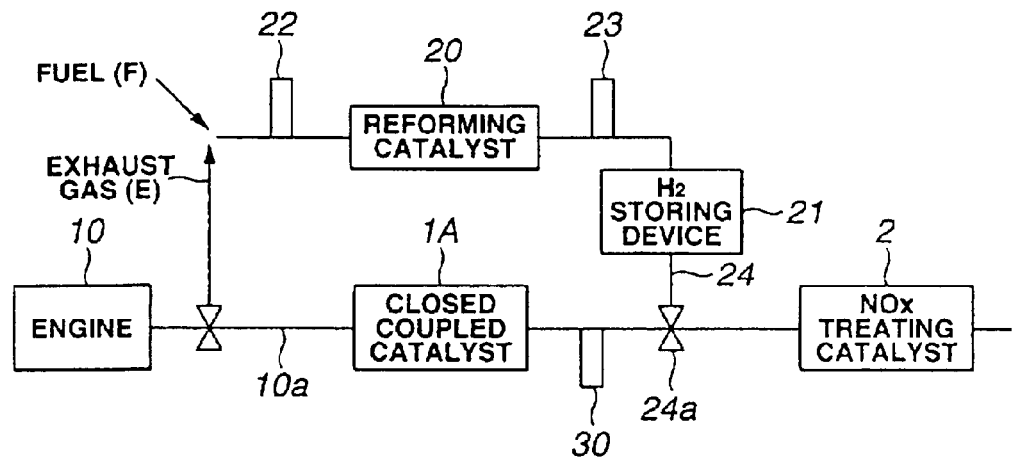
FIG. 18 is a schematic illustration of a further embodiment of the exhaust gas purifying system according to the present invention.

FIG. 18 illustrates a further embodiment of the exhaust gas purifying system according to the present invention, similar to the embodiment of FIG. 17 with the exception that the reforming catalyst 20 is supplied with exhaust gas E discharged from the engine 10 in place of air A, in which exhaust gas E is supplied through the exhaust gas supply device.

By using exhaust gas E discharged from the engine 10 as a source of air to be supplied to the reforming catalyst 20, heat of exhaust gas can be effectively used to rapidly raise the temperature of the reforming catalyst 20 thus to instantly put the reforming catalyst 20 into a condition for accomplishing reforming operation. Additionally, under the action of water vapor in exhaust gas E, steam reforming reaction is used in combination with partial oxidation reaction of hydrocarbon fuel F thereby increasing a hydrogen concentration in hydrogen-contained gas while suppressing consumption of hydrocarbon fuel to be used.

Example 9

Figure 19:
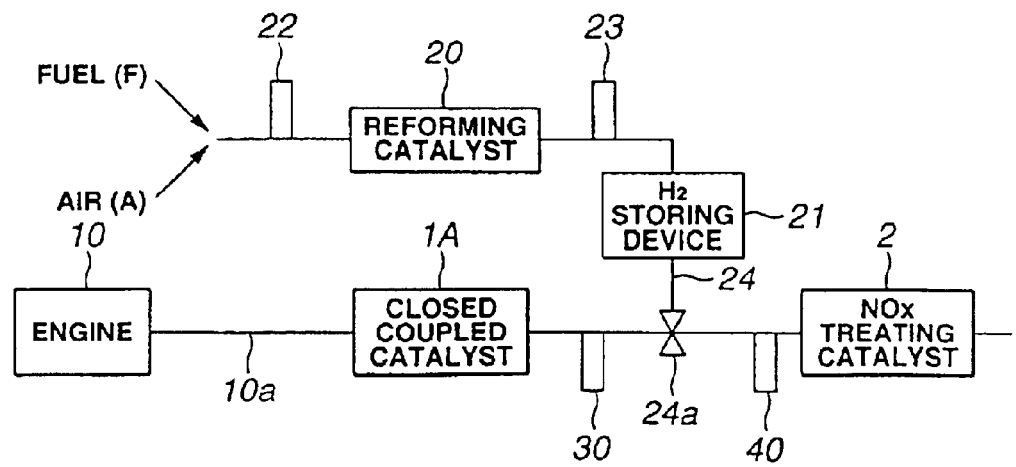
FIG. 19 is a schematic illustration of a further embodiment of the exhaust gas purifying system according to the present invention.

FIG. 19 illustrates a further embodiment of the exhaust gas purifying system according to the present invention, similar to the embodiment of FIG. 17 with the exception that a hydrogen concentration detecting device 40 is disposed in the exhaust gas passageway 10a immediately upstream of the NOx treating catalyst 2. By virtue of the hydrogen concentration detecting device 40, the composition (the rate of $H_2$: [H2/TR]d) of the inlet gas (or gas to be introduced into the NOx treating catalyst 2) of the NOx treating catalyst 2 can be further precisely realized. An example of such a hydrogen concentration detecting device 40 is disclosed in Japanese Patent Application No. 2000-117593 (filed Apr. 19, 2000), in which hydrogen concentration is calculated from variation in methane concentration.

Example 12-1

Activated alumina powder, cerium nitrate, zirconyl nitrate and lanthanum nitrate were mixed with each other, and dried at 150° C. for 3 hours and then fired at 400° C. for 1 hour thereby obtaining Ce-Zre-La-carried alumina powder which had a ratio (calculated as metal) in weight % of Ce/Zr/La= 2/7/7.

The alumina powder containing Ce, Zr and La was impregnated with an aqueous solution of palladium nitrate, and dried and the fired in air at 400° C. for 1 hour thereby obtaining Pd-carried alumina powder (Powder A1) whose concentration of Pd carried was 4% by weight.

The alumina powder containing Ce, Zr and La was impregnated with an aqueous solution of dinitrodiammine platinum, and dried and then fired in air at 400° C. for 1 hour thereby to form Pt-carried alumina powder (Powder B1) whose concentration of Pd carried was 4.0% by weight.

Activated alumina powder was impregnated with an aqueous solution of rhodium nitrate, and dried and then fired in air at 400° C. for 1 hour thereby obtaining Rh-carried alumina powder (Powder C1) whose concentration of Rh carried was 4% by weight.

Then, a porcelain ball mill was charged with 30 g of Powder A1, 70 g of Powder B1, 100 g of alumina and 200 g of water, followed by mixing and pulverizing, thus forming a slurry containing powder whose average particle size was 3.2 μm. This slurry was coated on a cordierite ceramic honeycomb-type monolithic carrier having a volume of 1.3 liter and 400 cells per square inch so that walls of cells were coated with the slurry. Thereafter, the coated monolithic carrier was blown with air stream to remove excessive slurry in the cells and dried at 130° C., and then fired at 400° C. for 1 hour. As a result, a catalyst carrier A1 was prepared in which a catalytic coat layer was formed on the wall of the cells of the monolithic carrier. The weight of the catalytic coat layer was 200 g per one liter of the monolithic carrier.

Additionally, a porcelain ball mill was charged with 30 g of Powder A1, 11 g of Powder B1, 10 g of Powder C1 and 110 g of water, followed by mixing and pulverizing, thus forming a slurry containing powder whose average particle size was 3.2 μm. This slurry was coated on the catalyst carrier A1 so that walls of cells were coated with the slurry. Thereafter, the coated catalyst carrier was blown with air stream to remove excessive slurry in the cells, and dried at 130° C. and then fired at 400° C. for 1 hour. As a result, a catalyst carrier B1 was prepared in which a catalytic coat layer was formed on the wall of the cells of the monolithic carrier. The weight of the catalytic coat layer was 310 g per one liter of the monolithic carrier.

The catalyst carrier B1 was impregnated with an aqueous solution of magnesium acetate, and dried at 130° C. and then fired at 400° C. for 1 hour thereby obtaining a catalyst NR3 which contained 30 g of Mg (calculated as oxide) per one liter of the monolithic carrier.

Example 12-2

Activated alumina powder was impregnated with an aqueous solution of palladium nitrate, and dried and the fired in air at 400° C. for 1 hour thereby obtaining Pd-carried alumina powder (Powder D1) whose concentration of Pd carried was 4% by weight.

Activated alumina powder was impregnated with an aqueous solution of dinitrodiammine platinum, and dried and then fired in air at 400° C. for 1 hour thereby to form Pt-carried alumina powder (Powder E1) whose concentration of Pd carried was 4% by weight.

Activated alumina powder was impregnated with an aqueous solution of rhodium nitrate, and dried and then fired in air at 400° C. for 1 hour thereby obtaining Rh-carried alumina powder (Powder F1) whose concentration of Rh carried was 4% by weight.

Then, a porcelain ball mill was charged with 30 g of Powder D1, 70 g of Powder E1, 100 g of alumina and 200 g of water, followed by mixing and pulverizing, thus forming a slurry containing powder whose average particle size was 3.2 g m. This slurry was coated on a cordierite ceramic honeycomb-type monolithic carrier having a volume of 1.3 liter and 400 cells per square inch so that walls of cells were coated with the slurry. Thereafter, the coated monolithic carrier was blown with air stream to remove excessive slurry in the cells, and dried at 130° C. and then fired at 400° C. for 1 hour. As a result, a catalyst carrier C1 was prepared in which a catalytic coat layer was formed on the wall of the cells of the monolithic carrier. The weight of the catalytic coat layer was 200 g per one liter of the monolithic carrier.

Additionally, a porcelain ball mill was charged with 30 g of Powder D1, 70 g of Powder E1, 10 g of Powder F1 and 110 g of water, followed by mixing and pulverizing, thus forming a slurry containing powder whose average particle size was 3.2 μm This slurry was coated on the catalyst carrier C1 so that walls of cells were coated with the slurry. Thereafter, the coated catalyst carrier was blown with air stream to remove excessive slurry in the cells, and dried at 130° C. and then fired at 400° C. for 1 hour. As a result, a catalyst carrier D1 was prepared in which a catalytic coat layer was formed on the wall of the cells of the monolithic carrier. The weight of the catalytic coat layer was 310 g per one liter of the monolithic carrier.

The catalyst carrier D1 was impregnated with an aqueous solution of magnesium acetate, and dried at 130° C. and then fired at 400° C. for 1 hour thereby obtaining a catalyst NR4 which contained 5 g of Mg (calculated as oxide) per one liter of the monolithic carrier.

Examples 13-1 and 13-2

An exhaust gas purifying system of Examples 13-1 and 13-2 was constructed similarly to that of Example 9-1 with the exception that the catalyst SR3 or SR4 was used in place of the catalyst SR1 while the catalyst NR3 or NR4 was used in place of the catalyst NR1. Further, in this example, the engine 10 was operated similarly to Example 8-1 controlling air-fuel ratio of air-fuel mixture to be supplied to the engine as shown in Tables 2A–2D. The outline of the exhaust gas purifying system of Examples 13-1 and 13-2 are shown in Tables 2A–2D. The washcoat (catalytic coat) layer structure of the catalyst SR3 or SR4 is shown in FIG. 14.

Comparative Example 3

An exhaust gas purifying system of Comparative Example 3 was constructed similarly to the embodiment of FIG. 17 with the exception that only the NOx treating catalyst 2 is disposed in the exhaust passageway 10a connected to the engine 10 (provided with no hydrogen enriching device or means) while omitting the hydrogen-contained gas supply system including the reforming catalyst 20 and the hydrogen-contained gas storing device 21. It is a matter of course that no closed coupled catalyst was provided. The NOx treating catalyst 2 (NR1) was prepared by the same manner as that in Example 1-1. It was demonstrated that this exhaust gas purifying system was insufficient in efficiency for reducing NOx as compared with those of Examples within the scope of the present invention.

Comparative Example 3

An exhaust gas purifying system of Comparative Example 4 was constructed similarly to the embodiment of FIG. 17 with the exception that the closed coupled catalyst (three-way catalyst) was disposed upstream of the NOx treating catalyst 2 in the exhaust passageway 10a connected to the engine 10 (provided with no hydrogen enriching device or means) while omitting the hydrogen-contained gas supply system including the reforming catalyst 20 and the hydrogen-contained gas storing device 21. The NOx treating catalyst 2 (NR1) was prepared by the same manner as that in Example 1-1. It was demonstrated that this exhaust gas purifying system was insufficient in efficiency for reducing NOx as compared with those of Examples within the scope of the present invention.

As apparent from the above, according to the present invention, the particular hydrogen enriching means or device is used in the exhaust gas purifying system so as to control the composition of the reducing components in exhaust gas to be flown to the NOx treating catalyst, particularly the composition ratio of hydrogen in the reducing components and/or the ratio of $CO/H_2$, and to cause the thus controlled exhaust gas to flow into the NOx treating catalyst. As a result, the following particular effects of the present invention can be obtained: The exhaust gas purifying system can remove NOx in exhaust gas at a high efficiency throughout whole engine operating regions from a time immediately after engine starting to a time of making steady state engine operation and effectively remove HC and CO particularly during a low temperature engine operation immediately after engine starting, while obtaining a high fuel economy improvement effect upon making a lean-burn operation of the engine.

The entire contents of Japanese Patent Applications P11-300265 (filed Oct. 21, 1999), P11-347290 (filed Dec. 7, 1999) and P11-356436 (filed Dec. 15, 1999) are incorporated herein by reference.

Although the invention has been described above by reference to certain embodiments of the invention, the invention is not limited to the embodiments and examples described above. Modifications and variations of the embodiments and examples described above will occur to those skilled in the art, in light of the above teachings. The scope of the invention is defined with reference to the following claims.

TABLE 1A

| Sample | Catalyst No. | Structure of catalyst | | | | Carried amount (g/l.) | | |
|---|---|---|---|---|---|---|---|---|
| | | First layer | Second layer | Third layer | Fourth layer | Pd | Pt | Rh |
| Example 1-1 | SRH1 | $Pd/Al_2O_3$ | — | $Rh/Ca_{0.2}Zr_{0.8}O_2$ | — | 11.5 | — | 7.1 |
| | NR1 | $Pd/Al_2O_3$, $Rh/Al_2O_3$, BaO | — | — | — | 3.85 | — | 0.39 |
| Example 1-2 | SRH28 | $Pd/Al_2O_3$, $Pt/Al_2O_3$, $Rh/Al_2O_3$, $CeO_2$ | — | — | — | 13.2 | 0.13 | 0.66 |
| Example 2-1 | SRH2 | $Pd/Al_2O_3$ | — | $Rh/Ca_{0.2}Zr_{0.8}O_2$ | $Pt/W_{0.1}Zr_{0.9}O_2$ | 10.9 | 0.53 | 7.1 |
| Example 2-2 | SRH3 | $Pd/Al_2O_3$ | $Pd/CeO_2$ | $Rh/Ca_{0.2}Zr_{0.8}O_2$ | — | 11.5 | — | 7.1 |
| Example 2-3 | SRH4 | $Pd/Al_2O_3$ | $Pd/CeO_2$ | $Rh/Ca_{0.2}Zr_{0.8}O_2$ | $Pt/W_{0.1}Zr_{0.9}O_2$ | 10.9 | 0.53 | 7.1 |
| Example 2-4 | SRH5 | $Pd/Al_2O_3$ | $Pd/CeO_2$ | $Rh/Ca_{0.01}Zr_{0.99}O_2$ | $Pt/W_{0.1}Zr_{0.9}O_2$ | 10.9 | 0.53 | 7.1 |
| Example 2-5 | SRH6 | $Pd/Al_2O_3$ | $Pd/CeO_2$ | $Rh/Ca_{0.1}Zr_{0.9}O_2$ | $Pt/W_{0.1}Zr_{0.9}O_2$ | 10.9 | 0.53 | 7.1 |
| Example 2-6 | SRH7 | $Pd/Al_2O_3$ | $Pd/CeO_2$ | $Rh/Ca_{0.3}Zr_{0.7}O_2$ | $Pt/W_{0.1}Zr_{0.9}O_2$ | 10.9 | 0.53 | 7.1 |
| Example 2-7 | SRH8 | $Pd/Al_2O_3$ | $Pd/CeO_2$ | $Rh/Ca_{0.5}Zr_{0.5}O_2$ | $Pt/W_{0.1}Zr_{0.9}O_2$ | 10.9 | 0.53 | 7.1 |
| Example 2-8 | SRH9 | $Pd/Al_2O_3$ | $Pd/CeO_2$ | $Rh/Ca_{0.2}Zr_{0.8}O_2$ | $Pt/W_{0.01}Zr_{0.99}O_2$ | 10.9 | 0.53 | 7.1 |
| Example 2-9 | SRH10 | $Pd/Al_2O_3$ | $Pd/CeO_2$ | $Rh/Ca_{0.2}Zr_{0.8}O_2$ | $Pt/W_{0.2}Zr_{0.9}O_2$ | 10.9 | 0.53 | 7.1 |
| Example 2-10 | SRH11 | $Pd/Al_2O_3$ | $Pd/CeO_2$ | $Rh/Ca_{0.2}Zr_{0.8}O_2$ | $Pt/W_{0.5}Zr_{0.5}O_2$ | 10.9 | 0.53 | 7.1 |
| Example 2-11 | SRH12 | $Pd/Al_2O_3$ | $Pd/CeO_2$ | $Rh/Ca_{0.6}Zr_{0.4}O_2$ | $Pt/W_{0.1}Zr_{0.9}O_2$ | 10.9 | 0.53 | 7.1 |
| Example 2-12 | SRH13 | $Pd/Al_2O_3$ | $Pd/CeO_2$ | $Rh/Ca_{0.2}Zr_{0.8}O_2$ | $Pt/W_{0.6}Zr_{0.4}O_2$ | 10.9 | 0.53 | 7.1 |
| Example 2-13 | SRH14 | $Pd/Al_2O_3$ | $Pd/CeO_2$ | $Rh/Mg_{0.1}Zr_{0.9}O_2$ | $Pt/W_{0.1}Zr_{0.9}O_2$ | 10.9 | 0.53 | 7.1 |
| Example 2-14 | SRH15 | $Pd/Al_2O_3$ | $Pd/CeO_2$ | $Rh/Sr_{0.1}Zr_{0.9}O_2$ | $Pt/W_{0.1}Zr_{0.9}O_2$ | 10.9 | 0.53 | 7.1 |
| Example 2-15 | SRH16 | $Pd/Al_2O_3$ | $Pd/CeO_2$ | $Rh/Ba_{0.1}Zr_{0.9}O_2$ | $Pt/W_{0.1}Zr_{0.9}O_2$ | 10.9 | 0.53 | 7.1 |
| Example 2-16 | SRH17 | $Pd/Al_2O_3$ | $Pd/CeO_2$ | $Rh/Ca_{0.15}Sr_{0.05}Zr_{0.8}O_2$ | $Pt/W_{0.1}Zr_{0.9}O_2$ | 10.9 | 0.53 | 7.1 |
| Example 2-17 | SRH18 | $Pd/Al_2O_3$ | $Pd/CeO_2$ | $Rh/Ca_{0.15}Mg_{0.05}Zr_{0.8}O_2$ | $Pt/W_{0.1}Zr_{0.9}O_2$ | 10.9 | 0.53 | 7.1 |

TABLE 1A-continued

| | | Structure of catalyst | | | | Carried amount (g/l.) | | |
|---|---|---|---|---|---|---|---|---|
| Sample | Catalyst No. | First layer | Second layer | Third layer | Fourth layer | Pd | Pt | Rh |
| Example 2-18 | SRH19 | Pd/Al$_2$O$_3$ | Pd/CeO$_2$ | Rh/Ca$_{0.15}$Ba$_{0.05}$Zr$_{0.8}$O$_2$ | Pt/W$_{0.1}$Zr$_{0.9}$O$_2$ | 10.9 | 0.53 | 7.1 |
| Example 2-19 | SRH20 | Pd/Al$_2$O$_3$ | Pd/CeO$_2$ | Rh/Ca$_{0.17}$Sr$_{0.01}$Mg$_{0.01}$Ba$_{0.01}$Zr$_{0.8}$O$_2$ | Pt/W$_{0.1}$Zr$_{0.9}$O$_2$ | 10.9 | 0.53 | 7.1 |
| Example 2-20 | SRH21 | Pd/Al$_2$O$_3$ | Pd/CeO$_2$ | Rh/Ca$_{0.2}$Zr$_{0.8}$O$_2$ | Pt/Ti$_{0.1}$Zr$_{0.9}$O$_2$ | 10.9 | 0.53 | 7.1 |
| Example 2-21 | SRH22 | Pd/Al$_2$O$_3$ | Pd/CeO$_2$ | Rh/Ca$_{0.2}$Zr$_{0.8}$O$_2$ | Pt/Al$_{0.1}$Zr$_{0.9}$O$_2$ | 10.9 | 0.53 | 7.1 |
| Example 2-22 | SRH23 | Pd/Al$_2$O$_3$ | Pd/CeO$_2$ | Rh/Ca$_{0.2}$Zr$_{0.8}$O$_2$ | Pt/Mo$_{0.1}$Zr$_{0.9}$O$_2$ | 10.9 | 0.53 | 7.1 |
| Example 2-23 | SRH24 | Pd/Al$_2$O$_3$ | Pd/CeO$_2$ | Rh/Ca$_{0.2}$Zr$_{0.8}$O$_2$ | Pt/Zn$_{0.1}$Zr$_{0.9}$O$_2$ | 10.9 | 0.53 | 7.1 |
| Example 2-24 | SRH25 | Pd/Al$_2$O$_3$ | Pd/CeO$_2$ | Rh/Ca$_{0.2}$Zr$_{0.8}$O$_2$ | Pt/W$_{0.15}$Ti$_{0.05}$Zr$_{0.8}$O$_2$ | 10.9 | 0.53 | 7.1 |
| Example 2-25 | SRH26 | Pd/Al$_2$O$_3$ | Pd/CeO$_2$ | — | Pt/W$_{0.15}$Al$_{0.05}$Zr$_{0.8}$O$_2$ | 10.9 | 0.53 | 7.1 |
| Example 2-26 | SRH27 | Pd/Al$_2$O$_3$ | Pd/CeO$_2$ | — | Pt/W$_{0.16}$Ti$_{0.01}$Al$_{0.01}$Mo$_{0.01}$Zn$_{0.01}$Zr$_{0.8}$O$_2$ | 10.9 | 0.53 | 7.1 |

TABLE 1B

| | | Structure of catalyst | | | | Carried amount (g/l.) | | |
|---|---|---|---|---|---|---|---|---|
| Sample | Catalyst No. | First layer | Second layer | Third layer | Fourth layer | Pd | Pt | Rh |
| Example 3-1 | SX1 | Pd/Al$_2$O$_3$ | — | — | — | 6.0 | — | — |
| Example 3-2 | SR1 | Rh/ZrO$_2$ | — | — | — | — | — | 6.0 |
| Example 3-3 | SX2 | Pd/Al$_2$O$_3$ | — | — | — | 0.1 | — | — |
| Example 3-4 | SX3 | Pd/Al$_2$O$_3$ | — | — | — | 10.0 | — | — |
| Example 3-5 | SX4 | Pd/Al$_2$O$_3$ | — | — | — | 40.0 | — | — |
| Example 3-6 | SX5 | Pd/Al$_2$O$_3$ | — | — | — | 55.0 | — | — |
| Example 3-7 | SR2 | Rh/ZrO$_2$ | — | — | — | — | — | 0.1 |
| Example 3-8 | SR3 | Rh/ZrO$_2$ | — | — | — | — | — | 10.0 |
| Example 3-9 | SR4 | Rh/ZrO$_2$ | — | — | — | — | — | 40.0 |
| Example 3-10 | SR5 | Rh/ZrO$_2$ | — | — | — | — | — | 55.0 |
| Example 3-11 | SR6 | Rh/Ca$_{0.1}$Zr$_{0.9}$O$_2$ | — | — | — | — | — | 10.0 |
| Example 3-12 | SR7 | Rh/Ca$_{0.2}$Zr$_{0.8}$O$_2$ | — | — | — | — | — | 10.0 |
| Example 3-13 | SR8 | Rh/Ca$_{0.5}$Zr$_{0.5}$O$_2$ | — | — | — | — | — | 10.0 |
| Example 3-14 | SR9 | Rh/Mg$_{0.1}$Zr$_{0.9}$O$_2$ | — | — | — | — | — | 10.0 |
| Example 3-15 | SR10 | Rh/Sr$_{0.1}$Zr$_{0.9}$O$_2$ | — | — | — | — | — | 10.0 |
| Example 3-16 | SR11 | Rh/Ba$_{0.1}$Zr$_{0.9}$O$_2$ | — | — | — | — | — | 10.0 |
| Example 3-17 | SR12 | Rh/Ca$_{0.1}$Mg$_{0.1}$Zr$_{0.8}$O$_2$ | — | — | — | — | — | 10.0 |
| Example 3-18 | SXR1 | Pd/Al$_2$O$_3$ | Rh/ZrO$_2$ | Pd/CeO$_2$ | — | 10.0 | 10.0 | 5.0 |
| Example 3-19 | SXR2 | Pd/Al$_2$O$_3$ | Rh/Ca$_{0.1}$Zr$_{0.9}$O$_2$ | Pd/CeO$_2$ | — | 10.0 | 10.0 | 10.0 |
| Example 3-20 | SXR3 | Pd/Al$_2$O$_3$ | Rh/Mg$_{0.1}$Zr$_{0.9}$O$_2$ | Pd/CeO$_2$ | — | 10.0 | 10.0 | 30.0 |
| Example 3-21 | SXR4 | Pd/Al$_2$O$_3$ | Rh/Sr$_{0.1}$Zr$_{0.9}$O$_2$ | Pd/Zr$_{0.2}$Ce$_{0.8}$O$_2$ | — | 10.0 | 10.0 | 10.0 |
| Example 3-22 | SXR5 | Pd/Al$_2$O$_3$ | Rh/Ba$_{0.1}$Zr$_{0.9}$O$_2$ | Pd/Zr$_{0.5}$Ce$_{0.5}$O$_2$ | — | 10.0 | 10.0 | 10.0 |
| Example 4-1 | NO1 | Pt/Al$_2$O$_3$, BaO | — | — | — | — | 5.0 | — |
| Example 4-2 | NO2 | Pt—Pd/Al$_2$O$_3$, BaO | — | — | — | 5.0 | — | — |
| Example 5-1 | NR2 | Pt/Al$_2$O$_3$, Rh/Al$_2$O$_3$, BaO | — | — | — | — | 3.85 | 0.39 |
| Example 6-1 | SR13 | Pd/ZnO | — | — | — | 8.0 | — | — |
| Example 6-2 | SR14 | Cu$_{0.2}$Zn$_{0.8}$O | — | — | — | — | — | — |
| Comparative Example 1 | TWC1 | Pd/Al$_2$O$_3$, Rh/ZrO$_2$, CeO$_2$, Al$_2$O$_3$ | — | — | — | 6.7 | — | 0.33 |
| Comparative Example 2 | TWC2 | Pd/Al$_2$O$_3$, Pt/Al$_2$O$_3$, Rh/Al$_2$O$_3$, CeO$_2$, ZrO$_2$ | — | — | — | 5.18 | 2.83 | 0.47 |
| Example 12-1 | NR3 | Pd/Al$_2$O$_3$, Pt/Al$_2$O$_3$ | Pd/Al$_2$O$_3$, Pt/Al$_2$O$_3$, Rh/Al$_2$O$_3$ | — | — | 5.4 | 2.2 | 0.9 |
| Example 12-2 | NR4 | Pd/Al$_2$O$_3$, Pt/Al$_2$O$_3$ | Pd/Al$_2$O$_3$, Pt/Al$_2$O$_3$, Rh/Al$_2$O$_3$ | — | — | 4.0 | 4.0 | 0.4 |

TABLE 2A

| | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 7-1 | Improved combustion in engine | SRH1 | — | NR1 | 1.1 | 2.9 | 2.8 | 1.2 | 1.9 | 2.4 |
| Example 7-2 | Improved combustion in engine | SRH28 | — | NR1 | 0.8 | 1.9 | 2.0 | 1.2 | 1.9 | 2.4 |
| Example 8-1 | Repetition of cycle which includes normal operation at A/F = 20 for 30 sec. and atmospheric change at A/F = 11 for 2 sec. after normal operation. | SRH1 | — | NR1 | 1.0 | 2.6 | 2.7 | 1.2 | 1.9 | 2.4 |
| Example 8-2 | Repetition of cycle which includes normal operation at A/F = 20 for 60 sec. and atmospheric change at A/F = 11 for 4 sec. after normal operation. | SRH2 | — | NR1 | 1.2 | 2.9 | 3.0 | 1.2 | 1.9 | 2.3 |
| Example 8-3 | Repetition of cycle which includes normal operation at A/F = 20 for 30 sec. and atmospheric change at A/F = 12 for 2 sec. after normal operation. | SRH3 | — | NR1 | 0.9 | 2.3 | 2.3 | 1.1 | 1.8 | 2.3 |
| Example 8-4 | Repetition of cycle which includes normal operation at A/F = 30 for 30 sec. and atmospheric change at A/F = 10 for 4 sec. after normal operation. | SRH4 | — | NR1 | 0.7 | 1.7 | 1.8 | 1.1 | 1.9 | 2.3 |
| Example 8-5 | Repetition of cycle which includes normal operation at A/F = 20 for 30 sec. and atmospheric change at A/F = 13 for 4 sec. after normal operation. | SRH5 | — | NR1 | 1.0 | 2.6 | 2.7 | 1.0 | 1.8 | 2.3 |
| Example 8-6 | Repetition of cycle which includes normal operation at A/F = 20 for 60 sec. and atmospheric change at A/F = 11 for 4 sec. after normal operation. | SRH6 | — | NR1 | 1.7 | 4.2 | 4.3 | 0.9 | 1.8 | 2.2 |
| Example 8-7 | Repetition of cycle which includes normal operation at A/F = 20 for 30 sec. and atmospheric change at A/F = 13 for 2 sec. after normal operation. | SRH7 | — | NR2 | 0.4 | 1.0 | 1.0 | 1.2 | 1.7 | 2.2 |
| Example 8-8 | Repetition of cycle which includes normal operation at A/F = 20 for 30 sec. and atmospheric change at A/F = 11 for 2 sec. after normal operation. | SRH8 | — | NR1 | 0.4 | 1.1 | 1.2 | 1.2 | 1.7 | 2.3 |

TABLE 2B

| | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 8-9 | Repetition of cycle which includes normal operation at A/F = 20 for 30 sec. and atmospheric change at A/F = 11 for 2 sec. after normal operation. | SRH9 | — | NR1 | 0.8 | 2.0 | 2.1 | 1.2 | 1.6 | 2.2 |
| Example 8-10 | Repetition of cycle which includes normal operation at A/F = 20 for 30 sec. and atmospheric change at A/F = 11 for 2 sec. after normal operation. | SRH10 | — | NR1 | 0.7 | 1.8 | 1.8 | 1.1 | 1.6 | 2.2 |
| Example 8-11 | Repetition of cycle which includes normal operation at A/F = 20 for 30 sec. and atmospheric change at A/F = 11 for 2 sec. after normal operation. | SRH11 | — | NR1 | 1.0 | 2.5 | 2.6 | 1.1 | 1.9 | 2.1 |
| Example 8-12 | Repetition of cycle which includes normal operation at A/F = 20 for 30 sec. and atmospheric change at A/F = 11 for 2 sec. after normal operation. | SRH12 | — | NR1 | 1.1 | 2.8 | 2.9 | 1.1 | 1.9 | 2.1 |
| Example 8-13 | Repetition of cycle which includes normal operation at A/F = 20 for 30 sec. and atmospheric change at A/F = 11 for 2 sec. after normal operation. | SRH13 | — | NR1 | 1.3 | 3.3 | 3.4 | 1.1 | 1.8 | 2.0 |
| Example 8-14 | Repetition of cycle which includes normal operation at A/F = 20 for 30 sec. and atmospheric change at A/F = 11 for 2 sec. after normal operation. | SRH14 | — | NR1 | 1.2 | 3.1 | 3.1 | 1.0 | 1.8 | 2.0 |
| Example 8-15 | Repetition of cycle which includes normal operation at A/F = 20 for 30 sec. and atmospheric change at A/F = 11 for 2 sec. after normal operation. | SRH15 | — | NR1 | 1.1 | 2.8 | 2.9 | 1.0 | 1.7 | 1.9 |
| Example 8-16 | Repetition of cycle which includes normal operation at A/F = 20 for 30 sec. and atmospheric change at A/F = 11 for 2 sec. after normal operation. | SRH16 | — | NR1 | 1.0 | 2.5 | 2.6 | 1.0 | 1.7 | 1.9 |
| Example 8-17 | Repetition of cycle which includes normal operation at A/F = 20 for 30 sec. and atmospheric change at A/F = 11 for 2 sec. after normal operation. | SRH17 | — | NR1 | 1.4 | 3.6 | 3.7 | 1.0 | 1.6 | 2.0 |
| Example 8-18 | Repetition of cycle which includes normal operation at A/F = 20 for 30 sec. and atmospheric change at A/F = 11 for 2 sec. after normal operation. | SRH18 | — | NR1 | 1.1 | 2.8 | 2.9 | 1.2 | 1.9 | 2.4 |
| Example 8-19 | Repetition of cycle which includes normal operation at A/F = 20 for 30 sec. and atmospheric change at A/F = 11 for 2 sec. after normal operation. | SRH19 | — | NR1 | 1.0 | 2.5 | 2.6 | 1.3 | 1.9 | 2.4 |
| Example 8-20 | Repetition of cycle which includes normal operation at A/F = 20 for 30 sec. and atmospheric change at A/F = 11 for 2 sec. after normal operation. | SRH20 | — | NR1 | 1.3 | 3.3 | 3.4 | 1.3 | 1.9 | 2.3 |

TABLE 2B-continued

|  | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 8-21 | Repetition of cycle which includes normal operation at A/F = 20 for 30 sec. and atmospheric change at A/F = 11 for 2 sec. after normal operation. | SRH21 | — | NR1 | 0.7 | 1.8 | 1.8 | 1.2 | 1.8 | 2.3 |
| Example 8-22 | Repetition of cycle which includes normal operation at A/F = 20 for 30 sec. and atmospheric change at A/F = 11 for 2 sec. after normal operation. | SRH22 | — | NR1 | 0.6 | 1.5 | 1.6 | 1.2 | 1.8 | 2.2 |
| Example 8-23 | Repetition of cycle which includes normal operation at A/F = 20 for 30 sec. and atmospheric change at A/F = 11 for 2 sec. after normal operation. | SRH23 | — | NR1 | 0.4 | 1.0 | 1.0 | 1.2 | 1.7 | 2.2 |
| Example 8-24 | Repetition of cycle which includes normal operation at A/F = 20 for 30 sec. and atmospheric change at A/F = 11 for 2 sec. after normal operation. | SRH24 | — | NR1 | 1.8 | 4.6 | 4.7 | 1.1 | 1.7 | 2.1 |
| Example 8-25 | Repetition of cycle which includes normal operation at A/F = 20 for 30 sec. and atmospheric change at A/F = 11 for 2 sec. after normal operation. | SRH25 | — | NR1 | 1.2 | 3.1 | 3.1 | 1.2 | 1.6 | 2.1 |
| Example 8-26 | Repetition of cycle which includes normal operation at A/F = 20 for 30 sec. and atmospheric change at A/F = 11 for 2 sec. after normal operation. | SRH26 | — | NR1 | 1.1 | 2.8 | 2.9 | 1.2 | 1.6 | 2.0 |
| Example 8-27 | Repetition of cycle which includes normal operation at A/F = 20 for 30 sec. and atmospheric change at A/F = 11 for 2 sec. after normal operation. | SRH27 | — | NR1 | 1.3 | 3.3 | 3.4 | 1.1 | 1.6 | 2.0 |

TABLE 2C

|  | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 9-1 | Repetition of cycle which includes normal operation at A/F = 20 for 30 sec. and atmospheric change at A/F = 11 for 2 sec. after normal operation. | SX1 | SR1 | NR1 | 1.2 | 3.1 | 3.1 | 1.3 | 1.9 | 2.4 |
| Example 9-2 | Repetition of cycle which includes normal operation at A/F = 20 for 30 sec. and atmospheric change at A/F = 11 for 2 sec. after normal operation. | SX1 | SR2 | NR1 | 1.3 | 3.3 | 3.4 | 1.2 | 1.8 | 2.2 |
| Example 9-3 | Repetition of cycle which includes normal operation at A/F = 20 for 30 sec. and atmospheric change at A/F = 11 for 2 sec. after normal operation. | SX1 | SR3 | NR1 | 1.2 | 3.1 | 3.1 | 1.1 | 1.7 | 2.1 |
| Example 9-4 | Repetition of cycle which includes normal operation at A/F = 20 for 30 sec. and atmospheric change at A/F = 11 for 2 sec. after normal operation. | SX1 | SR4 | NR1 | 1.5 | 3.8 | 3.9 | 1.1 | 1.8 | 1.9 |
| Example 9-5 | Repetition of cycle which includes normal operation at A/F = 20 for 30 sec. and atmospheric change at A/F = 11 for 2 sec. after normal operation. | SX1 | SR5 | NR1 | 1.6 | 4.1 | 4.2 | 1.2 | 1.8 | 2.0 |
| Example 9-6 | Repetition of cycle which includes normal operation at A/F = 20 for 30 sec. and atmospheric change at A/F = 11 for 2 sec. after normal operation. | SX1 | SR6 | NR1 | 1.2 | 3.1 | 3.1 | 1.2 | 1.7 | 2.0 |
| Example 9-7 | Repetition of cycle which includes normal operation at A/F = 20 for 30 sec. and atmospheric change at A/F = 11 for 2 sec. after normal operation. | SX1 | SR7 | NR1 | 1.1 | 2.8 | 2.9 | 1.2 | 1.8 | 2.1 |
| Example 9-8 | Repetition of cycle which includes normal operation at A/F = 20 for 30 sec. and atmospheric change at A/F = 11 for 2 sec. after normal operation. | SX1 | SR8 | NR1 | 1.3 | 3.3 | 3.4 | 1.2 | 1.7 | 1.9 |
| Example 9-9 | Repetition of cycle which includes normal operation at A/F = 20 for 30 sec. and atmospheric change at A/F = 11 for 2 sec. after normal operation. | SX1 | SR9 | NR1 | 1.5 | 3.8 | 3.9 | 1.3 | 1.6 | 2.1 |
| Example 9-10 | Repetition of cycle which includes normal operation at A/F = 20 for 30 sec. and atmospheric change at A/F = 11 for 2 sec. after normal operation. | SX1 | SR10 | NR1 | 1.6 | 4.1 | 4.2 | 1.3 | 1.6 | 2.2 |
| Example 9-11 | Repetition of cycle which includes normal operation at A/F = 20 for 30 sec. and atmospheric change at A/F = 11 for 2 sec. after normal operation. | SX1 | SR11 | NR1 | 1.7 | 4.3 | 4.5 | 1.2 | 1.7 | 2.0 |
| Example 9-12 | Repetition of cycle which includes normal operation at A/F = 20 for 30 sec. and atmospheric change at A/F = 11 for 2 sec. after normal operation. | SX1 | SR12 | NR1 | 1.8 | 4.6 | 4.7 | 1.2 | 1.8 | 2.1 |
| Example 9-13 | Repetition of cycle which includes normal operation at A/F = 20 for 30 sec. and atmospheric change at A/F = 11 for 2 sec. after normal operation. | SX2 | SR6 | NR1 | 1.5 | 3.8 | 3.9 | 1.1 | 1.9 | 1.9 |
| Example 9-14 | Repetition of cycle which includes normal operation at A/F = 20 for 30 sec. and atmospheric change at A/F = 11 for 2 sec. after normal operation. | SX3 | SR6 | NR1 | 1.3 | 3.3 | 3.4 | 1.1 | 1.8 | 1.9 |

TABLE 2C-continued

| | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 9-15 | Repetition of cycle which includes normal operation at A/F = 20 for 30 sec. and atmospheric change at A/F = 11 for 2 sec. after normal operation. | SX4 | SR6 | NR1 | 1.2 | 3.1 | 3.1 | 1.1 | 1.8 | 2.0 |
| Example 9-16 | Repetition of cycle which includes normal operation at A/F = 20 for 30 sec. and atmospheric change at A/F = 11 for 2 sec. after normal operation. | SX5 | SR6 | NR1 | 1.2 | 3.1 | 3.1 | 1.2 | 1.8 | 2.0 |
| Example 9-17 | Repetition of cycle which includes normal operation at A/F = 20 for 30 sec. and atmospheric change at A/F = 11 for 2 sec. after normal operation. | SXR1 | — | NR1 | 1.1 | 2.8 | 2.9 | 1.1 | 1.9 | 2.1 |
| Example 9-18 | Repetition of cycle which includes normal operation at A/F = 20 for 30 sec. and atmospheric change at A/F = 11 for 2 sec. after normal operation. | SXR2 | — | NR1 | 1.1 | 2.8 | 2.9 | 1.2 | 1.8 | 2.1 |

TABLE 2D

| | Control manner of engine | Catalysts 1-1 | Catalysts 1-2 | Catalysts 2 | E.O.E. $[H_2/TR]u$ | Inlet gas composition $[H_2/TR]d$ | Inlet gas composition $[H_2/CO]d$ | Remaining rate (%) HC | Remaining rate (%) CO | Remaining rate (%) NOx |
|---|---|---|---|---|---|---|---|---|---|---|
| Example 9-19 | Repetition of cycle which includes normal operation at A/F = 20 for 30 sec. and atmospheric change at A/F = 11 for 2 sec. after normal operation. | SXR3 | — | NR1 | 1.3 | 3.3 | 3.4 | 1.3 | 1.8 | 2.2 |
| Example 9-20 | Repetition of cycle which includes normal operation at A/F = 20 for 30 sec. and atmospheric change at A/F = 11 for 2 sec. after normal operation. | SXR4 | — | NR1 | 1.4 | 3.6 | 3.7 | 1.1 | 1.9 | 2.1 |
| Example 9-21 | Repetition of cycle which includes normal operation at A/F = 20 for 30 sec. and atmospheric change at A/F = 11 for 2 sec. after normal operation. | SXR5 | — | NR1 | 1.3 | 3.3 | 3.4 | 1.2 | 1.8 | 2.1 |
| Example 9-22 | Repetition of cycle which includes normal operation at A/F = 20 for 30 sec. and atmospheric change at A/F = 11 for 2 sec. after normal operation. | SXR1 | SR1 | NR2 | 1.2 | 3.1 | 3.1 | 1.1 | 1.9 | 1.9 |
| Example 9-23 | Repetition of cycle which includes normal operation at A/F = 20 for 30 sec. and atmospheric change at A/F = 11 for 2 sec. after normal operation. | SXR2 | SR6 | NR2 | 1.1 | 2.8 | 2.9 | 1.1 | 1.8 | 1.9 |
| Example 10-1 | Repetition of cycle which includes normal operation at A/F = 20 for 30 sec. and atmospheric change at A/F = 11 for 2 sec. after normal operation. | SXR3 | NO1 | NR1 | 1.2 | 3.0 | 3.1 | 1.1 | 1.8 | 2.0 |
| Example 10-2 | Repetition of cycle which includes normal operation at A/F = 20 for 30 sec. and atmospheric change at A/F = 11 for 2 sec. after normal operation. | SXR4 | NO2 | NR1 | 1.2 | 3.0 | 3.0 | 1.2 | 1.8 | 2.0 |
| Example 11-1 | Repetition of cycle which includes normal operation at A/F = 20 for 30 sec. and atmospheric change at A/F = 11 for 2 sec. after normal operation. | SX1 | SR13 | NR1 | 1.2 | 2.9 | 3.0 | 1.1 | 1.9 | 1.9 |
| Example 11-2 | Repetition of cycle which includes normal operation at A/F = 20 for 30 sec. and atmospheric change at A/F = 11 for 2 sec. after normal operation. | SX1 | SR14 | NR1 | 1.2 | 3.1 | 3.1 | 1.1 | 1.8 | 1.9 |
| Comparative Example 3 | Improved combustion in engine | — | — | NR1 | 1.03 | — | 1.12 | 4.2 | 7.1 | 7.3 |
| Comparative Example 4 | Improved combustion in engine | TWC1 | — | NR1 | 1.03 | 0.39 | 0.4 | 2.3 | 3.0 | 8.5 |
| Comparative Example 5 | Repetition of cycle which includes normal operation at A/F = 20 for 30 sec. and atmospheric change at A/F = 11 for 2 sec. after normal operation. | TWC2 | — | NR1 | 1.03 | 0.39 | 0.4 | 1.8 | 2.2 | 7.8 |
| Example 13-1 | Repetition of cycle which includes normal operation at A/F = 20 for 30 sec. and atmospheric change at A/F = 11 for 2 sec. after normal operation. | SX1 | SR13 | NR3 | 1.2 | 2.9 | 3.0 | 1.1 | 1.8 | 1.9 |
| Example 13-2 | Repetition of cycle which includes normal operation at A/F = 20 for 30 sec. and atmospheric change at A/F = 11 for 2 sec. after normal operation. | SX1 | SR14 | NR4 | 1.2 | 3.1 | 3.1 | 1.1 | 1.8 | 2.0 |

What is claimed is:

1. A method of purifying exhaust gas from a combustion device provided with an exhaust gas purifying system including a NOx treating disposed in an exhaust gas passageway of the combustion device, a NOx treating catalyst reducing NOx in presence of reducing components in exhaust gas, said method comprising:

increasing a ratio of hydrogen to total reducing components in at least one of combustion gas or exhaust gas to be supplied to the NOx treating catalyst so as to meet relations represented by the following formulae (1) and (2), when reduction of NOx is carried out by said NOx treating catalyst:

$$[H2/TR]d > [H2/TR]u \quad (1)$$
$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of said hydrogen enriching or combustion gas in a state before undergoing the hydrogen ratio increasing; and [H2/TR]d is a ratio between a concentration [H2]d of hydrogen and a concentration [TR]d of total reducing components in exhaust gas in the exhaust gas passageway upstream of the NOx treating catalyst and in a state after undergoing the hydrogen ratio increasing, wherein said ratio of hydrogen to total reducing components is increased by at least one selected from the group consisting of producing hydrogen in at least one of combustion gas or exhaust gas, decreasing the reducing components other than hydrogen in at least one of combustion gas and or exhaust gas, and suppressing consumption of hydrogen in at least one of combustion gas or exhaust gas, wherein increasing said ratio of hydrogen to total reducing components is carried out by a device including a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount, fuel injection timing, spark timing, opening and closing timings of intake and exhaust valves of the internal combustion engine, to control at least one of combustion gas or exhaust gas flowing into the catalyst; and increasing a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of said device including a catalyst, when reduction of NOx is carried out by said NOx treating catalyst.

2. An exhaust gas purifying system comprising:

a NOx treating catalyst for reducing NOx disposed in an exhaust gas passageway of a combustion device, to reduce NOx in presence of reducing components in exhaust gas; and means for enriching hydrogen disposed upstream of said NOx treating catalyst with respect to flow of exhaust gas from the combustion device, said hydrogen enriching means is for increasing a ratio of hydrogen to total reducing components in at least one of combustion gas or exhaust gas so as to meet relations represented by the following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of said hydrogen enriching device or combustion gas in a state before undergoing the hydrogen ratio increasing by said hydrogen enriching means; and [H2/TR]d is a ratio between a concentration [H2]d of hydrogen and a concentration [TR]d of total reducing components in exhaust gas in the exhaust gas passageway upstream of the NOx treating catalyst and downstream of said hydrogen enriching means, wherein said means for enriching hydrogen is at least one selected from the group consisting of a means for producing hydrogen in at least one of combustion gas or exhaust gas, a means for decreasing the reducing components other than hydrogen in at least one of combustion gas or exhaust gas, and a means for suppressing consumption of hydrogen in at least one of combustion gas or exhaust gas, wherein said means for enriching hydrogen includes a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount, fuel injection timing, spark timing opening and closing timings of intake and exhaust valves of the internal combustion engine, to control at least one of combustion gas or exhaust gas flowing into the catalyst, wherein said means for enriching hydrogen is arranged to increase a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of said means for enriching hydrogen, when reduction of NOx is carried out by said NOx treating catalyst.

3. An exhaust gas purifying system comprising:

a NOx treating catalyst for reducing NOx disposed in an exhaust gas passageway of a combustion device, to reduce NOx in presence of reducing components in exhaust gas; and a hydrogen enriching device disposed upstream of said NOx treating catalyst with respect to flow of exhaust gas from the combustion device and arranged to increase a ratio of hydrogen to total reducing components in at least one of combustion gas or exhaust gas so as to meet relations represented by following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of said hydrogen enriching device or combustion gas in a state before undergoing the hydrogen ratio increasing by said hydrogen enriching device; and [H2/TR]d is a ratio between a concentration [H2]d of hydrogen and a concentration [TR]d of total reducing components in exhaust gas in the exhaust gas passageway upstream of the NOx treating catalyst and downstream of said hydrogen enriching device, and wherein both the NOx treating catalyst and the hydrogen enriching device are disposed in the exhaust passageway and wherein exhaust gas passes through the hydrogen enriching device, wherein the hydrogen enriching device includes a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount, fuel injection timing, spark timing, opening and closing timings of intake and exhaust valves of the internal combustion engine, to control at least one of combustion gas or exhaust gas flowing into the catalyst, wherein said hydrogen enriching device is arranged to increase a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of said hydrogen enriching device, when reduction of NOx is carried out by said NOx treating catalyst.

4. An exhaust gas purifying system comprising:

a NOx treating catalyst for reducing NOx disposed in an exhaust gas passageway of a combustion device, to reduce NOx in presence of reducing components in exhaust gas; and a hydrogen enriching device disposed upstream of said NOx treating catalyst with respect to flow of exhaust gas from the combustion device and arranged to increase a ratio of hydrogen to total reducing components in at least one of combustion gas or exhaust gas so as to meet relations represented by following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where $[H2/TR]u$ is a ratio between a concentration $[H2]u$ of hydrogen and a concentration $[TR]u$ of total reducing components in at least one of exhaust gas in the exhaust gas passageway upstream of said hydrogen enriching device or combustion gas in a state before undergoing the hydrogen ratio increasing by said hydrogen enriching device; and $[H2/TR]d$ is a ratio between a concentration $[H2]d$ of hydrogen and a concentration $[TR]d$ of total reducing components in exhaust gas in the exhaust gas passageway upstream of the NOx treating catalyst and downstream of said hydrogen enriching device, wherein said hydrogen enriching device includes a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount fuel injection timing, spark timing, opening and closing timings of intake and exhaust valves of the internal combustion engine, to control at least one of combustion gas or exhaust gas flowing into the catalyst, wherein said hydrogen enriching device is arranged to increase a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of said hydrogen enriching device, when reduction of NOx is carried out by said NOx treating catalyst.

5. An exhaust gas purifying system as claimed in claim 4, wherein said hydrogen enriching device is a device for suppressing consumption of hydrogen in exhaust gas.

6. An exhaust gas purifying system as claimed in claim 4, wherein said hydrogen enriching device is a device for decreasing the reducing components other than hydrogen in at least one of combustion gas or exhaust gas.

7. An exhaust gas purifying system comprising:

a NOx treating catalyst for reducing NOx disposed in an exhaust gas passageway of a combustion device, to reduce NOx in presence of reducing components in exhaust gas; and a hydrogen enriching device disposed upstream of said NOx treating catalyst with respect to flow of exhaust gas from the combustion device and arranged to increase a ratio of hydrogen to total reducing components in at least one of combustion gas or exhaust gas so as to meet relations represented by following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where $[H2/TR]u$ is a ratio between a concentration $[H2]u$ of hydrogen and a concentration $[TR]u$ of total reducing components in at least one of exhaust gas in the exhaust gas passageway upstream of said hydrogen enriching device or combustion gas in a state before undergoing the hydrogen ratio increasing by said hydrogen enriching device; and $[H2/TR]d$ is a ratio between a concentration $[H2]d$ of hydrogen and a concentration $[TR]d$ of total reducing components in exhaust gas in the exhaust gas passageway upstream of the NOx treating catalyst and downstream of said hydrogen enriching device, wherein the hydrogen enriching device produces hydrogen from HC and CO in at least one of combustion gas or exhaust gas, wherein the hydrogen enriching device for enriching hydrogen in at least one of combustion gas or exhaust gas includes at least a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount, fuel injection timing, spark timing, opening and closing timings of intake and exhaust valves of the internal combustion engine, to control at least one of combustion gas or exhaust gas flowing into the catalyst, wherein said hydrogen enriching device is arranged to increase a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [Co]d of carbon monoxide in the total reducing components in exhaust gas in the exhaust passageway immediately upstream of the NOx treating catalyst and downstream of said hydrogen enriching device, when reduction of NOx is carried out by said NOx treating catalyst.

8. An exhaust gas purifying system as claimed in claim 7, wherein the hydrogen enriching device includes a first catalytic component for oxidizing HC and CO to decrease oxygen, said first catalytic component being disposed in a first section of the hydrogen enriching device, and a second catalytic component for producing hydrogen and disposed in a second section of the hydrogen enriching device, the second section being located downstream of the first section with respect to flow of exhaust gas, so that an amount of oxygen contacting the second catalytic component is decreased.

9. An exhaust gas purifying system comprising:
a NOx treating catalyst for reducing NOx disposed in an exhaust gas passageway of a combustion device, to reduce NOx in presence of reducing components in exhaust gas; and
a hydrogen enriching device disposed upstream of said NOx treating catalyst with respect to flow of exhaust gas from the combustion device and arranged to increase a ratio of hydrogen to total reducing components in at least one of combustion gas or exhaust gas so as to meet relations represented by following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of said hydrogen enriching device and or combustion gas in a state before undergoing the hydrogen ratio increasing by said hydrogen enriching device; and [H2/TR]d is a ratio between a concentration [H2]d of hydrogen and a concentration [TR]d of total reducing components in exhaust gas in the exhaust gas passageway upstream of the NOx treating catalyst and downstream of said hydrogen enriching device, wherein said hydrogen enriching device is at least one selected from the group consisting of a device for producing hydrogen in at least one of combustion gas or exhaust gas, a device for decreasing the reducing components other than hydrogen in at least one of combustion gas or exhaust gas, and a device for suppressing consumption of hydrogen in at least one of combustion gas a or exhaust gas, wherein said hydrogen enriching device includes a catalyst containing at least one of a first catalytic component including platinum and zirconium oxide or a second catalytic component including rhodium and zirconium oxide, and a combustion control device for controlling at least one selected from the group consisting of operating parameters of an internal combustion engine and combinations of the operating parameters, the operating parameters including fuel injection amount, fuel injection timing, spark timing, opening and closing timings of intake and exhaust valves of the internal combustion engine, to control at least one of combustion pas or exhaust gas flowing into the catalyst, wherein said hydrogen enriching device is arranged to increase a ratio of hydrogen to carbon monoxide in the total reducing components in exhaust gas so as to meet a relation represented by the following formula [H2/CO]d>1 where [H2/CO]d is a ratio between a concentration [H2]d of hydrogen and a concentration [CO]d of carbon monoxide in the total reducing components in exhaust gas in the exhaust gas passageway immediately upstream of the NOx treating catalyst and downstream of said hydrogen enriching device, when reduction of NOx is carried out by said NOx treating catalyst.

10. An exhaust gas purifying system as claimed in claim 9, wherein said NOx treating catalyst contains at least one noble metal selected from the group consisting of platinum, palladium and rhodium, and at least one substance selected from the group consisting of alumina, alkali metal and alkaline earth metal.

11. An exhaust gas purifying system as claimed claim 9, wherein said NOx treating catalyst contains at least rhodium and arranged to be capable of reducing NOx in exhaust gas at a temperature ranging from 260 to 380° C.

12. An exhaust gas purifying system as claimed in claim 9, wherein said combustion device is an internal combustion engine.

13. An exhaust gas purifying system as claimed in claim 9, wherein the internal combustion engine is a gasoline-fueled engine for an automotive vehicle.

14. An exhaust gas purifying system as claimed in claim 9, wherein the device for suppressing consumption of hydrogen in at least one of combustion gas or exhaust gas is a catalyst containing solid acid zirconium oxide.

15. An exhaust gas purifying system as claimed in claim 14, wherein the catalyst containing solid acidic zirconium oxide contains platinum, the solid acidic zirconium oxide containing at least one element selected from the group consisting of titanium, aluminum, tungsten, molybdenum and zinc, the solid acidic zirconium oxide having a composition represented by the following general formula (4):

$$[Y]dZreOf \quad (4)$$

where Y is at least one element selected from the group consisting of titanium, aluminum, tungsten, molybdenum and zinc; d and e are ratios of atoms of elements; and f is a number of oxygen atoms required for satisfying valences of Y and Zr, in which d is within a range of from 0.01 to 0.5, e is within a range of from 0.5 to 0.99, and d+e=1.0.

16. An exhaust gas purifying system as claimed in claim 9, wherein the hydrogen producing catalyst has a function to produce hydrogen from HC and CO in at least one of combustion gas or exhaust gas.

17. An exhaust gas purifying system as claimed in claim 16, further comprising a device for controlling exhaust gas at a position upstream of the hydrogen producing catalyst to intermittently have a composition in which air-fuel ratio is rich, so as to raise efficiency of production of hydrogen by the hydrogen producing catalyst.

18. An exhaust gas purifying system as claimed in claim 9, wherein the device for decreasing the reducing components other than hydrogen in at least one of combustion gas or exhaust gas includes a CO and HC selective oxidation catalyst containing zirconium oxide, for selectively oxidizing CO and HC.

19. An exhaust gas purifying system as claimed in claim 18, wherein the CO and HC selective oxidation catalyst has a function of producing hydrogen and contains rhodium and zirconium oxide, the zirconium oxide containing alkaline earth metal and having a composition represented by the following general formula (3):

$$[X]_a Zr_b O_c \quad (3)$$

where X is an alkaline earth metal selected from the group consisting of magnesium, calcium, strontium and barium; a and b are ratios of atoms of elements; and c is a number of oxygen atoms required for satisfying valences of X and Zr, in which a is within a range of from 0.01 to 0.5, b is within a range of from 0.5 to 0.99, and a+b=1.0.

20. An exhaust gas purifying system as claimed in claim 19, wherein the CO and HC selective oxidation catalyst further contains palladium and cerium oxide, the palladium being carried in an amount ranging from 20 to 80% by weight of total palladium on cerium oxide.

21. An exhaust gas purifying system comprising:

a NOx treating catalyst for reducing NOx disposed in an exhaust gas passageway of a combustion device, to reduce NOx in presence of reducing components in exhaust gas; and a hydrogen enriching device disposed upstream of said NOx treating catalyst with respect to flow of exhaust gas from the combustion device and arranged to increase a ratio of hydrogen to total reducing components in at least one of combustion gas and exhaust gas so as to meet relations represented by following formulae (1) and (2), when reduction of NOx is carried out by said NOx treating catalyst:

$$[H2/TR]d > [H2/TR]u \quad (1)$$

$$[H2/TR]d \geq 0.3 \quad (2)$$

where [H2/TR]u is a ratio between a concentration [H2]u of hydrogen and a concentration [TR]u of total reducing components in at least one of exhaust gas in the exhaust gas passageway upstream of said hydrogen enriching device ad or combustion gas in a state before undergoing the hydrogen ratio increasing by said hydrogen enriching device; and [H2/TR]d is a ratio between a concentration [H2]d of hydrogen and a concentration [TR]d of total reducing components in exhaust gas in the exhaust gas passageway upstream of the NOx treating catalyst and downstream of said hydrogen enriching device, wherein said hydrogen enriching device is a device for producing hydrogen in at least one of combustion gas or exhaust gas and includes a hydrogen producing catalyst containing at least one noble metal, wherein the hydrogen producing catalyst has a function to produce hydrogen from HC and CO in at least one of combustion gas or exhaust gas, and wherein the hydrogen producing catalyst includes a first catalytic component for oxidizing HC and CO to decrease oxygen, said first catalytic component being disposed in a first section of the hydrogen producing catalyst, and a second catalytic component for producing hydrogen and disposed in a second section of the hydrogen producing catalyst, the second section being located downstream of the first section with respect to flow of exhaust gas, so that an amount of oxygen to be contacted with the second catalytic component is decreased.

22. An exhaust gas purifying system as claimed in claim 21, wherein the first catalytic component includes at least one of palladium, platinum or alumina, at least one of palladium or platinum being contained in an amount ranging from 0.1 to 50 g per one liter of a carrier.

23. An exhaust gas purifying system as claimed in claim 21, wherein the second catalytic component includes rhodium and zirconium oxide, rhodium being contained in an amount ranging from 0.1 to 50 g per one litter of a carrier, zirconium oxide being contained in an amount ranging from 10 to 300 g per one liter of the carrier.

24. An exhaust gas purifying system as claimed in claim 23, wherein the zirconium oxide contains alkaline earth metal and has a composition represented by the following general formula (3):

$$[X]_a Zr_b O_c \quad (3)$$

where X is an alkaline earth metal selected from the group consisting of magnesium, calcium, strontium and barium; a and b are ratios of atoms of elements; and c is a number of oxygen atoms required for satisfying valences of X and Zr, in which a is within a range of from 0.01 to 0.5, b is within a range of from 0.5 to 0.99, and a+b=1.0.

* * * * *